US 8,634,993 B2

(12) United States Patent
McClure et al.

(10) Patent No.: US 8,634,993 B2
(45) Date of Patent: Jan. 21, 2014

(54) GNSS BASED CONTROL FOR DISPENSING MATERIAL FROM VEHICLE

(75) Inventors: John A. McClure, Scottsdale, AZ (US); Aaron C. Stichter, Apache Junction, AZ (US)

(73) Assignee: AgJunction LLC, Hiawatha, KS (US)

( * ) Notice: Subject to any disclaimer, the term of this patent is extended or adjusted under 35 U.S.C. 154(b) by 176 days.

(21) Appl. No.: 13/217,839

(22) Filed: Aug. 25, 2011

(65) Prior Publication Data

US 2012/0215410 A1    Aug. 23, 2012

Related U.S. Application Data

(63) Continuation-in-part of application No. 12/355,776, filed on Jan. 17, 2009, now Pat. No. 8,140,223, which is a continuation-in-part of application No. 12/171,399, filed on Jul. 11, 2008, now Pat. No. 8,265,826, which is a continuation-in-part of application No. 10/804,758, filed on Mar. 19, 2004, now Pat. No. 7,400,956, and a continuation-in-part of application No. 10/828,745, filed on Apr. 21, 2004, now abandoned, application No. 13/217,839, which is a continuation-in-part of application No. 12/750,429, filed on Mar. 30, 2010, now Pat. No. 8,214,111, which is a continuation of application No. 11/184,657, filed on Jul. 19, 2005, now Pat. No. 7,689,354.

(60) Provisional application No. 60/456,146, filed on Mar. 20, 2003, provisional application No. 60/464,756, filed on Apr. 23, 2003.

(51) Int. Cl.
*G06F 19/00* (2011.01)
*B05B 12/00* (2006.01)

(52) U.S. Cl.
USPC .......................................... 701/50; 701/468

(58) Field of Classification Search
None
See application file for complete search history.

(56) References Cited

U.S. PATENT DOCUMENTS 5,268,695 A   12/1993   Dentinger et al.
5,365,447 A   11/1994   Dennis (Continued)

FOREIGN PATENT DOCUMENTS

AU   2002244539   10/2002
AU   2002325645   9/2007

(Continued)

OTHER PUBLICATIONS

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 1998, 783-795.

*Primary Examiner* — Michael J Zanelli
(74) *Attorney, Agent, or Firm* — Law Office of Mark Brown, LLC; Mark E. Brown

(57) ABSTRACT

A spray control method employs a spray vehicle including a material tank, a pump communicating with the tank, and nozzles of a spray boom communicating with the pump. A GNSS receiver mounted on the vehicle and interfaced to a controller tracks its position in relation to stored position coordinates of field boundaries separating spray zones from spray exclusion zones. The tank is activated and deactivated by the controller to retain spray of the material within the spray zones and to prevent spray of the material in the exclusion zones, by processing an offset of the spray nozzles from the receiver, the spray range of the nozzles, spray turn-on and turn-off lag times, and the velocity of the spray vehicle, all in relation to the field boundaries. An alternative embodiment individually controls spray from the nozzles by using associated valves interfaced to the controller.

16 Claims, 32 Drawing Sheets

(56) References Cited

U.S. PATENT DOCUMENTS

| | | | |
|---|---|---|---|
| 5,430,654 A | 7/1995 | Kyrtsos et al. | |
| 5,612,864 A | 3/1997 | Henderson | |
| 5,653,389 A * | 8/1997 | Henderson et al. | 239/69 |
| 5,684,476 A | 11/1997 | Anderson | |
| 6,229,479 B1 | 5/2001 | Kozlov et al. | |
| 6,304,210 B1 | 10/2001 | Allison et al. | |
| 6,324,473 B1 | 11/2001 | Eschenbach | |
| 6,336,066 B1 | 1/2002 | Pellenc et al. | |
| 6,434,462 B1 | 8/2002 | Bevly et al. | |
| 6,449,558 B1 | 9/2002 | Small | |
| 6,810,315 B2 | 10/2004 | Cessac | |
| 6,937,939 B1 | 8/2005 | Shibusawa et al. | |
| 7,110,762 B1 | 9/2006 | Cameron et al. | |
| 7,184,859 B2 | 2/2007 | Hood et al. | |
| 7,254,485 B2 | 8/2007 | Rooney et al. | |
| 7,292,185 B2 | 11/2007 | Whitehead et al. | |
| 7,400,294 B2 | 7/2008 | Whitehead et al. | |
| 7,930,085 B2 | 4/2011 | Anderson et al. | |
| 7,994,971 B2 | 8/2011 | Velde et al. | |
| 8,018,376 B2 | 9/2011 | McClure et al. | |
| 8,140,223 B2 | 3/2012 | Whitehead et al. | |
| 8,219,926 B2 | 7/2012 | Othmer | |
| 8,265,826 B2 | 9/2012 | Feller et al. | |
| 8,437,901 B2 | 5/2013 | Anderson | |
| 2002/0107609 A1 * | 8/2002 | Benneweis | 700/231 |
| 2003/0195008 A1 | 10/2003 | Mohi et al. | |
| 2004/0006426 A1 | 1/2004 | Armstrong et al. | |
| 2004/0069875 A1 * | 4/2004 | Bui | 239/533.2 |
| 2005/0060069 A1 | 3/2005 | Breed et al. | |
| 2008/0195268 A1 | 8/2008 | Sapilewski et al. | |
| 2009/0005990 A1 | 1/2009 | Anderson et al. | |
| 2009/0093959 A1 | 4/2009 | Scherzinger et al. | |
| 2009/0121932 A1 | 5/2009 | Whitehead et al. | |
| 2010/0185364 A1 | 7/2010 | McClure | |
| 2010/0312428 A1 | 12/2010 | Roberge et al. | |
| 2011/0001668 A1 | 1/2011 | Cobb et al. | |
| 2011/0015817 A1 | 1/2011 | Reeve | |
| 2011/0018765 A1 | 1/2011 | Whitehead et al. | |
| 2011/0054729 A1 | 3/2011 | Whitehead et al. | |
| 2011/0231061 A1 | 9/2011 | Reeve et al. | |
| 2011/0264307 A1 | 10/2011 | Guyette et al. | |
| 2011/0266357 A1 * | 11/2011 | Orcutt et al. | 239/1 |
| 2011/0270495 A1 | 11/2011 | Knapp | |
| 2011/0305260 A1 | 12/2011 | McManus | |
| 2011/0309974 A1 | 12/2011 | Williamson | |
| 2012/0034940 A1 | 2/2012 | Ismail | |
| 2012/0116676 A1 | 5/2012 | Basnayake et al. | |
| 2012/0127032 A1 | 5/2012 | McClure | |
| 2012/0174445 A1 | 7/2012 | Jones et al. | |
| 2012/0215410 A1 | 8/2012 | McClure et al. | |
| 2012/0306692 A1 | 12/2012 | Werner | |
| 2013/0069821 A1 | 3/2013 | Jambulingam et al. | |
| 2013/0069822 A1 | 3/2013 | Wu et al. | |
| 2013/0107034 A1 | 5/2013 | Di Bernardo et al. | |
| 2013/0124055 A1 | 5/2013 | Baurer et al. | |
| 2013/0179026 A1 | 7/2013 | McClure et al. | |
| 2013/0179204 A1 | 7/2013 | Sabarez, II | |

FOREIGN PATENT DOCUMENTS

| | | |
|---|---|---|
| GB | 2347368 A * | 9/2000 |
| WO | WO-2007139467 | 12/2007 |
| WO | WO-2008080193 | 7/2008 |
| WO | WO-2009126587 | 10/2009 |
| WO | WO-2010005945 | 1/2010 |
| WO | WO-2011014431 | 2/2011 |

* cited by examiner

Entering Spray Zone

Entered Spray Zone

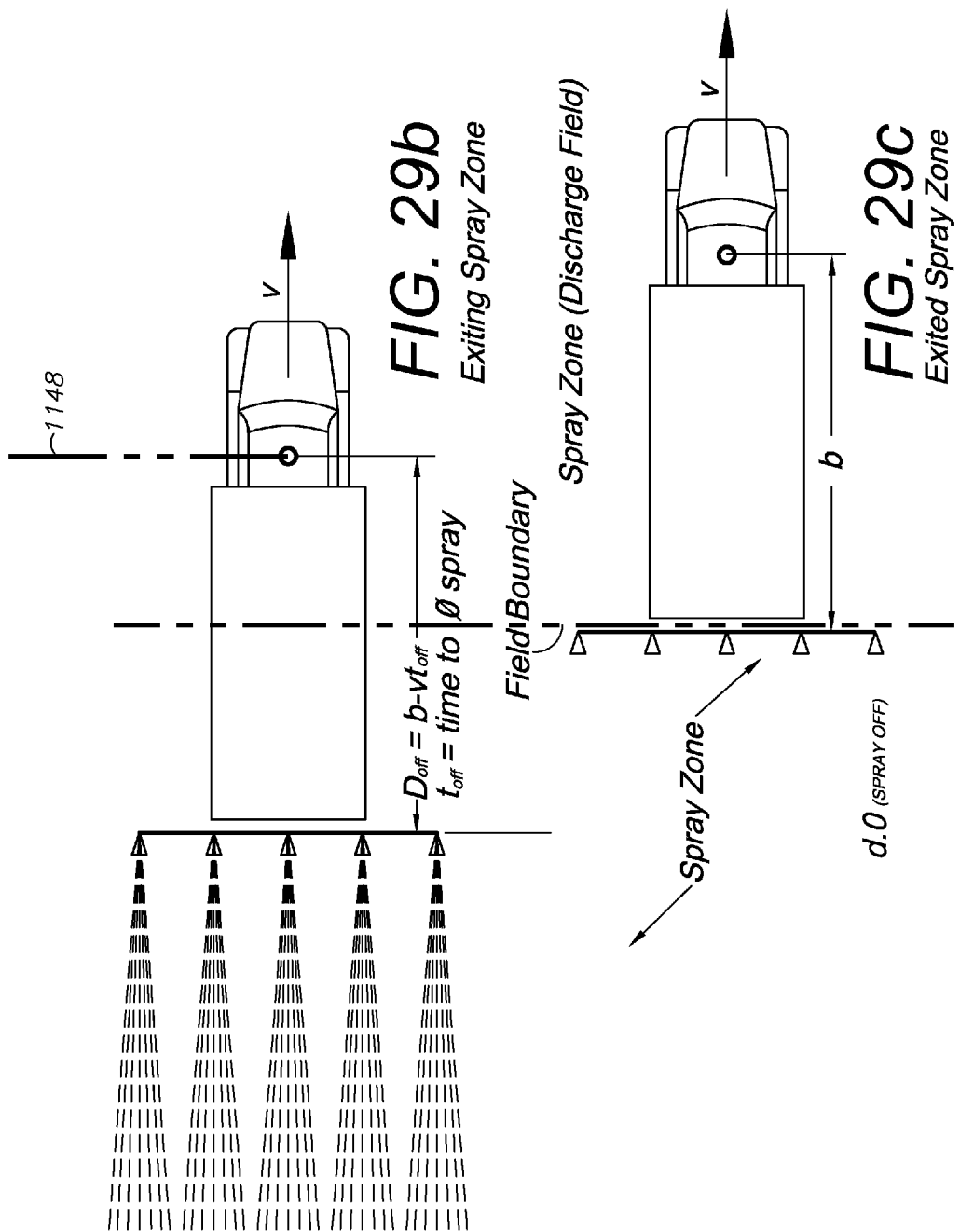

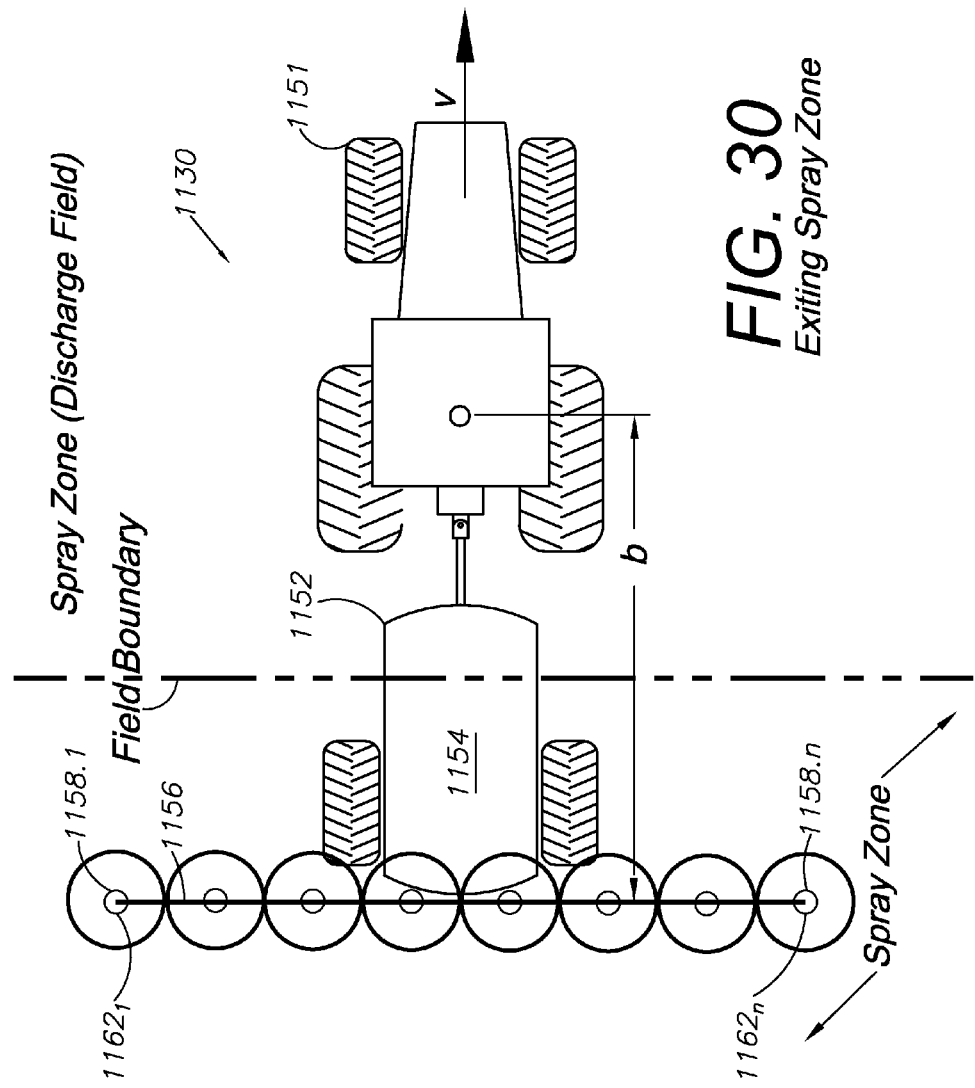

US 8,634,993 B2

GNSS BASED CONTROL FOR DISPENSING MATERIAL FROM VEHICLE

CROSS-REFERENCE TO RELATED APPLICATIONS

This application is a continuation-in-part of and claims the benefit of: U.S. patent application Ser. No. 12/355,776, filed Jan. 17, 2009 now U.S. Pat. No. 8,140,223; which is a continuation-in-part of Ser. No. 12/171,399, filed Jul. 11, 2008 now U.S. Pat. No. 8,265,826; which is a continuation-in-part of Ser. No. 10/804,758, filed Mar. 19, 2004, now U.S. Pat. No. 7,400,956 and a continuation-in-part of Ser. No. 10/828,745, filed Apr. 21, 2004, now abandoned which benefited from U.S. Provisional Patent Application Ser. No. 60/456,146, filed Mar. 20, 2003 and Ser. No. 60/464,756, filed Apr. 23, 2003. This application is also a continuation-in-part of U.S. patent application Ser. No. 12/750,429 filed Mar. 30, 2010 now U.S. Pat. No. 8,214,111; which is a continuation of U.S. patent application Ser. No. 11/184, 657, filed Jul. 19, 2005, now U.S. Pat. No. 7,689,354. The contents of all of the aforementioned applications and patents are incorporated by reference herein in their entireties.

BACKGROUND OF THE INVENTION

Movable machinery, such as agricultural equipment, open-pit mining machines, airplane crop dusters, and the like all benefit from accurate global navigation satellite system (GNSS) high precision survey products, and others. However, in existing satellite positioning systems (SATPS) for guided parallel and contour swathing for precision farming, mining, and the like, the actual curvature of terrain may not be taken into account. This results in a less than precise production because of the less than precise parallel or contour swathing. Indeed, in order to provide swaths through a field (in farming, for example), the guidance system collects positions of the vehicle as it moves across the field. When the vehicle commences the next pass through the field, the guidance system offsets the collected positions for the previous pass by the width of the equipment (i.e. swath width). The next set of swath positions is used to provide guidance to the operator as he or she drives the vehicle through the field.

The current vehicle location, as compared to the desired swath location, is provided to the vehicle's operator or to a vehicle's steering system. The SATPS provides the 3-D location of signal reception (for instance, the 3-D location of the antenna). If only 3-D coordinates are collected, the next swath computations assume a flat terrain offset. However, the position of interest is often not the same as where the satellite receiver (SR) is located since the SR is placed in the location for good signal reception, for example, for a tractor towing an implement, an optimal location for the SR may be on top of the cab. However, the position of interest (POI) for providing guidance to the tractor operator may be the position on the ground below the operator. If the tractor is on flat terrain, determining this POI is a simple adjustment to account for the antenna height.

However, if the tractor is on an inclined terrain with a variable tilt, which is often the case, the SATPS alone cannot determine the terrain tilt so the POI also cannot be determined. This results in a guidance error because the POI is approximated by the point of reception (POR), and this approximation worsens as the terrain inclination increases. This results in cross track position excursions relative to the vehicle ground track which would contaminate any attempt to guide to a defined field line or swath. On inclined terrain, this error can be minimized by collecting the vehicle tilt configuration along each current pass or the previous pass. The swath offset thus becomes a vector taking the terrain inclination into account with the assumption that from the first swath to the next one the terrain inclination does not change too much. It can therefore be seen that there is a need for a better navigation/guidance system for use with a ground-based vehicle that measures and takes into account vehicle tilt.

Various navigation systems for ground-based vehicles have been employed but each includes particular disadvantages. Systems using Doppler radar will encounter errors with the radar and latency. Similarly, gyroscopes, which may provide heading, roll, or pitch measurements, may be deployed as part of an inertial navigation package, but tend to encounter drift errors and biases and still require some external attitude measurements for gyroscope initialization and drift compensation. Gyroscopes have good short-term characteristics but undesirable long-term characteristics, especially those gyroscopes of lower cost such as those based on a vibrating resonator. Similarly, inertial systems employing gyroscopes and accelerometers have good short-term characteristics but also suffer from drift. Various systems include navigating utilizing GNSS; however, these systems also exhibit disadvantages. Existing GNSS position computations may include lag times, which may be especially troublesome when, for example, GNSS velocity is used to derive vehicle heading. As a result, the position (or heading) solution provided by a GNSS receiver tells a user where the vehicle was a moment ago, but not in real time. Existing GNSS systems do not provide high quality heading information at slower vehicle speeds. Therefore, what is needed is a low cost sensor system to facilitate vehicle swath navigation that makes use of the desirable behavior of both GNSS and inertial units while eliminating or reducing non-desirable behavior. Specifically, what is needed is a means to employ low-cost gyroscopes (e.g., micro electromechanical (MEM) gyroscopes) which exhibit very good short-term low noise and high accuracy while removing their inherent long-term drift.

Providing multiple antennas on a vehicle can provide additional benefits by determining an attitude of the vehicle from the GNSS ranging signals received by its antennas, which are constrained on the vehicle at a predetermined spacing. For example, high dynamic roll compensation signals can be output directly to the vehicle steering using GNSS-derived attitude information. Components such as gyroscopes and accelerometers can be eliminated using such techniques. Real-time kinematic (RTK) navigation can be accomplished using relatively economical single frequency L1-only receivers with inputs from at least two antennas mounted in fixed relation on a rover vehicle. Still further, moving baselines can be provided for positioning solutions involving tractors and implements and multi-vehicle GNSS control can be provided.

Providing additional antennas in combination with standard SATPS and GNSS guidance, as mentioned above, along with optional gyroscopes is a great method to increase GNSS positioning precision and accuracy, such as is described in U.S. Patent Publication No. 2009/0164067 which is assigned to a common assignee and is incorporated herein. However, accuracy and precision can only improve the efficiency of working vehicles, such as those in the agricultural field, to a limited extent. Although such systems are able to track and guide vehicles in three dimensions, including along ridges and sloped-regions, errors may appear in other aspects of a working vehicle. For example, in an agricultural field-working situation where a tractor is towing an implement, the implement may slide on a sloped-region, or the tractor may list to one side or another when entering softer soil or rocky areas. This can happen repeatedly when a vehicle is guided around the same field, regardless of the precision of the guidance system in pre-planning a path. Thus, a system that can detect such changes in uniformity of a field as the vehicle traverses a path and remember those changes can predict and re-route a more accurate and more economical path than a guidance system alone. Heretofore there has not been available a system and method with the advantages and features of the present invention.

Conventional agricultural spraying operations are carried out over an entire field, everywhere the crop is planted. In contrast, environmental spraying allows the spraying of certain materials which require restrictions in the area of deposition due to potential toxicity or strength. The restrictions can include the distance from waterways and slope of the ground which can affect run-off and concentrations of deposits.

Drilling waste water is one such restricted application. Typically, large tanker trucks are used to disperse waste water from oil, gas, and water drilling operations. This water is mixed with specialized drilling mud with a large bentonite clay concentration along with stabilizing agents to cool the drill bit, to extract drill cuttings, and to maintain the hydrostatic pressure to seal and stabilize the well. The waste water is not particularly toxic and can act as a source of soil nutrients. However, if it is dumped into a surface water shed in large quantities and concentrations, it can have a detrimental effect on local fish populations. Environmental agencies now restrict dumping close to water channels. Current recycling methods involve preplanning of areas in open fields or spray zones that can be sprayed so that minimal run-off occurs, plus additional areas or exclusion zones that are not to be sprayed.

When a tanker truck turns on the spray, the area of deposition starts well behind the nozzles, depending on the speed and "windup" time of the spray machinery and plumbing. When the spray is turned off, the fluid continues to exit the nozzles for a certain amount of time. Even with a visually marked boundary of the spray zone, it is difficult for a tanker truck driver to accurately turn the spray on and off to fully cover the spray zone and to prevent some spray from getting in the exclusion zone.

SUMMARY OF THE INVENTION

Disclosed herein in an exemplary embodiment is a sensor system for vehicle steering control comprising: a plurality of global navigation satellite systems (GNSS) including receivers and antennas at a fixed spacing to determine a vehicle position, velocity and at least one of a heading angle, a pitch angle, and a roll angle based on carrier phase corrected real time kinematic (RTK) position differences. The roll angle facilitates correction of the lateral motion induced position errors resultant from motion of the antennas as the vehicle moves based on an offset to ground and the roll angle. The system also includes a control system configured to receive the vehicle position, heading, and at least one of roll, pitch and yaw, and configured to generate a steering command to a vehicle steering system.

Also disclosed herein in another exemplary embodiment is a method for computing a position of a vehicle comprising: initializing GNSS; computing a first position of a first GNSS antenna on the vehicle; computing a second position of a second GNSS antenna; and calculating a heading as a vector perpendicular to a vector joining the first position and the second position, in a horizontal plane aligned with the vehicle. The method also includes computing a roll angle of the vehicle as an arc-tangent of a ratio of differences in heights of the first GNSS antenna and the second GNSS antenna divided by a spacing between their respective phase centers and calculating an actual position at the center of the vehicle projected to the ground using the computed roll angle and a known height from the ground of at least one of the first GNSS antenna and the second GNSS antenna.

Further disclosed herein in yet another exemplary embodiment is a method of controlling a vehicle comprising: computing a position and a heading for the vehicle; computing a steering control command based on a proportionality factor multiplied by a difference in a desired position versus an actual position, plus a second proportionality factor multiplied by a difference in a desired heading versus an actual heading, the second proportionality factor ensuring that, when the vehicle attains the desired position, the vehicle is also directed to the desired heading, and thereby avoiding crossing a desired track. The method also includes a recursive adaptive algorithm employed to characterize the vehicle response and selected dynamic characteristics.

The method further includes applying selected control values to a vehicle steering control mechanism and measuring responses of the vehicle thereto; calculating response times and characteristics for the vehicle based on the responses; and calibrating the control commands by applying a modified control command based on the responses to achieve a desired response. Various alternative aspects and applications of the present invention are disclosed herein.

Additional alternative aspects include selective sprayer nozzle control, high dynamic roll compensation using GNSS attitude solutions from multiple antennas, moving baseline implement positioning and multiple vehicle control.

An additional exemplary embodiment is a sensor system for vehicle guidance using one or more global navigation satellite systems (GNSSs) according to the above-mentioned embodiments, in combination with a plurality of various sensors located throughout a vehicle and a towed implement. These sensors detect additional parameters from those calculated by the GNSS positioning system, such as vehicle and implement stress levels, fuel levels, power levels, optical guide path observations via an onboard camera, multi-section (articulated) implement position and attitude sensing via multiple antennas and other characteristics of the working vehicle. The combination of the two systems results in a much more accurate and economical preplanned path generated for use in later field work.

An additional embodiment of the present invention provides for precision control of spraying, particularly environmental spraying operations in which spraying of certain materials is only allowed in designated areas. In general, a spray vehicle includes a tanker truck with a spray boom having a plurality of transversely spaced nozzles, a tank holding a quantity of the material to be sprayed, a pump communicating with the tank and the nozzles, a GNSS receiver tracking its own position, and a controller interfaced with the GNSS receiver and the pump. The spray vehicle can also be a tractor towing a sprayer implement which is hitched to the tractor. The material tank, pump, and spray boom can be mounted on the sprayer implement.

Areas to be sprayed are designated as spray zones while areas not to be sprayed are designated as exclusion zones. The spray zones and exclusion zones are separated by linear boundaries, which are surveyed, and coordinates of the boundaries are stored in the controller. The controller is a computer having data storage, data inputs and outputs, and controlled outputs connected to suitable drivers and/or relays to control particular processes or actions. When the spray vehicle is within an exclusion zone and approaching a spray zone, the boundary is termed a spray turn-on boundary. When the spray vehicle is within a spray zone and approaching an exclusion zone, the boundary is termed a spray turn-off boundary. In general, the controller is programmed to control activation of the pump in relation to positions detected by the GNSS receiver to retain the spray of the material within spray zones and to prevent spray of the material within the exclusion zones.

The spray boom is mounted at an offset distance from the GNSS receiver in the direction of vehicle travel. The pump in cooperation with the nozzles and plumbing therebetween have operational characteristics such that a spray turn-on lag time is required for the spray to reach a maximum spray range distance from the nozzles after the pump is activated. Similarly, a spray turn-off lag time is required between the deactivation of the pump and cessation of material being sprayed from the nozzles. The nozzle/receiver offset distance, the spray range distance, the spray turn-on lag time, and the spray turn-off lag time are all stored in the controller.

In an embodiment of a spray control method, when the spray vehicle is moving in an exclusion zone toward a turn-on boundary at a particular vehicle velocity, the controller causes activation of the pump when the GNSS receiver detects its position within a spray zone beyond the turn-on boundary equal to the sum of the nozzle/receiver offset distance plus the spray range minus the product of the vehicle velocity times the turn-on lag time. The pump remains activated to cause the material to be sprayed from the nozzles as the spray vehicle approaches an exclusion zone. The controller causes deactivation of the pump when the GNSS receiver detects its position within the exclusion zone beyond the turn-off boundary equal to the nozzle/receiver offset distance minus the product of the vehicle velocity times the turn-off lag time.

It is foreseen that the spray vehicle will not always be approaching a straight-line boundary or a boundary which is perpendicular to the direction of its travel. In an alternative embodiment of the spray control method, the nozzles are controlled individually by corresponding spray valves interfaced to the controller. The valves are opened and closed by the controller based, on the position of the GNSS receiver relative to a portion of an approached zone boundary which is aligned with a particular nozzle and its spray pattern in the direction of travel of the spray vehicle. Generally, when the spray vehicle is approaching a turn-on boundary, each valve is controlled to open when the GNSS receiver detects a position of the vehicle within the spray zone at which the spray of material from the nozzle associated with that valve is retained within the spray zone. Similarly, when the spray vehicle is approaching a turn-off boundary, each valve is controlled to close when the GNSS receiver detects a position of the vehicle within the exclusion zone at which the spray of material from that valve within the exclusion zone is prevented.

More particularly, an interval of time is required between the opening of a spray valve and the material reaching the spray range of the associated nozzle, which is referred to as a valve open lag time. Similarly, there is a valve close lag time required between the closing of a valve and the complete cessation of spray material exiting the nozzle. The valve open and close lag times may be different respectively from the spray turn-on and turn-off lag times described above. In environmental spraying, the principal criteria used in selecting valve open and close lag times is avoidance of spraying material on exclusion zones. The valve open and close lag times are entered into the controller.

When the spray vehicle is approaching a turn-on boundary, each spray valve is controlled to open when the GNSS receiver detects a position of the receiver within the spray zone at a valve open distance beyond a portion of the turn-on boundary aligned with the nozzle associated with that valve equal to the sum of nozzle/receiver offset distance plus the spray range minus the product of the spray vehicle velocity times the valve open lag time. Similarly, when the spray vehicle is approaching a turn-off boundary, each valve is closed when the GNSS receiver detects a position of the receiver within the exclusion zone at a valve close distance equal to the nozzle/receiver offset distance minus the product of the vehicle velocity times the valve close lag time.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIGS. 29a-c are diagrammatic plan views thereof illustrating the application of a material to selected areas and preventing application of the material to other areas.

FIG. 30 is a diagrammatic plan view of an embodiment or aspect of an environmental sprayer vehicle including a tractor and a towed spray implement.

DETAILED DESCRIPTION OF THE PREFERRED ASPECTS

Figure 1:
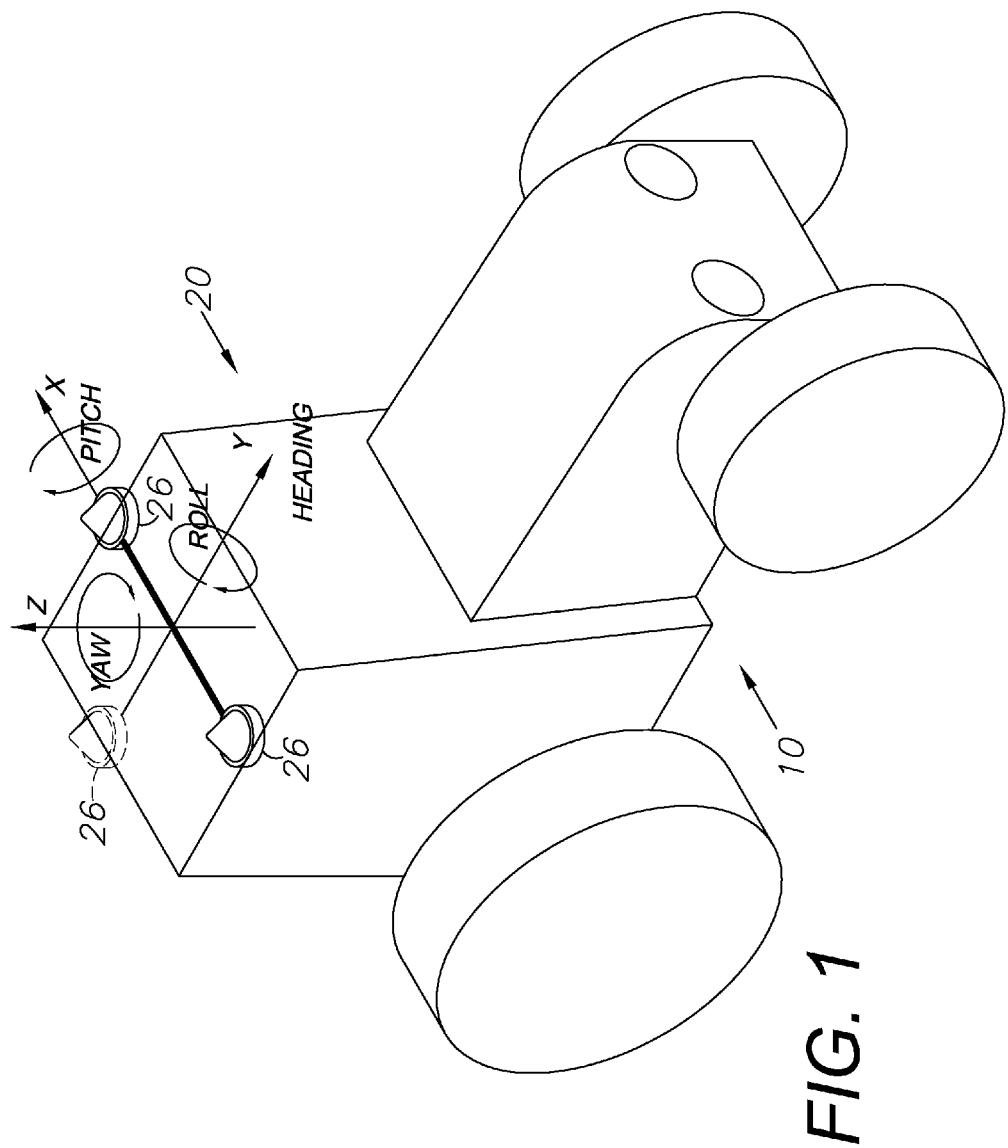
FIG. 1 is a diagrammatic perspective view of a vehicle including an exemplary embodiment incorporating aspects of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. GNSS Introduction

Global navigation satellite systems (GNSS) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along transverse X, longitudinal Y and vertical Z axes). Yaw, pitch and roll refer to moving component rotation about the Z, X and Y axes respectively. Said terminology will include the words specifically mentioned, derivatives thereof and words of similar meaning.

Disclosed herein in an exemplary embodiment is a sensor system for vehicle guidance. The sensor system utilizes a plurality of GNSS carrier phase differenced antennas to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

It is known in the art that by using a GNSS satellite's carrier phase, and possibly carrier phases from other satellites, such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical Z axis) from a position displacement. It will be appreciated that an exemplary embodiment may be utilized to compute not only heading, but either roll (rotation about a longitudinal Y axis) or pitch (rotation about a lateral X axis) depending on the orientation of the antennas relative to the vehicle. Heading information, combined with position, either differentially corrected (DGPS or DGNSS) or carrier phase corrected real time kinematic (RTK) provides the feedback information desired for a proper control of the vehicle direction. Addition of one or more rate gyros further provides independent measurements of the vehicle's dynamics and facilitates vehicle steering control. The combination of GNSS attitude obtained from multiple antennas with gyroscopes facilitates calibration of gyroscope scale factor and bias errors which are present in low cost gyroscopes. When these errors are removed, gyro rates are more accurate and provide better inputs for guidance and control. Furthermore, gyroscopes can now effectively be integrated to obtain roll, pitch and heading angles with occasional adjustment from the GNSS-derived attitude.

Existing systems for vehicle guidance may employ separate gyros, and separate GNSS positioning or attitude systems. However, such systems do not provide an integrated heading sensor based on GNSS as disclosed herein. Moreover, separate systems exhibit the limitations of their respective technologies as mentioned earlier. The exemplary embodiments as described herein eliminate the requirements of existing systems for other means to correct for vehicle roll. Moreover, an implementation of an exemplary embodiment also provides a relatively precise means of calculating heading and heading rate of change (turn rate), in both the sort-term and the long-term.

Another benefit achieved by incorporating a GNSS-based heading sensor is the elimination or reduction of drift and biases resultant from a gyro-only or other inertial sensor approach. Yet another advantage is that heading may be computed while the vehicle is stopped or moving slowly, which is not possible in a single-antenna GNSS based approach that requires a vehicle velocity vector to derive heading. This can be very important in applications where a vehicle has to turn slowly to align with another path. During these slow turns the gyro can drift away, but by adding the use of a dual antenna GNSS solution the orientation of the gyro can be continuously corrected. This also permits immediate operation of a slow moving vehicle after being at rest, rather than requiring an initialization from motion. Yet another advantage of an exemplary embodiment is that a combination of the aforementioned sensors provides sufficient information for a feedback control system to be developed, which is standalone and independent of a vehicle's sensors or additional external sensors. Thus, such a system is readily maintained as vehicle-independent and may be moved from one vehicle to another with minimal effort. Yet another exemplary embodiment of the sensor employs global navigation satellite system (GNSS) sensors and measurements to provide accurate, reliable positioning information. GNSS sensors include, but are not limited to GNSS, Global Navigation System (GLONAS), Wide Area Augmentation System (WAAS), and the like, as well as combinations including at least one of the foregoing.

An example of a GNSS is the Global Positioning System (GPS) established by the United States government that employs a constellation of 24 or more satellites in well-defined orbits at an altitude of approximately 26,500 km. These satellites continually transmit microwave L-band radio signals in two frequency bands, centered at 1575.42 MHz and 1227.6 MHz, denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GNSS receivers process the radio signals, computing ranges to the GNSS satellites, and by triangulating these ranges, the GNSS receiver determines its position and its internal clock error.

In standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors.

To overcome the errors of the standalone GNSS system, many positioning applications have made use of data from multiple GNSS receivers. Typically, in such applications, a reference receiver, located at a reference site having known coordinates, receives the GNSS satellite signals simultaneously with the receipt of signals by a remote receiver. Depending on the separation distance between the two GNSS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GNSS receivers to improve accuracy is known as differential GNSS (DGNSS or DGPS). Differential GNSS is well known and exhibits many forms. In all forms of DGNSS, the positions obtained by the end user's remote receiver are relative to the position(s) of the reference receiver(s). GNSS applications have been improved and enhanced by employing a broader array of satellites such as GNSS and WAAS. For example, see commonly assigned U.S. Pat. No. 6,469,663 B1 to Whitehead et al. titled Method and System for GNSS and WAAS Carrier Phase Measurements for Relative Positioning, dated Oct. 22, 2002, the disclosures of which are incorporated by reference herein in their entirety. Additionally, multiple receiver DGNSS has been enhanced by utilizing a single receiver to perform differential corrections. For example, see commonly assigned U.S. Pat. No. 6,397,147 B1 to Whitehead titled Relative GNSS Positioning Using a Single GNSS Receiver with Internally Generated Differential Correction Terms, dated May 28, 2002, the disclosures of which are incorporated by reference herein in their entirety.

II. GNSS and Gyro Control System and Method

Figure 2:
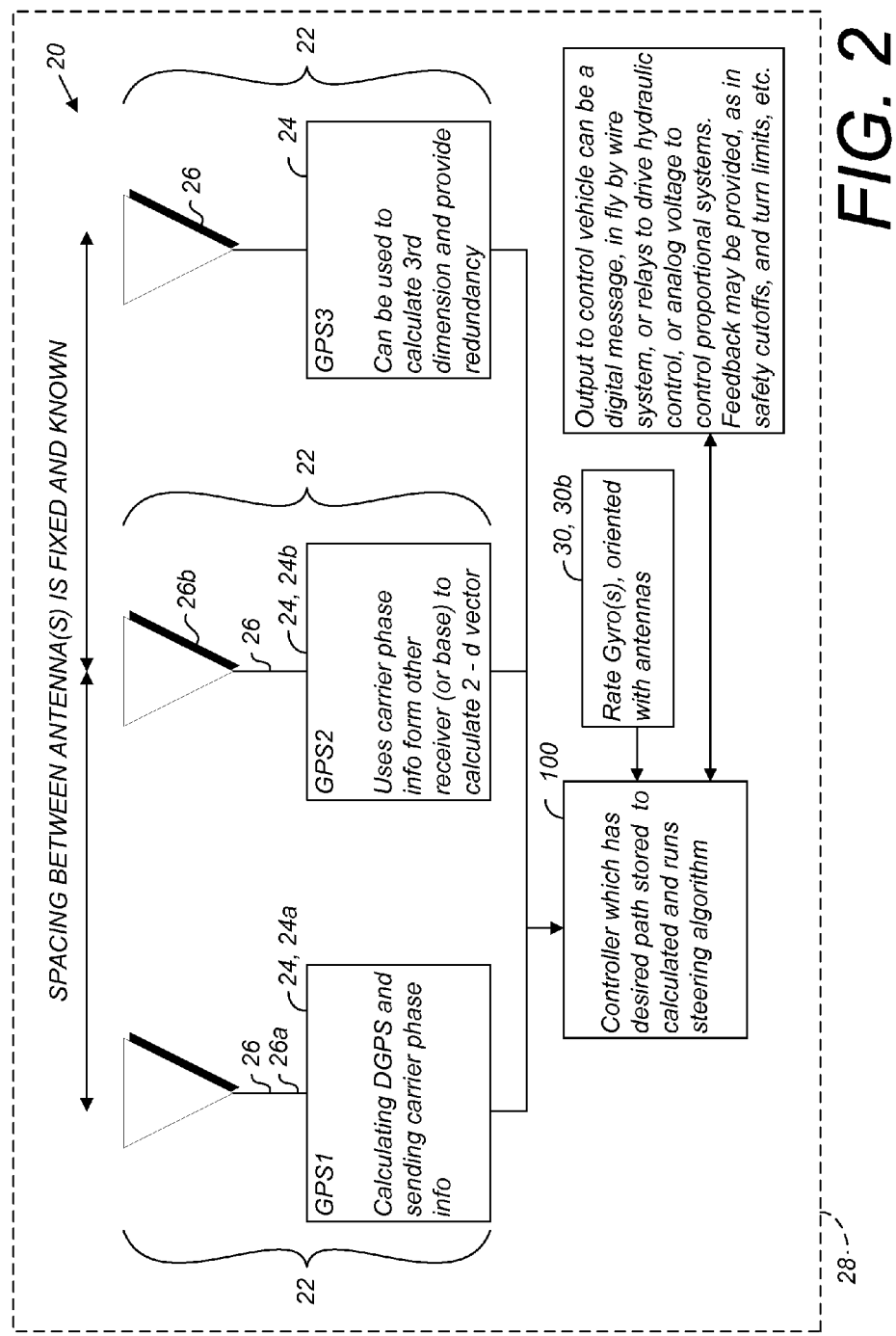
FIG. 2 is a block diagram of components mounted on the vehicle including an exemplary embodiment of a sensor system.
Figure 3:
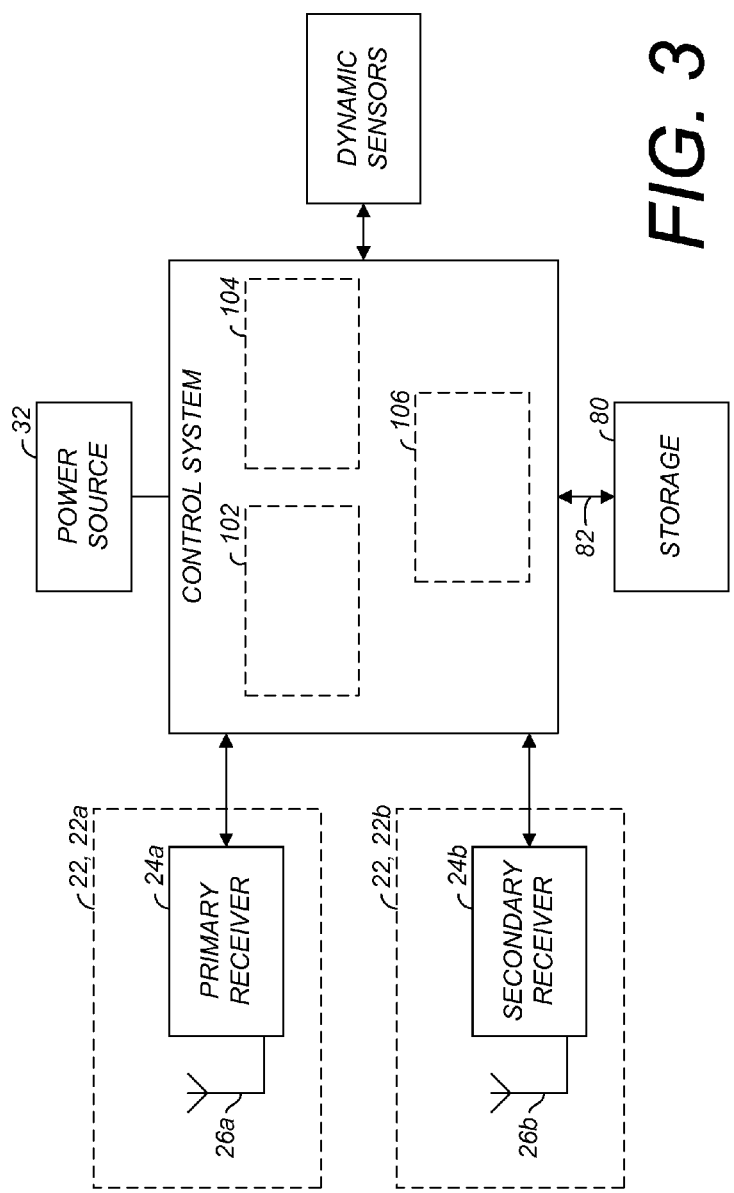
FIG. 3 is a block diagram of a sensor system in accordance with an exemplary embodiment.

Referring now to FIGS. 1 through 4, an illustrative vehicle 10 is depicted including a sensor system 20 in accordance with an exemplary embodiment. Referring also to FIGS. 2 and 3, block diagrams of the sensor system 20 are depicted. The sensor system 20 includes, but is not limited to a GNSS attitude system 22, comprising at least a GNSS receiver 24 and an antenna 26. The GNSS receiver/antenna systems comprising GNSS attitude system 22 cooperate as a primary receiver system 22a and a secondary receiver system 22b, with their respective antennas 26a and 26b mounted with a known separation. The primary receiver system 22a may also be denoted as a reference or master receiver system, while the secondary receiver system 22b may also be denoted as a remote or slave receiver system. It will also be appreciated that the selection of one receiver as primary versus secondary need not be of significance; it merely provides a means for distinguishing between systems, partitioning of functionality, and defining measurement references to facilitate description. It should be appreciated that the nomenclature could readily be transposed or modified without impacting the scope of the disclosure or the claims.

The sensor system 20 is optionally configured to be mounted within a single enclosure 28 to facilitate transportability. In an exemplary embodiment, the enclosure 28 can be any rigid assembly, fixture, or structure that causes the antennas 26 to be maintained in a substantially fixed relative position with respect to one another. In an exemplary embodiment, the enclosure 28 may be a lightweight bracket or structure to facilitate mounting of other components and transportability. Although the enclosure 28 that constrains the relative location of the two antennas 26a and 26b may have virtually any position and orientation in space, the two respective receivers 24 (reference receiver 24a and remote receiver 24b) are configured to facilitate communication with one another and resolve the attitude information from the phase center of the reference antenna 26a to the phase center of the remote antenna 26b with a high degree of accuracy.

Yet another embodiment employs a GNSS sensor 20 in the embodiments above augmented with supplementary inertial sensors 30 such as accelerometers, gyroscopes, or an attitude heading reference system. More particularly, in an implementation of an exemplary embodiment, one or more rate gyro(s) are integrated with the GNSS sensor 20.

In yet another exemplary embodiment, a gyro that measures roll-rate may also be combined with this system's GNSS-based roll determination. A roll rate gyro denoted 30b would provide improved short-term dynamic rate information to gain additional improvements when computing the sway of the vehicle 10, particularly when traveling over uneven terrain.

It will be appreciated that to supplement the embodiments disclosed herein, the data used by each GNSS receiver 24 may be coupled with data from supplementary sensors 50, including, but not limited to, accelerometers, gyroscopic sensors, compasses, magnetic sensors, inclinometers, and the like, as well as combinations including at least one of the foregoing. Coupling GNSS data with measurement information from supplementary sensors 30, and/or correction data for differential correction improves positioning accuracy, improves initialization durations and enhances the ability to recover for data outages. Moreover, such coupling may further improve, e.g., reduce, the length of time required to solve for accurate attitude data.

It will be appreciated that although not a requirement, the location of the reference antenna 26a can be considered a fixed distance from the remote antenna 26b. This constraint may be applied to the azimuth determination processes in order to reduce the time required to solve for accurate azimuth, even though both antennas 26a and 26b may be moving in space or not at a known location. The technique of resolving the attitude information and position information for the vehicle 10 may employ carrier phase DGNSS techniques with a moving reference station. Additionally, the use of data from auxiliary dynamic sensors aids the development of a heading solution by applying other constraints, including a rough indication of antenna orientation relative to the Earth's gravity field and/or alignment to the Earth's magnetic field.

Producing an accurate attitude from the use of two or more GNSS receiver and antenna systems 22 has been established in the art and therefore will not be expounded upon herein. The processing is utilized herein as part of the process required to implement an exemplary embodiment.

Figure 4:
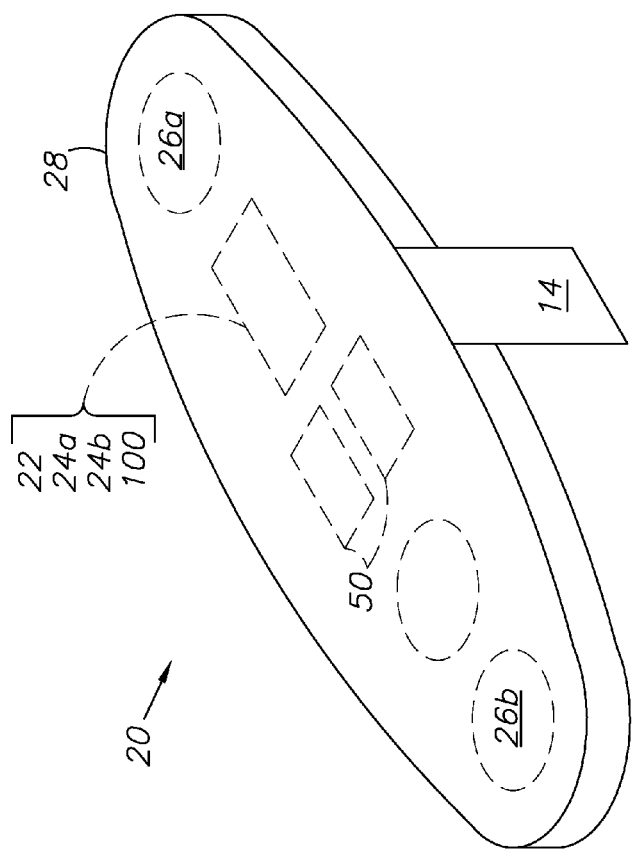
FIG. 4 is a diagrammatic perspective view of an illustrative sensor system in accordance with an exemplary embodiment.

Referring also to FIG. 4, a mechanism for ensuring an accurate orientation of the sensor system 20 to the vehicle 10 may be provided for by an optional mounting base 14 accurately attached to the enclosure 28. An accurate installation ensures that substantially no misalignment error is present that may otherwise cause the sensor system 20 to provide erroneous heading information. The mounting base 14 is configured such that it fits securely with a determinable orientation relative to the vehicle 10. In an exemplary embodiment, for example, the mounting base 14 is configured to fit flatly against the top surfaces of the vehicle 10 to facilitate an unimpeded view to the GNSS satellites.

With the sensor system 20 affixed and secured in the vehicle 10 power up and initialization of the sensor system 20 is thereafter executed. Such an initialization may include, but not be limited to, using the control system 100 to perform any initialization or configuration that may be necessary for a particular installation, including the configuration of an internal log file within the memory of the sensor system 20.

The sensor system 20 may further include additional associated electronics and hardware. For example, the sensor system 20 may also include a power source, e.g., battery, or other power generation means, e.g., photovoltaic cells, and ultrahigh capacity capacitors and the like. Moreover, the sensor system 20 may further include a control system 100. The control system 100 may include, without limitation, a controller/computer 102, a display 104 and an input device 106, such as a keypad or keyboard for operation of the control system 100. The controller 102 may include, without limitation, a computer or processor, logic, memory, storage, registers, timing, interrupts, input/output signal interfaces, and communication interfaces as required to perform the processing and operations prescribed herein. The controller preferably receives inputs from various systems and sensor elements of the sensor system 20 (GNSS, inertial, etc.), and generates output signals to control the same and direct the vehicle 10. For example, the controller 102 may receive such inputs as the GNSS satellite and receiver data and status, inertial system data, and the like from various sensors. In an exemplary embodiment, the control system 100 computes and outputs a cross-track and/or a direction error relating to the current orientation, attitude, and velocity of the vehicle 10 as well as computing a desired swath on the ground. The control system 100 will also allow the operator to configure the various settings of the sensor system 20 and monitor GNSS signal reception and any other sensors of the sensor system 20. In an exemplary embodiment, the sensor system 20 is self-contained. The control system 100, electronics, receivers 24, antennas 26, and any other sensors, including an optional power source, are contained within the enclosure 28 to facilitate ease of manipulation, transportability, and operation.

Figure 5:
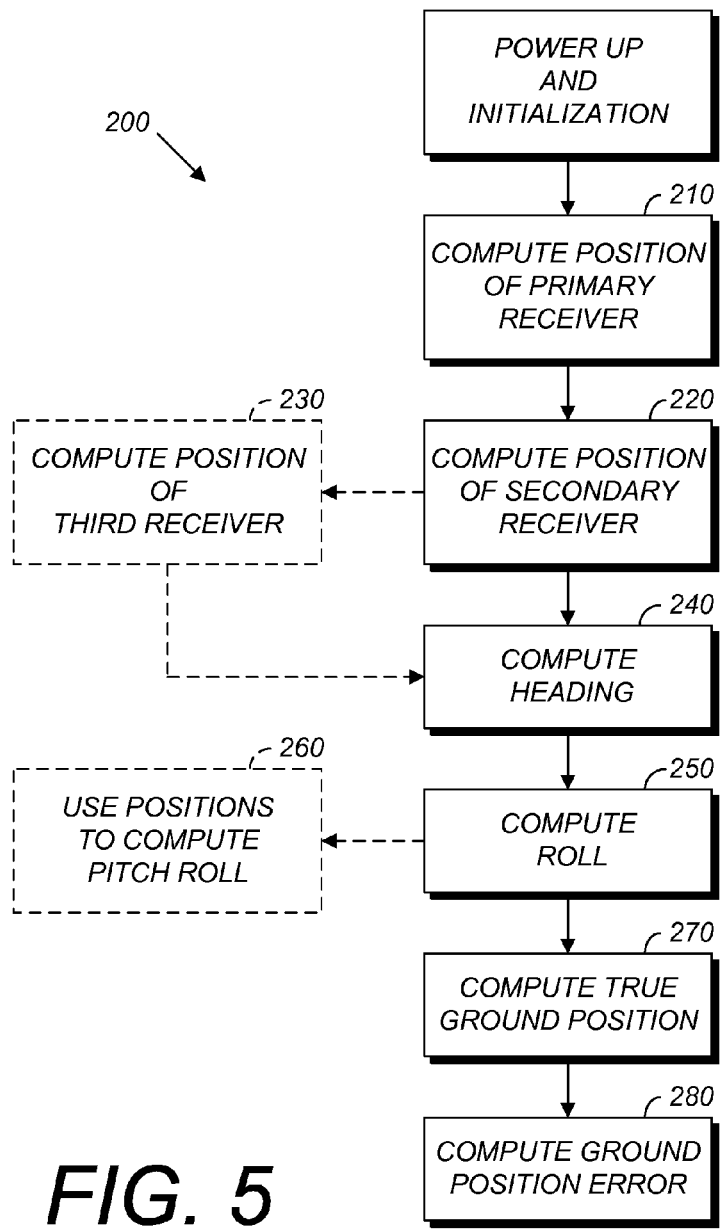
FIG. 5 is a flow diagram of an exemplary process for determining a steering command for a vehicle in accordance with an exemplary embodiment.

Referring now to FIG. 5, a flowchart diagrammatically depicting an exemplary methodology for executing a control process 200 is provided. An exemplary control process 200, such as may be executed by an operator in conjunction with a control system 100, acts upon information from the sensor system 20 to output cross-track and/or direction error based upon corrected 3-D position, velocity, heading, tilt, heading rate (degrees per second), radius of curvature and the like.

System 22a computes its position, denoted $p_1$ ($x_1$, $y_1$, $z_1$). Referring now to block 220, the secondary receiver and antenna system 22b computes its position, denoted $p_2$ ($x_2$, $y_2$, $z_2$). Referring now to block 230, optionally additional receiver and antenna system(s) 22 compute their respective positions, denoted $p_3$ ($x_3$, $y_3$, $z_3$), . . . $p_n$ ($x_n$, $y_n$, $z_n$).

At process block 240, employing a geometric calculation the heading is computed as the vector perpendicular to the vector joining the two positions, in the horizontal plane (assuming they are aligned with the vehicle 10). Furthermore, at block 250 the roll of the vehicle 10 may readily be computed as the arc-tangent of the ratio of the difference in heights of the two antennas 26a and 26b divided by the spacing between their phase centers (a selected distance within the enclosure 28). It will be appreciated that optionally, if additional receiver and antenna systems are utilized and configured for additional measurements, the pitch and roll angles may also be computed using differential positioning similar to the manner for computing heading. Therefore, in FIG. 5, optionally at process block 260, the pitch and/or roll may be computed.

Continuing with FIG. 5, at process block 270, using the computed roll angle and a known antenna height (based on the installation in a given vehicle 10), the actual position at the center of the vehicle 10 projected to the ground may be calculated. This position represents a true ground position of the vehicle 10. Once the ground position is known, the error value representing the difference between where the vehicle should be based on a computed swath or track, and where it actually is, can be readily calculated as shown at block 280.

Optionally, the vector velocities of the vehicle 10 are also known or readily computed based on an existing course and heading of the vehicle 10. These vector velocities may readily be utilized for control and instrumentation tasks.

Figure 6:
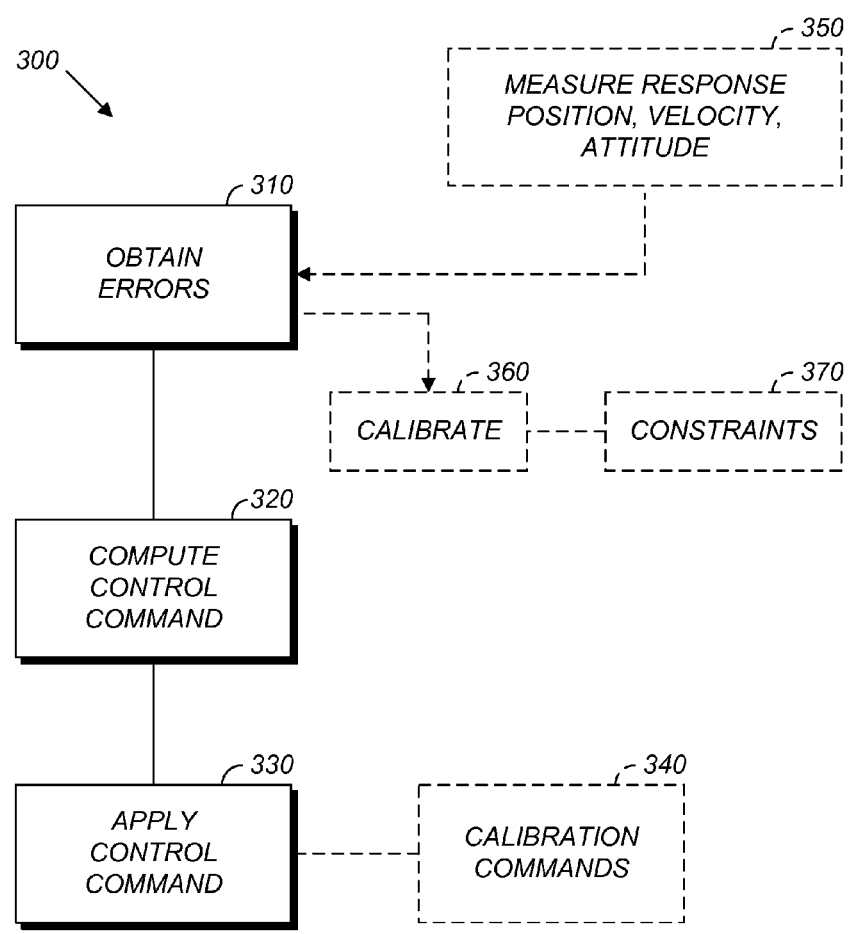
FIG. 6 is a flow diagram of an exemplary process for determining a steering command with an exemplary sensor system in accordance with an alternative embodiment.

Turning now to FIG. 6, in another exemplary embodiment a steering control process 300 can utilize the abovementioned information from the sensor system 20 to direct the vehicle motion. At process block 310 the steering control may be initiated by obtaining the computed errors from process 200. Turning to block 320, the steering control process 300 may be facilitated by computing a steering control command based on a proportionality factor times the difference in desired position versus actual position (computed position error), plus a second proportionality factor times the difference in desired heading versus actual heading (heading error). The second proportionality factor ensures that when the vehicle attains the desired position it is actually directed to the correct heading, rather than crossing the track. Such an approach will dramatically improve steering response and stability. At process block 330, a steering command is generated and directed to the vehicle 10.

Moreover, continuing with FIG. 6, optionally a recursive adaptive algorithm may also be employed to characterize the vehicle response and selected dynamic characteristics. In an exemplary embodiment, the sensor system 20 applies selected control values to the vehicle steering control mechanism as depicted at optional block 340 and block 330. The sensor system 20 measures the response of the vehicle 10 as depicted at process block 350 and calculates the response times and characteristics for the vehicle. For example, a selected command is applied and the proportionality of the turn is measured given the selected change in steering. Turning to process block 360, the responses of the vehicle 10 are then utilized to calibrate the control commands applying a modified control command to achieve a desired response. It will be appreciated that such an auto-calibration feature would possibly be limited by constraints of the vehicle to avoid excess stress or damage as depicted at 370.

It will be appreciated that while a particular series of steps or procedures is described as part of the abovementioned alignment process, no order of steps should necessarily be inferred from the order of presentation. For example, the process 200 includes installation and power up or initialization. It should be evident that power-up and initialization could potentially be performed and executed in advance without impacting the methodology disclosed herein or the scope of the claims.

It should further be appreciated that while an exemplary partitioning functionality has been provided, it should be apparent to one skilled in the art that the partitioning could be different. For example, the control of the primary receiver 24a and the secondary receiver 24b, as well as the functions of the controller 102, could be integrated in other units. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatus for practicing those processes. The present invention can also be embodied in the form of computer program code containing instructions embodied in tangible media, such as floppy diskettes, CD-ROMs, DVD's, flash drives, hard drives, or any other computer-readable storage medium 80 wherein the computer becomes an apparatus for practicing the invention when the computer program code is loaded into and executed by the computer. The present invention can also be embodied in the form of computer program code stored in a storage medium or loaded into and/or executed by a computer, for example. The present invention can also be embodied in the form of a data signal 82 transmitted by a modulated or unmodulated carrier wave, over a transmission medium, such as electrical wiring or cabling, through fiber optics, or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

III. Alternative Aspect GNSS Control Systems and Methods

Figure 7:
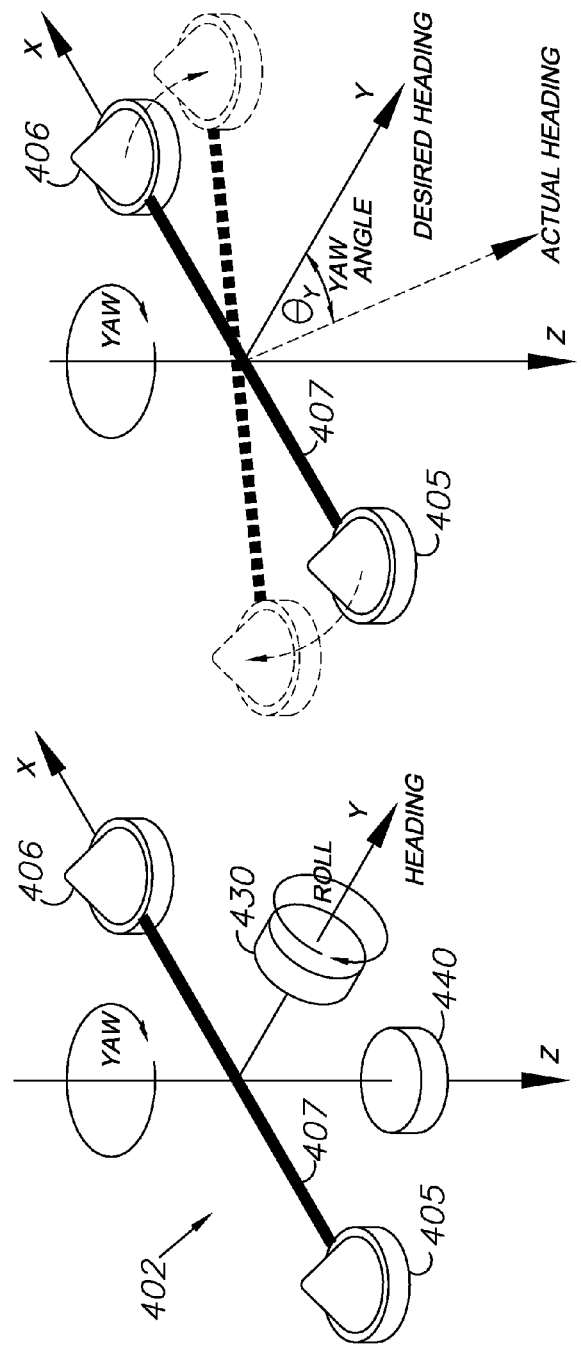
FIGS. 7A-7C are diagrammatic perspective views depicting a multi-axis antenna and gyroscope system embodying an aspect of the present invention and including two antennas connected by a rigid link and yaw and roll gyroscopes and illustrating a determination of yaw attitude in FIG. 7B and roll attitude in FIG. 7C.

FIG. 7A shows another alternative aspect of the invention including a GNSS antenna and gyroscope attitude system 402 with antennas 405, 406 separated by a rigid link 407. In a typical application, the rigid link 407 is attached to the vehicle 10 and extends along the X (transverse) axis or transversely with respect to the vehicle's direction of travel, which generally corresponds to the Y (heading) axis. Alternatively, the vehicle 10 itself can provide the rigid link between the antennas 405, 406, for example, by mounting the antennas 405, 406 at predetermined, fixed locations on the roof of the vehicle cab with a predetermined, fixed distance therebetween. Another alternative is to provide a GNSS attitude device with antennas, receivers and sensors (e.g., gyroscopes (gyros), accelerometers, and other sensors) in a self-contained, unitary enclosure, such as the device 20 shown in enclosure 28 in FIG. 4. Regardless of the antenna-mounting structure, the orientation of the antenna pair and the rigid link 407 (or vehicle 10) is determined with respect to an Earth-fixed coordinate system. The XYZ axes shown in FIG. 7A provide an example for defining this relation. Roll and yaw gyros 430, 440 are generally aligned with the Y and Z axes respectively for detecting and measuring vehicle 10 attitude changes with respect to these axes.

With the system 402 installed on a vehicle 10 (FIG. 8), the two antennas 405, 406 can provide angular orientations with respect to two axes. In the example shown, angular orientation with respect to the Y (heading) axis corresponds to vehicle roll and with respect to the Z (vertical) axis corresponds to vehicle yaw. These orientations are commonly of interest in agricultural vehicles whereby this is the preferred mounting and orientation arrangement for such applications. The vehicle's roll most adversely affects GNSS-measured vehicle cross-track error. By measuring the vehicle's roll, such cross-track errors can be compensated for or eliminated. Such roll-induced cross-track errors include variable roll errors due to uneven terrain and constant roll errors due to hill slopes. It will be appreciated that adding a third antenna provides three-axis (XYZ) attitude solutions corresponding to pitch, roll, and yaw. Of course, reorienting the two-antenna system 402 can provide other attitude solutions. For example, locating the antennas' baseline (aligned with the rigid link 407) fore-and-aft along the vehicle's Y axis will provide pitch and yaw attitudes.

FIG. 7B shows the system 402 in a yaw attitude or condition whereby the vehicle 10 has deviated from a desired heading along the Y axis to an actual heading by a yaw angle $\theta_y$. In other words, the vehicle 10 has rotated (yawed) clockwise with respect to the Z axis. FIG. 7C shows the system 402 in a roll attitude or condition whereby the vehicle 10 has deviated from level to a tilt or roll angle of $\theta_R$. In other words, the vehicle 10 has rotated (rolled) counterclockwise with respect to the Y axis.

The system 402 includes roll and yaw gyros 430, 440 mounted and oriented for detecting vehicle rotational movement with respect to the Y and Z axes. The system 402 represents a typical strap-down implementation with the vehicle 10, antennas 405, 406 and gyros 430, 440 rigidly connected and moving together. A body-fixed coordinate system is thus defined with the three perpendicular axes XYZ.

In all but the most extreme farmlands, the vehicle 10 would normally deviate relatively little from level and horizontal, usually less than 30° in most agricultural operations. This simplifies the process of calibrating the gyros 430, 440 using the GNSS attitude system 402 consisting of two or more antennas 405, 406. For simplicity, it is assumed that the body-fixed axes XYZ remain relatively close to level. Thus, the change in the heading (yaw) angle $\theta_Y$ of FIG. 7B is approximately measured by the body-fixed yaw gyro 440, even though there may be some small discrepancy between the axes of rotation. Similar assumptions can be made for the roll angle $\theta_R$ (FIG. 7C), which is approximately measured by the body-fixed roll gyro 430. A similar assumption could be used for measuring pitch attitude or orientation angles with a pitch gyro.

This simplifying assumption allows the gyros to be decoupled from one another during integration and avoids the necessity of using a full strap-down quaternion implementation. For example, heading deviation is assigned only to the yaw gyro 440 (gyro axis perturbations from the assumed level axis alignment are ignored). Similarly, vehicle roll is assumed to be measured completely by a single roll gyro 430. GNSS attitude-measured heading and roll can then be used to calibrate the gyros 430, 440. Such simplifying assumptions tend to be relatively effective, particularly for agricultural operations on relatively flat, level terrain. Alternatively, a full six-degrees-of-freedom strap-down gyro implementation with quaternion integration could be employed, but such a solution would normally be excessive and represent an ineffective use of computing resources, unless an inertial navigation system (INS) was also being used to backup GNSS, for example, in the event of GNSS signal loss.

For the purpose of calibrating the gyroscopes 430, 440, the angles measured by the GNSS attitude system 402 are used as truth in a Kalman filter estimator of gyro bias and scale factor errors. Over a small interval of time, T, the following equation holds:

$$\bar{\theta}T = A\theta_{true} + BT$$

Where
$\bar{\theta}$ = average gyro reading over $$T = 1/n \sum_n \dot{\theta}_{gyro}$$

(with n readings taken over time T)
$\theta_{true}$ = truth angular change over interval T as measured by the GNSS attitude system.
A = gyro scale factor error
B = gyro rate bias error A two state Kalman filter is defined to have the gyro rate basis and scale factor error as states. The Kalman process model is a first-order Markov:

$$X_{k+1} = \begin{bmatrix} 1 & 0 \\ 0 & 1 \end{bmatrix} X_k + \begin{bmatrix} \sigma_A & 0 \\ 0 & \sigma_B \end{bmatrix} W_k$$

where the state vector X=[A B]
Here $\sigma_A$ and $\sigma_B$ are noise amplitudes and W is white noise. This dictates what is known as a random walk of the state [A B]. The designer of the Kalman filter chooses $\sigma_A$ and $\sigma_B$ according to how rapidly the bias and scale factor errors are expected to vary (usually variations due to temperature dependencies of scale and bias in a low cost gyro). Typical variations, especially of the scale factor, are quite small (A and B are nearly constant), and $\sigma_A$ and $\sigma_B$ are chosen accordingly. Typical values for a low-cost gyroscope, using a time interval T are:

$$\sigma_A = \frac{0.02T}{1200}, \sigma_B = \frac{T}{1200}$$

where T is expressed in seconds and 1200 means 1200 seconds. For example, here the random walk is chosen to cause a drift in scale factor of 0.02 in 1200 seconds. The Kalman measurement equation is:

$$y = Hx + v$$

Where
$y = \bar{\theta}_{gyro}T$, $H = [\theta_{true} \, T]$ and v is measurement noise. The Kalman covariance propagation and gain calculation is designed according to well-known techniques.

Similar Kalman filters are deployed in both yaw and roll (and/or pitch) channels. The GNSS attitude devices 20 provides a reference yaw and roll that act as the Kalman measurements enabling the calibration of gyro rate basis and scale factor errors. The GNSS device provides heading and roll, even when the vehicle is stationary or traveling in reverse. This provides a significant advantage over single-antenna systems which provide a vehicle direction only when moving (i.e., a velocity vector). The multi-antenna attitude device 20 enables continuous calibration regardless of whether or not and in what direction the vehicle 10 is moving.

The calibrated gyros 430, 440 are highly advantageous in a vehicle steering control system. High precision heading and heading-rate produced by the calibrated yaw gyro is a very accurate and instantaneous feedback to the control of vehicle changes in direction. The angular rate produced by the gyro is at least an order of magnitude more accurate than the angular rate produced by pure GNSS systems, even those with multiple antennas. The system 402 is also very responsive. The feedback control needs such relatively high accuracy and responsiveness in heading and heading-rate to maintain control loop stability. It is well known that rate feedback in a control loop enhances stability. On a farm vehicle, where vehicle dynamics may not be fully known or modeled, this aspect is particularly important. The rate term allows a generic control system to be developed which is fairly insensitive to un-modeled vehicle dynamics. A relatively accurate heading and heading-rate-of-turn can be calculated for use in a vehicle automatic steering system.

Figure 8:
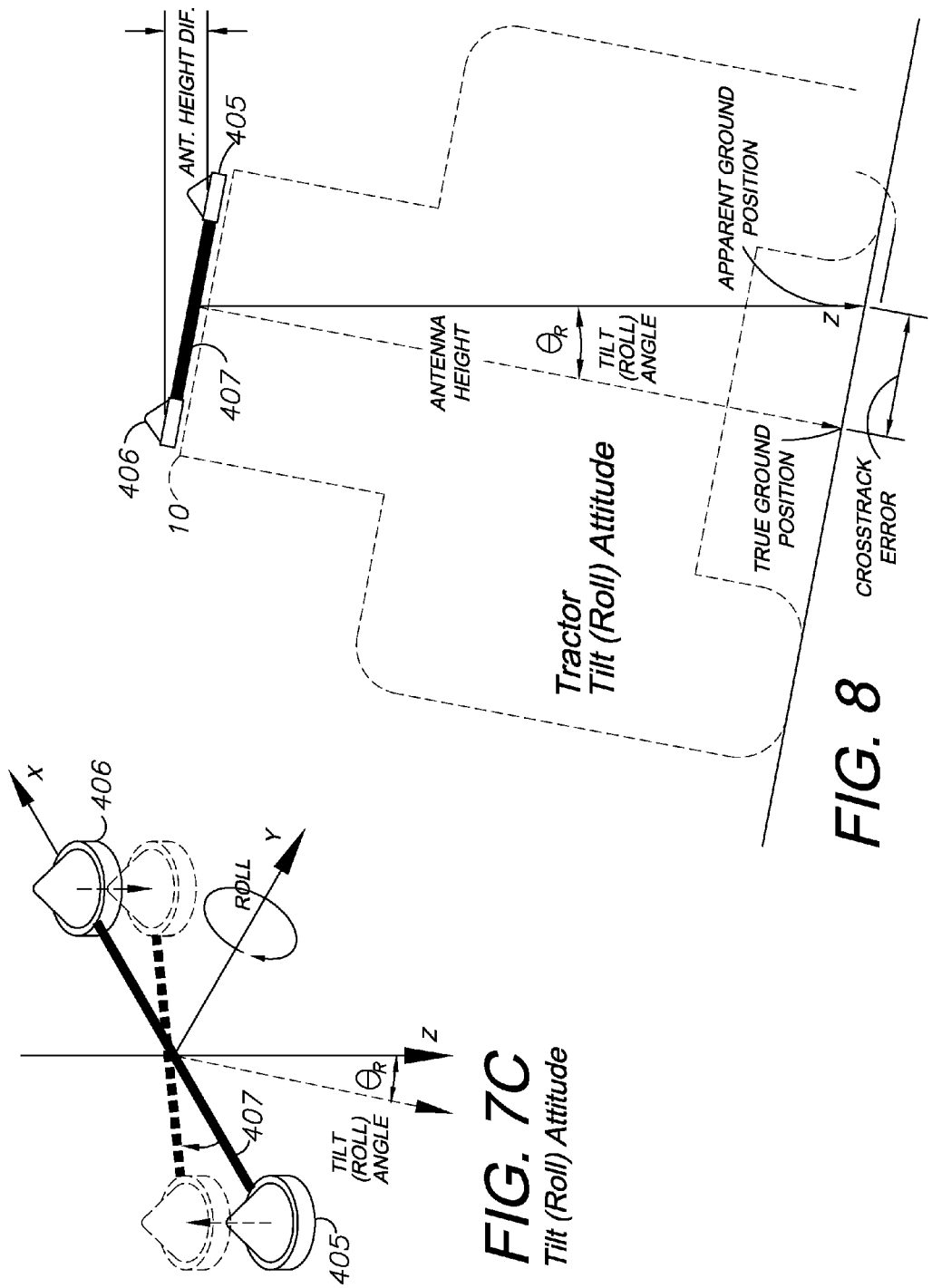
FIG. 8 is a diagrammatic end view of an agricultural vehicle and illustrates a tilt (roll) angle and cross track error measuring application of the invention.

Another advantage of the system 402 is that a gyro calibrated to measure tilt angle can provide the vehicle's tilt much more accurately than a system relying exclusively on GNSS positioning signals. This advantage is particularly important in high-precision autosteering, e.g., to the centimeter level. Errors in GNSS attitude are effectively increased by the ratio of the antenna spacing to the mounted height of the antennas above the ground, as illustrated in FIG. 8, which shows an attitude system 402 comprising a pair of antennas 405, 406 connected by a link 407, as described above. The system 402 is shown tilted through a tilt (roll) angle $\theta_R$. An imaginary antenna height line perpendicular to the rigid link 407 is projected to the "true" ground position of the vehicle 10 in FIG. 8 and forms the roll angle with respect to the Z axis. The relative antenna height differential can be projected along the vertical Z axis to a ground intercept point and establishes a cross-track error (distance between the vehicle true ground position and the Z axis ground intercept point), whereby errors in the antenna height differential are amplified by the ratio of the rigid link 407 length to the antenna height. The spacing of the antennas 405, 406, which corresponds to the length of the rigid link 407, is typically limited by the width of the vehicle 10, which can be relatively tall, thereby resulting in a relatively large antenna height-to-spacing ratio, e.g., five-to-one. Furthermore, noise-induced errors present in GNSS relative antenna height differentials (e.g., carrier phase noise, etc.) will be multiplied by this ratio, which can cause steering errors, including steering oscillations, etc.

The GNSS attitude system 402 utilizes a roll gyro (e.g., 430) for measuring rate-of-change of the roll angle, rather than the absolute roll angle, which rate of change is integrated to compute absolute roll angle. The constant of integration can be initialized to the current GNSS-derived roll angle and then subsequently steered to the GNSS roll angle by filtering with a Hatch filter or similar filter used for smoothing the code phase against the carrier phase in the GNSS receivers. Relatively smooth vehicle roll estimates can thus be achieved with a gyro.

More specifically, in an exemplary embodiment, the filtering is supplemented by the equation:

$$\theta_{filter}(k) = \Delta_{gyro}(k) + Gain*[\theta_{GNSS}(k) - \theta_{filter}(k-1) - \Delta_{gyro}(k)]$$

$$\Delta_{gyro}(k) = \theta_{gyro}(k) - \theta_{gyro}(k-1)$$

Where $\theta_{filter}$ (k) is the desired output roll angle (at time k) smoothed by gyro roll angle, but steered to GNSS roll angle. The GNSS roll (at time k) is $\theta_{GNSS}(k)$ while the raw gyro angular reading is $\theta_{gyro}(k)$ which is obtained by integrating gyro angular rate. The difference in gyro integrated rate over one time interval (k−1 to k) is denoted $\Delta_{gyro}(k)$. The filter bandwidth and weighting of the GNSS roll angle into the solution is set by the filter's gain (denoted Gain). One method to choose the gain is to assign Gain=T/τ where T is the time span from epoch to epoch and τ is a time-constant, typically much larger than T. The smaller the Gain, the less the GNSS roll angle is weighted into the solution. The gain is chosen to give a smooth filtered roll output, dominated by the low gyro noise characteristics, but also maintaining alignment with GNSS roll. Since the gyro is calibrated in terms of its scale and bias errors per the methods described earlier, the gain can be chosen to be very small (much less than 1) and still the filtered roll angle closely follows the GNSS roll angle, but without the noise of the GNSS derived roll angle. Similar schemes can be deployed for pitch and heading angles if needed, all with the benefit of improved steering if such angles are used in the steering control feedback.

Figure 9:
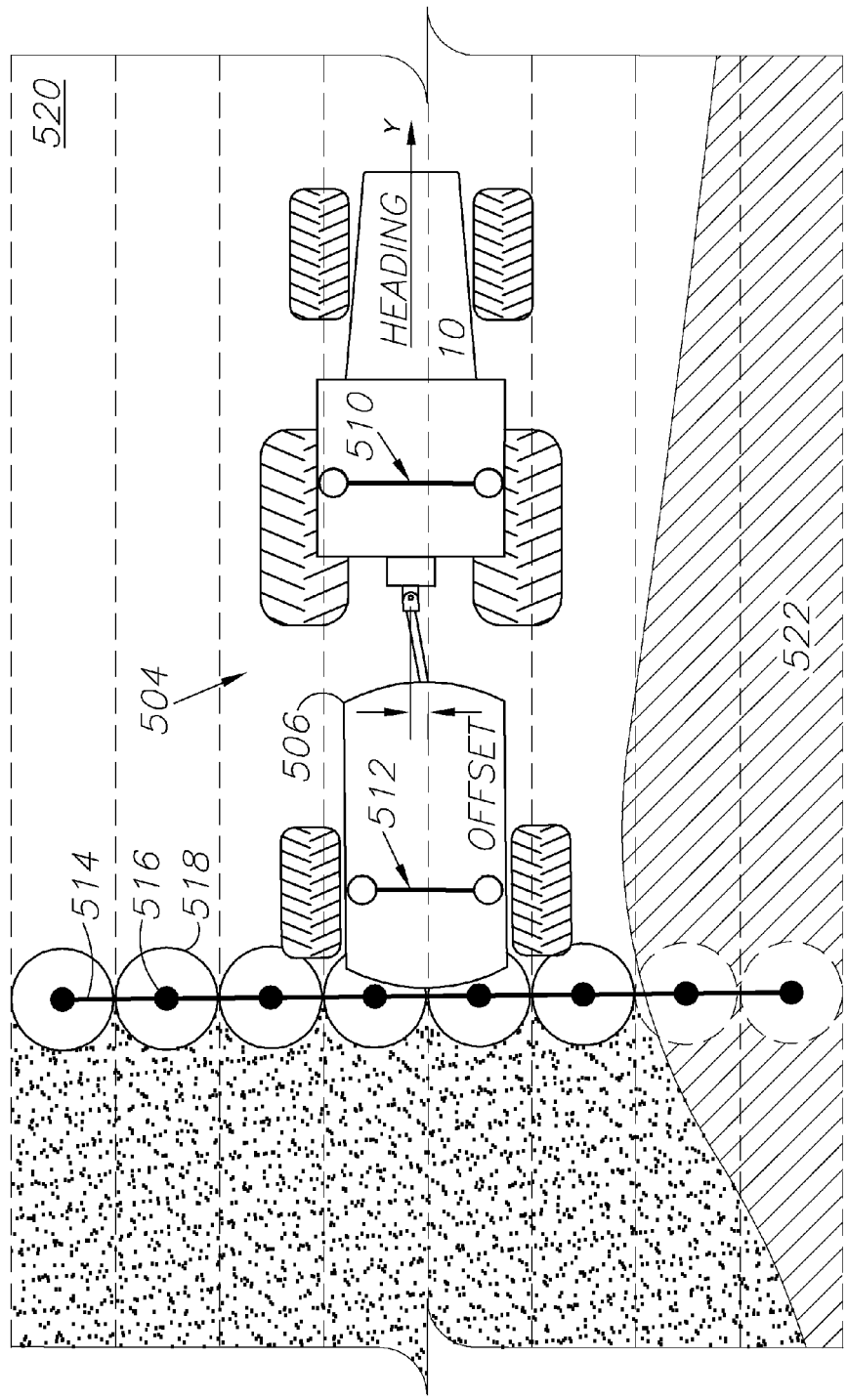
FIG. 9 is a diagrammatic plan view of a tractor and towed implement and depicts an alternative aspect of the system with antenna and gyroscope subsystems mounted on both the tractor and the implement, e.g. a sprayer with selectively controllable spray nozzles.
Figure 10:
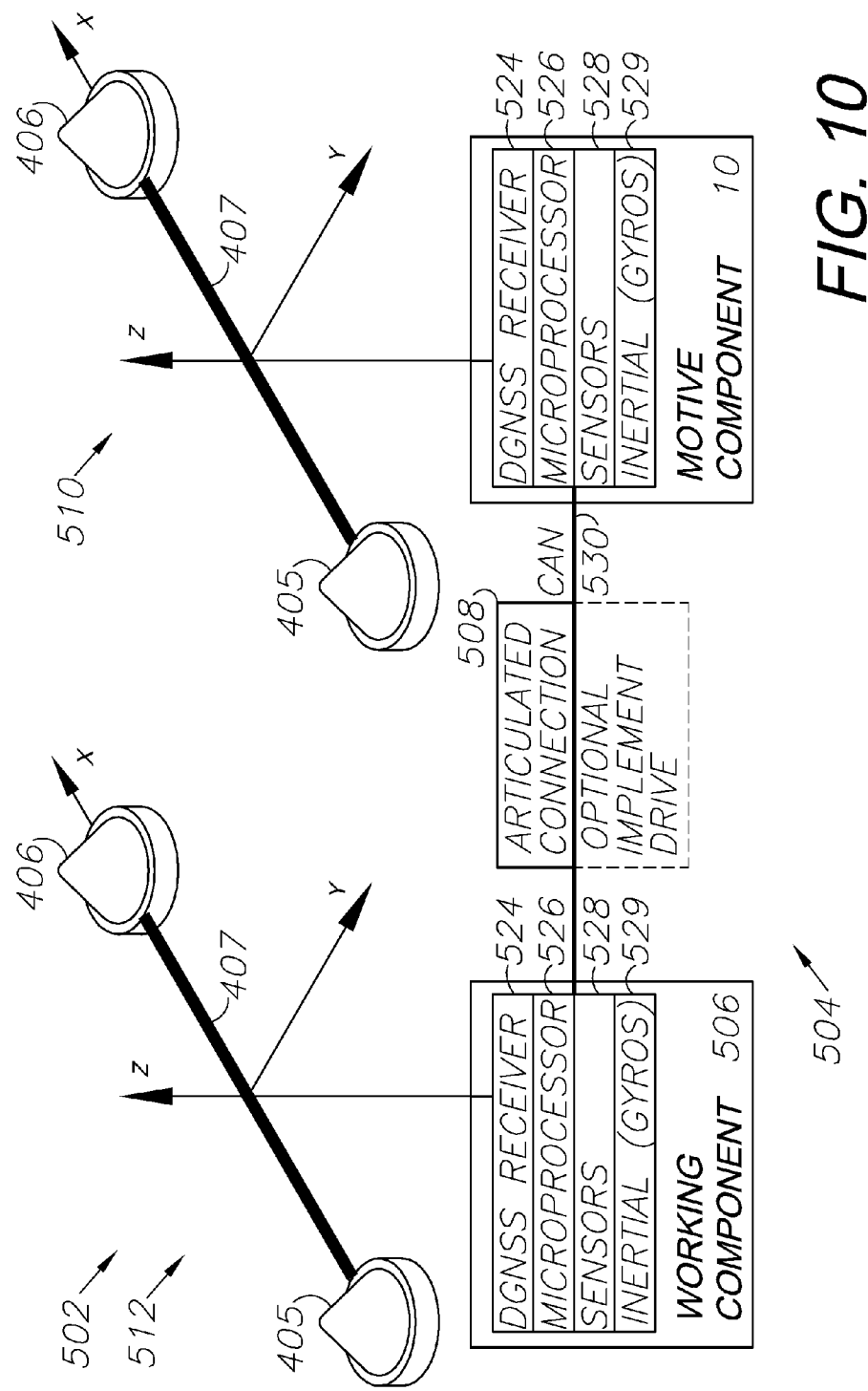
FIG. 10 is a block diagram illustrating components the system shown in FIG. 9.

FIGS. 9 and 10 show a GNSS and gyroscopic control system 502 comprising an alternative aspect of the present invention in a tractor and sprayer agricultural equipment application 504. The vehicle (e.g., a motive component or tractor) 10 is connected to a working component (e.g., a sprayer) 506 by an articulated connection 508, which can comprise a conventional tongue-and-hitch connection, or a powered, implement steering system or hitch, such as those shown in U.S. Pat. No. 6,865,465, No. 7,162,348 and No. 7,373,231, which are assigned to a common assignee herewith and are incorporated herein by reference.

The tractor 10 and the sprayer 506 mount respective tractor and sprayer GNSS antenna and gyroscope attitude subsystems 510, 512, which are similar to the system 402 described above and provide GNSS-derived position and attitude outputs, supplemented by gyro-derived rate of rotation outputs for integration by the control system 502. The sprayer 506 includes a spray boom 514 with multiple nozzles 516 providing spray patterns 518 as shown, which effectively cover a swath 520. The system 502 can be programmed for selectively controlling the nozzles 516. For example, a no-spray area 522 is shown in FIG. 9 and can comprise, for example, an area previously sprayed or an area requiring spray. Based on the location of the no-spray area 522 in relation to the spray boom 514, one or more of the nozzles 516 can be selectively turned on/off. Alternatively, selective controls can be provided for other equipment, such as agricultural planters wherein the seed boxes can be selectively turned on/off.

FIG. 10 shows some of the major components of the system 502, including the GNSS antenna and gyroscope attitude subsystems 510, 512 with antennas 405, 406 separated by rigid links 407, as described above, and inertial gyros 514. The tractor and implement 10, 506 can be equipped with comparable systems including DGNSS receivers 524, suitable microprocessors 526 and the inertial gyros 529. Additional sensors 528 can include wheel counters, wheel turn sensors, accelerometers, etc. The system components can be interconnected by a controller-area network or CAN connection 530. Alternatively, components can be wirelessly interconnected, e.g., with various types of RF transmitters and receivers or transceivers.

In operation, the functions described above can be implemented with the system 502, which has the additional advantage of providing GNSS and gyro-derived positioning and attitude signals independently from the tractor 10 and the implement 506. Such signals can be integrated by one or both of the microprocessors 526. The tractor 10 can be automatically steered accordingly whereby the implement 506 is maintained on course, with the additional feature of selective, automatic control of the nozzles 516. For example, FIG. 9 shows the course of the tractor 10 slightly offset to the course of the sprayer 516, which condition could be caused by a downward left-to-right field slope. Such sloping field conditions generate roll attitudes, which could also be compensated for as described above. For example, the system 502 can adjust the output from the spray nozzles 516 to compensate for such variable operating conditions as sloping terrain, turning rates, tire slippage, system responsiveness and field irregularities whereby the material is uniformly applied to the entire surface area of the field. Moreover, the GNSS-derived positioning and heading information can be compared to actual positioning and heading information derived from other sensors, including gyros, for further calibration.

IV. Multi-Antenna High Dynamic Roll Compensation and Rover L1 RTK

Figure 11:
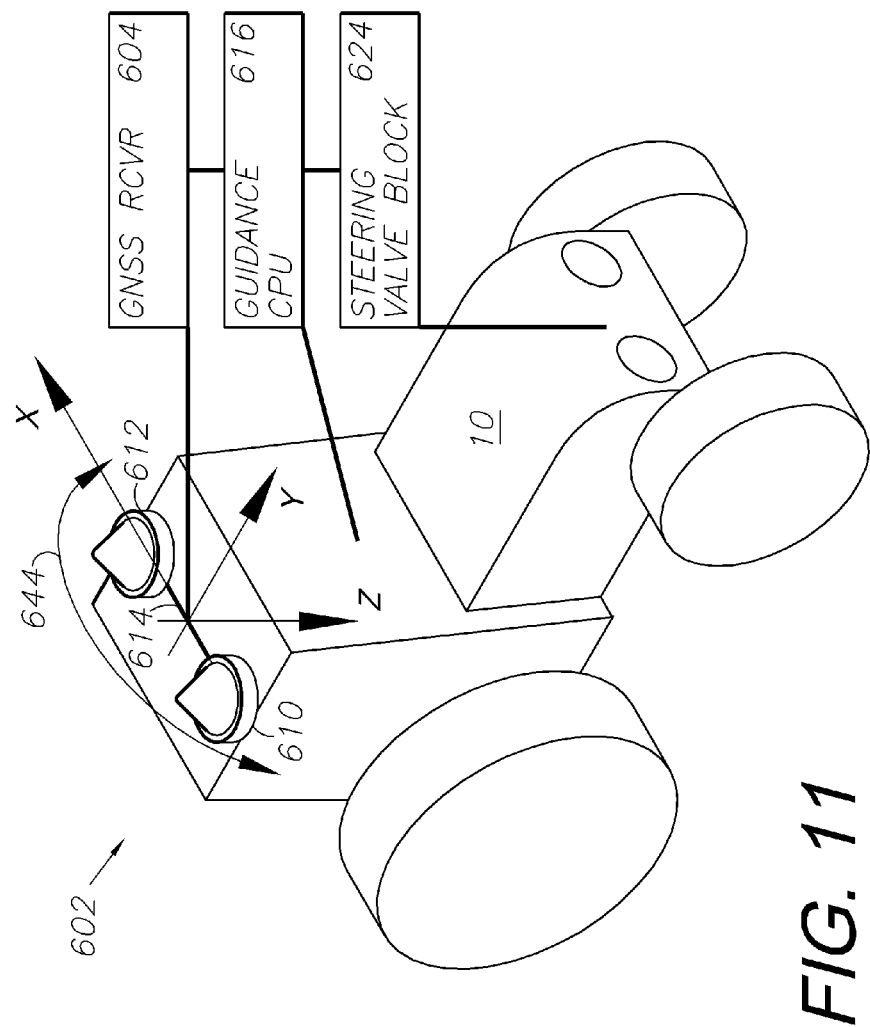
FIG. 11 is a diagrammatic perspective view which depicts a high dynamic roll compensation GNSS guidance system comprising an alternative aspect of the present invention.
Figure 12:
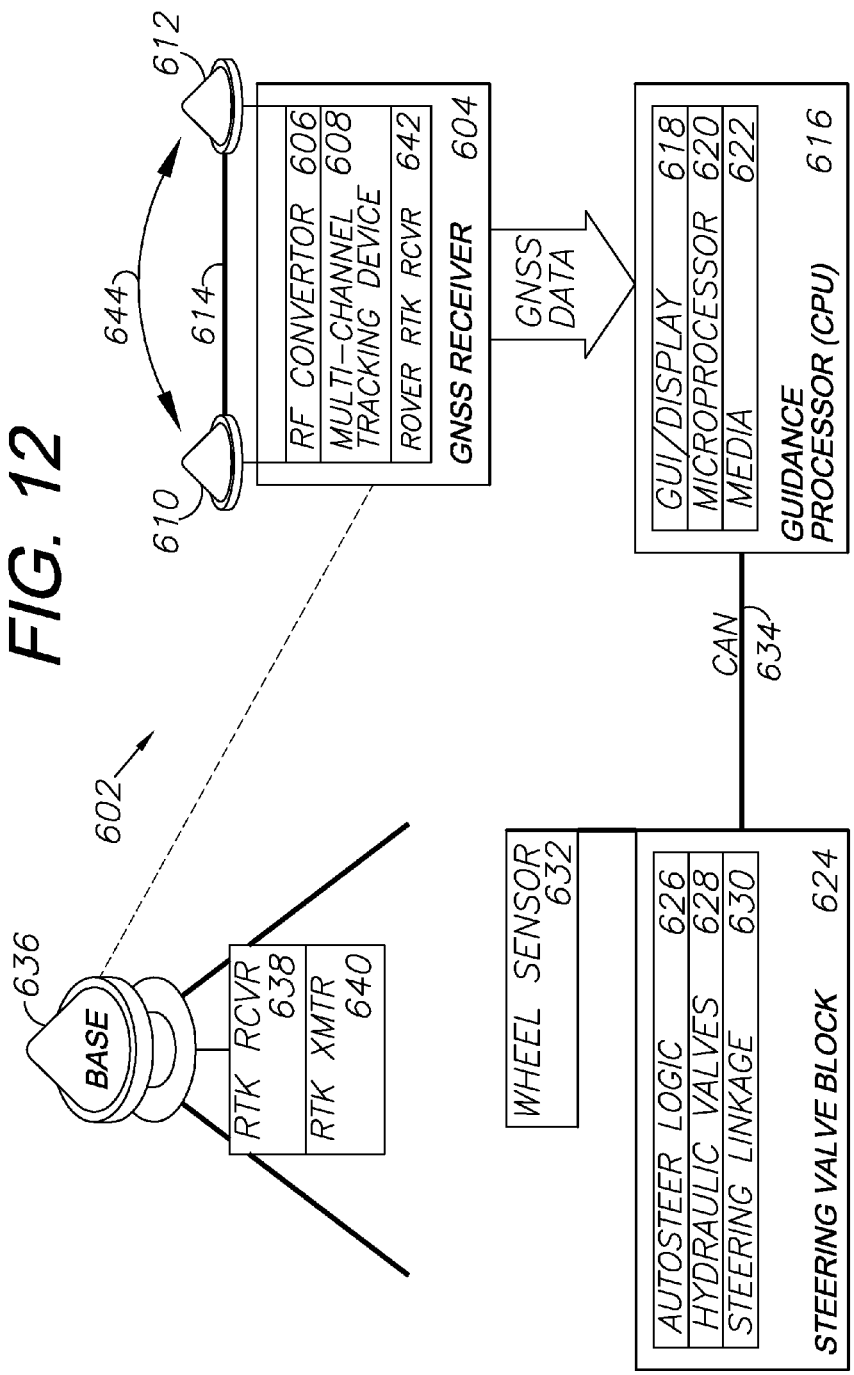
FIG. 12 a block diagram illustrating components of the system shown in FIG. 11.

Another alternative aspect GNSS guidance system 602 is shown in FIGS. 11 and 12 and provides high dynamic roll compensation, heading and rate-of-turn (ROT) in an RTK system including a GNSS receiver 604 including an RF converter 606 connected to a multi-channel tracking device 608 and first and second antennas 610, 612, which can be mounted on top of a vehicle 10 in fixed relation defining a transverse (X axis) fixed baseline 614. The receiver 604 provides a GNSS data output to a guidance processor (CPU) 616, which includes a GUI/display 618, a microprocessor 620 and media (e.g., for data storage) 622. A steering valve block 624 includes autosteer logic 626, hydraulic valves 628 and steering linkage 630. A wheel sensor 632 is connected to the steering valve block 624, which in turn is connected to the guidance processor 616 by a suitable CAN bus 634.

GNSS positioning signals are received from a constellation of GNSS satellites and an RTK base transceiver 636, which includes a receiver 638 and a transmitter 640 for transmitting carrier phase signals to a rover RTK receiver, such as the receiver 604. By using GNSS positioning signals from the satellites and correctional signals from the RTK base transceiver 636, the guidance system 602 can calculate a relatively accurate position relative to the base transceiver 636, which can be located at a predetermined position, such as a benchmark. The guidance system 602 described thus far is an RTK system utilizing a dual frequency receiver and is capable of achieving sub-centimeter accuracy using the carrier phase signals.

Roll compensation, heading, and rate of turn can all be calculated using vector-based heading (yaw and roll) information derived from the rover GNSS receiver 604. High-dynamic vehicle roll is a problem with certain applications, such as agricultural vehicles, which traverse uneven terrain and tend to be relatively tall with antennas mounted three meters or more above ground level. Antenna arrays can swing significant distances from side to side with vehicle roll, as indicated by a roll arrow 644. Such deviations can be detrimental to precision farming, and require compensation. The fixed-baseline vehicle antennas 610, 612 provide the necessary dynamic vector outputs for processing and compensation by the steering valve block 624. For example, the microprocessor 620 can be preprogrammed to instantly respond to such roll errors by providing counteracting output signals via the CAN bus 634 to autosteer logic 626, which controls the hydraulic valves 628 of the steering valve block 624. A slight delay phase shift can be programmed into the microprocessor 620, thus reflecting the inherent lag between vehicle roll and the steering system reaction. The delay phase shift can be adjustable and calibrated for accommodating different equipment configurations. The GNSS receiver 604 output provides relatively accurate guidance at slow speeds, through turns and in reverse without relying on sensing vehicle motion via an inertial navigation system (INS), utilizing gyroscopes and/or accelerometers. Moreover, the guidance system 602 can eliminate the calibration procedures normally needed for INS-corrected systems.

The system 602 can likewise provide high dynamic yaw compensation for oscillation about the vertical Z axis using the two-antenna fixed baseline configuration of the receiver 604. Adding a third antenna would enable high dynamic compensation with respect to all three axes XYZ e.g., in a six-degrees-of-freedom mode of operation.

Providing multiple antennas 610, 612 on a rover vehicle 10 can significantly improve the ability to resolve integer ambiguities by first obtaining an attitude solution by solving for the locations of the rover antennas 610, 612 with respect each other. Then, using the non-relative locations and the known relative ambiguities, solving for the global ambiguities using observations taken at each antenna 610, 612. The number of observations is thus significantly increased over conventional RTK. Solving the global ambiguities enables locating the rover antennas 610, 612 in a global sense relative to a base station 636. Using multiple antennas in this manner enables using L1 single frequency receivers, which tend to be less expensive than dual frequency (L1 and L2) receivers, as in conventional RTK systems. An exemplary method consists of:

1. Transmitting code and carrier phase data from a base station 636 to a multiple antenna rover system (e.g., 602).
2. At the rover 602 side, determining the relative locations and the relative ambiguities of the multiple antennas using an attitude solution taking advantage of known geometry constraints and/or a common clock. Such a method is disclosed in U.S. Pat. No. 7,388,539, which is assigned to a common assignee herewith and is incorporated herein by reference.
3. Optionally store off the attitude solution (locations and ambiguities) for later time-tag matching with the data from the base station 636. Optionally, also store off the current GNSS observations (carrier phase) for the same purpose. Although this step is not necessary, time tag matching of base and rover data improves results by avoiding extrapolation errors.
4. Form single or double difference equations and solve for the global ambiguities using knowledge of the relative antenna locations and/or common clocks and/or the relative ambiguities.

Example using a two-antenna rover system (e.g., 602):

At antenna 1 (e.g., 610) of the rover, we can write the equation $$R1=[A]x1-N1,$$

where R1 is a carrier phase observation vector (single or double difference) at antenna 1, A is a design matrix, X1 is the location vector of antenna 1 (may include clock if single differencing is used), and N1 is an ambiguity vector for antenna 1.

Similarly, at antenna 2 (e.g., 612) we can write $$R2=[A]x2-N2$$

Where R2 is a carrier phase observation vector at antenna 1, A is a design matrix, X2 is the location vector of antenna 2, and N2 is an ambiguity vector for antenna 2.

Note, that in this example, the design matrix A is taken to be the same in both antenna equations. But, this is true only if both antennas see the same satellites. A more general example would use separate A1 and A2 for the two equations.

Solving an attitude solution (for example, see U.S. Pat. No. 7,388,539), we find the relative antenna displacement V, and the relative ambiguity M where $$V=x2-x1$$

and $$M=N2-N1$$

Thus, combining the above equations, we have $$R1=[A]x1-N1$$

$$R2=[A](x1+V)-(N1+M)$$

Rearranging gives $$R1=[A]x1-N1$$

$$R2-[A]V+M=[A]x1-N1$$

And, combining into a single vector equations gives $$R=[A]x1-N$$

Where $$R=[R1,R2-[A]V+M]^T \text{ and } N=[N1,N1]^T$$

Where 'T' denotes transpose

Referring to the above example, twice as many equations are obtained for the same number of unknowns (e.g. X1 and N1). Solving for the global integer ambiguity N1 is facilitated by the multiple available equations.

Multiple antennas can also be utilized at the base and would provide the advantage of canceling multipath signals. However, multiple antennas on the rover are generally preferred because they provide attitude for the rover 10, which is generally not of concern for the base 636.

V. Moving Baseline Vehicle/Implement Guidance Systems

Alternative embodiment multiple-antenna GNSS guidance systems are shown in FIGS. 13-18 and utilize a moving baseline between a vehicle-mounted antenna(s) and an implement-mounted antenna. Independent implement steering can be accomplished with a powered, implement steering system or hitch, such as those shown in U.S. Pat. No. 6,865,465, No. 7,162,348 and No. 7,373,231, which are assigned to a common assignee herewith and are incorporated herein by reference.

Figure 13:
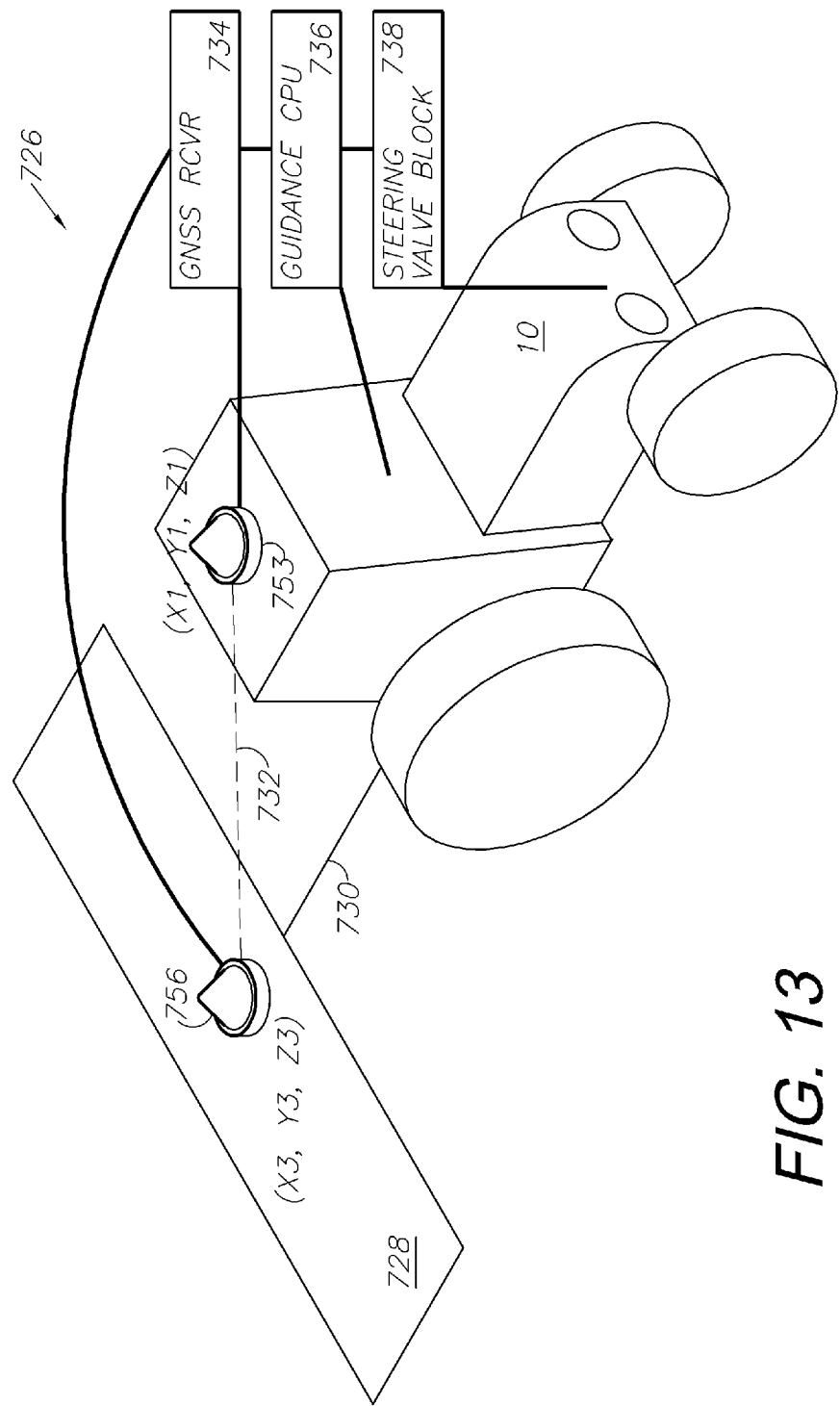
FIG. 13 is a diagrammatic perspective view of a tractor and implement and depicts an alternative aspect of the present invention comprising a moving baseline GNSS system with the tractor and the implement each mounting a respective antenna for a 1+1 antenna configuration.
Figure 14:
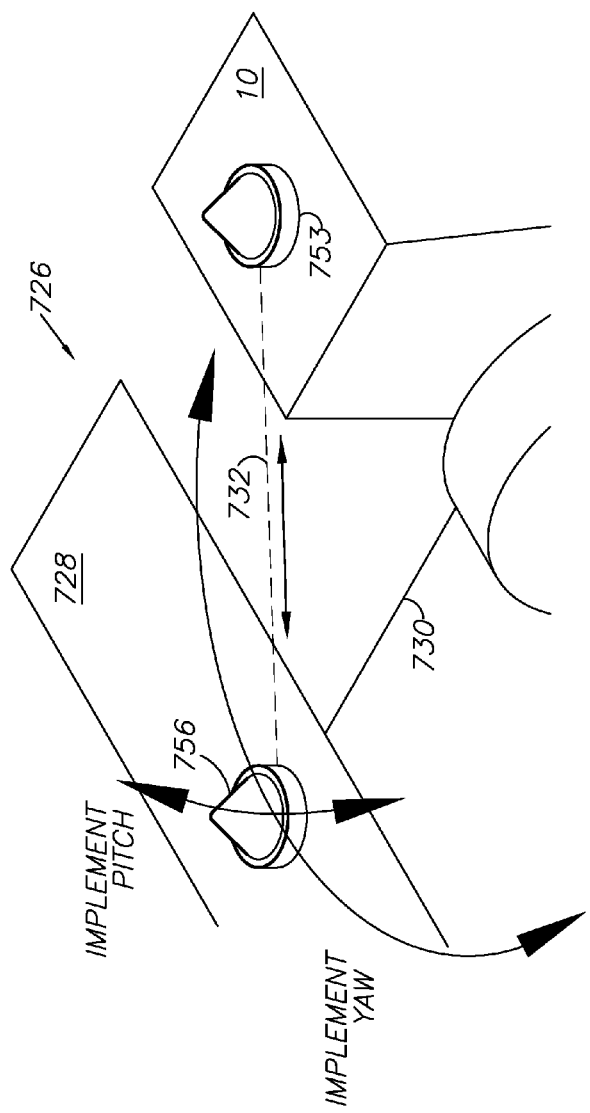
FIG. 14 is an enlarged fragmentary perspective view of the system shown in FIG. 13, particularly showing implement yaw and pitch movements in connection with the moving antenna-to-antenna baseline.

FIGS. 13-14 show a GNSS guidance system 726 comprising another modified embodiment of the present invention and including a vehicle 10 connected to an implement 728 by a hitch 730. The hitch 730 permits the implement 728 to move through three axes of movement relative to the vehicle 10 as the system 726 maneuvers and traverses ground with irregularities causing the vehicle 10 and the implement 728 to yaw, pitch, and roll somewhat independently of each other. A moving baseline 732 is defined between points on each, e.g., between a vehicle antenna 753 and an implement antenna 756. The moving baseline 732 is generally a 3D vector with variable length and direction, which can be derived from the differences between the vehicle antenna 753 location (X1, Y1, Z1) and the implement antenna location (X3, Y3, Z3), or other predetermined point locations on the vehicle 10 and the implement 728. The guidance system 726 includes a single GNSS receiver 734 (e.g., a single printed circuit board (PCB) receiver) receiving ranging data streams from the antennas 753, 756, which can include the normal front end RF downconverter components. Using the geodetic-defined position solutions for the antennas 753, 756, the moving baseline 732 is defined and used by a guidance CPU 736 in real-time for computing guidance solutions, which include steering command outputs to the steering valve block 738. The varying separation of the antennas 753, 756 occurs both at the start of attitude acquisition and during operation.

Figure 15:
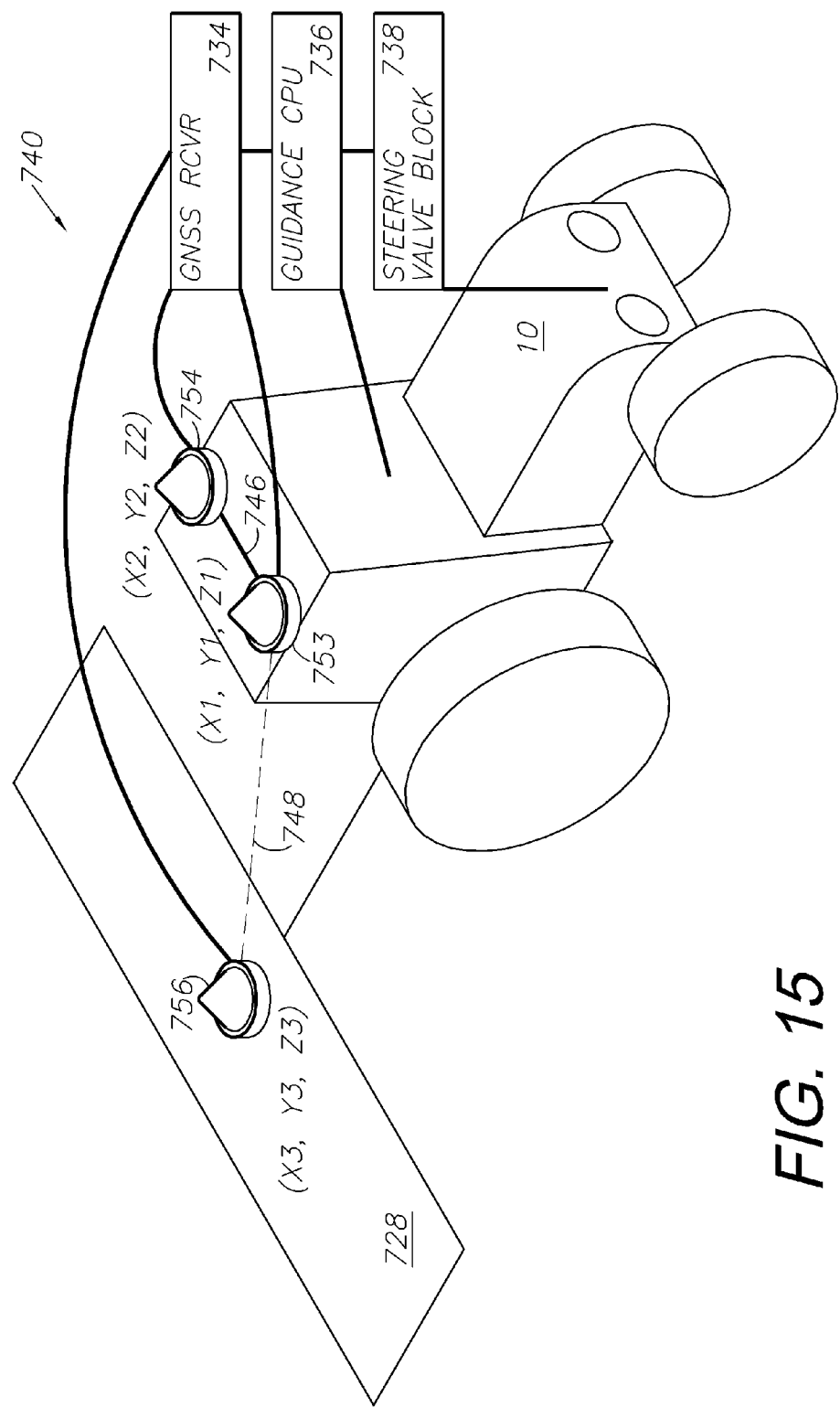
FIG. 15 is a view similar to FIG. 13 and depicts an alternative moving baseline aspect of the invention in a 2+1 antenna configuration.

FIG. 15 shows another alternative aspect vehicle/implement GNSS guidance system 740 with first and second vehicle antennas 753, 754, which can include front end down converter RF components providing ranging signal outputs, along with the implement antenna 756, to the single GNSS receiver 734 as described above. The vehicle antennas 753, 754 define a fixed baseline 754 by their respective positions (X1,Y1, Z1), (X2,Y2, Z2), which function to provide vector heading and rate-of-turn (ROT) output information. Such positioning data is input to the guidance CPU 736 by measuring yaw and roll attitudes whereby such guidance and performance information can be determined solely on GNSS-defined ranging data utilizing the fixed-relationship mounting of the vehicle antennas 753, 754 on the vehicle 10. Such information can be processed in connection with the implement antenna 756 position information in order to provide more complete GNSS positioning and guidance solutions, including travel paths for the vehicle 10 and the implement 728.

Figure 16:
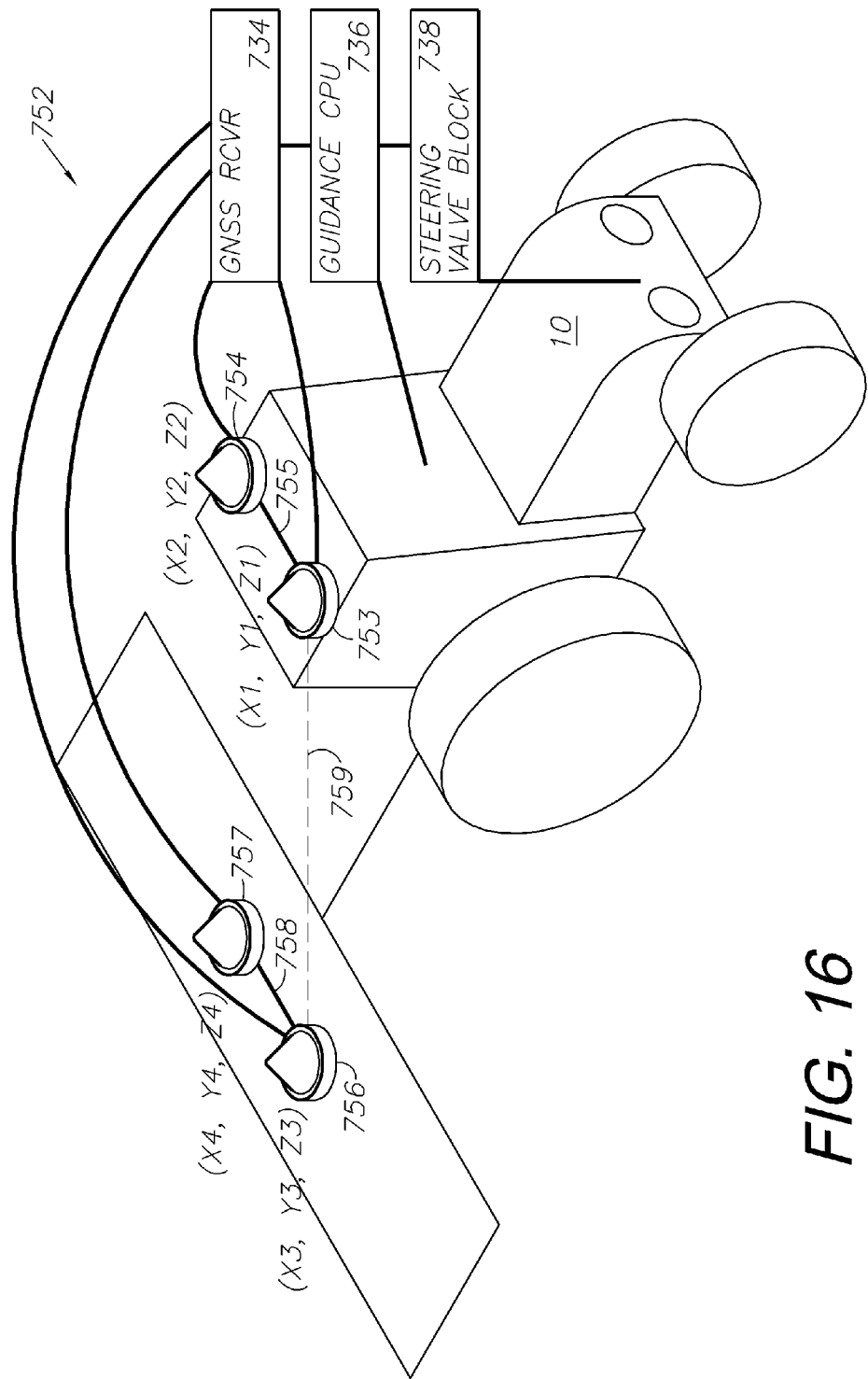
FIG. 16 is a view similar to FIG. 13 and depicts another alternative moving baseline aspect of the invention in a 2+2 antenna configuration.

FIG. 16 shows another modified aspect GNSS positioning system 752, which includes first and second vehicle antennas 753, 754 at GNSS-defined positions (X1, Y1, Z1), (X2, Y2, Z2) respectively, which positions define a vehicle fixed baseline 755. The implement 728 includes first and second implement antennas 756, 757 at GNSS-defined positions (X3, Y3, Z3), (X4, Y4, Z4) respectively, which define an implement fixed baseline 758 and from which the guidance CPU 736 determines heading and ROT for the implement 728 using similar vector techniques to those described above. A movable baseline 759 can be defined between a vehicle antenna 753 and an implement antenna 756 as shown, or between other corresponding antenna pairs, or other predetermined locations on the vehicle 10 and the implement 728. The system 752 utilizes a single GNSS receiver 734 receiving input ranging information from the four antennas 753, 754, 756, 757 and providing a single output stream to the guidance CPU 736. It will be appreciated that various other antenna/receiver combinations can be utilized. For example, a third vehicle and/or implement antenna can be provided for 3-axis attitude computation. INS components, such as gyroscopes and/or accelerometers, can also be utilized for additional guidance correction, although the systems described above can provide highly accurate guidance without such INS components, which have certain disadvantages.

Figure 17:
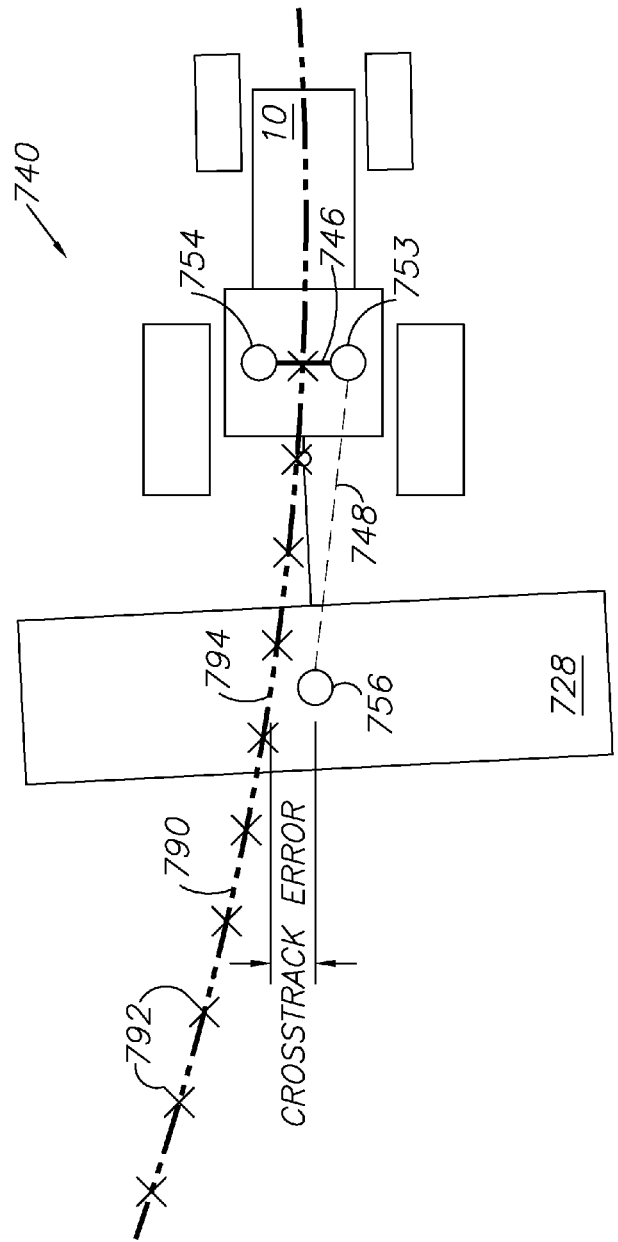
FIG. 17 is a diagrammatic plan view of a tractor and implement and depicts the 2+1 moving baseline system in a contour mode of operation with a multi-position tail.

FIG. 17 shows the 2+1 antenna system 740 operating in a guidance mode whereby a predetermined number of positions 790 at predetermined intervals are retained by the guidance CPU 736, thereby defining a multi-position "breadcrumb" tail 792 defining the most recent guidepath segment traversed by the vehicle 10 based on the locations of the vehicle antenna(s) 753 (754). Although the 2+1 antenna guidance system 740 is used as an example, the 1+1 antenna guidance system 726 and the 2+2 guidance system 752 can also be used in this mode and function in a similar manner, with more or less ranging signal sources. The guidance CPU 736 utilizes the retained tail "breadcrumb" positions 790 in conjunction with the GNSS-derived antenna locations for computing a crosstrack error representing implement 728 deviation from a desired guidepath 794, and the necessary steering signals for correcting the vehicle 10 course to maintain the implement 728 on track. Still further, in a multi-position tail 792 operating mode the high dynamic roll compensation function described above can be utilized to compensate for vehicle and/or implement roll using the fixed baseline(s) 746, 755, 758 for further guidance solution accuracy based solely on GNSS ranging information.

With the systems 726, 740 and 752, a single receiver can be used for achieving carrier phase relative accuracy, even without differential correction. A single clock associated with the receiver facilitates ambiguity resolution, as compared to dual receiver and dual clock systems. Direct connections among the components further enhance accuracy and facilitate high dynamic roll corrections, as described above. Continuous base and rover ranging data are available for positioning and control. With the 2+1 and the 2+2 configurations, the fixed baseline(s) provide heading and ROT guidance for the vehicle and/or the implement. Steering control for the vehicle is derived from crosstrack error computations utilizing the multi position tail 792.

Figure 18:
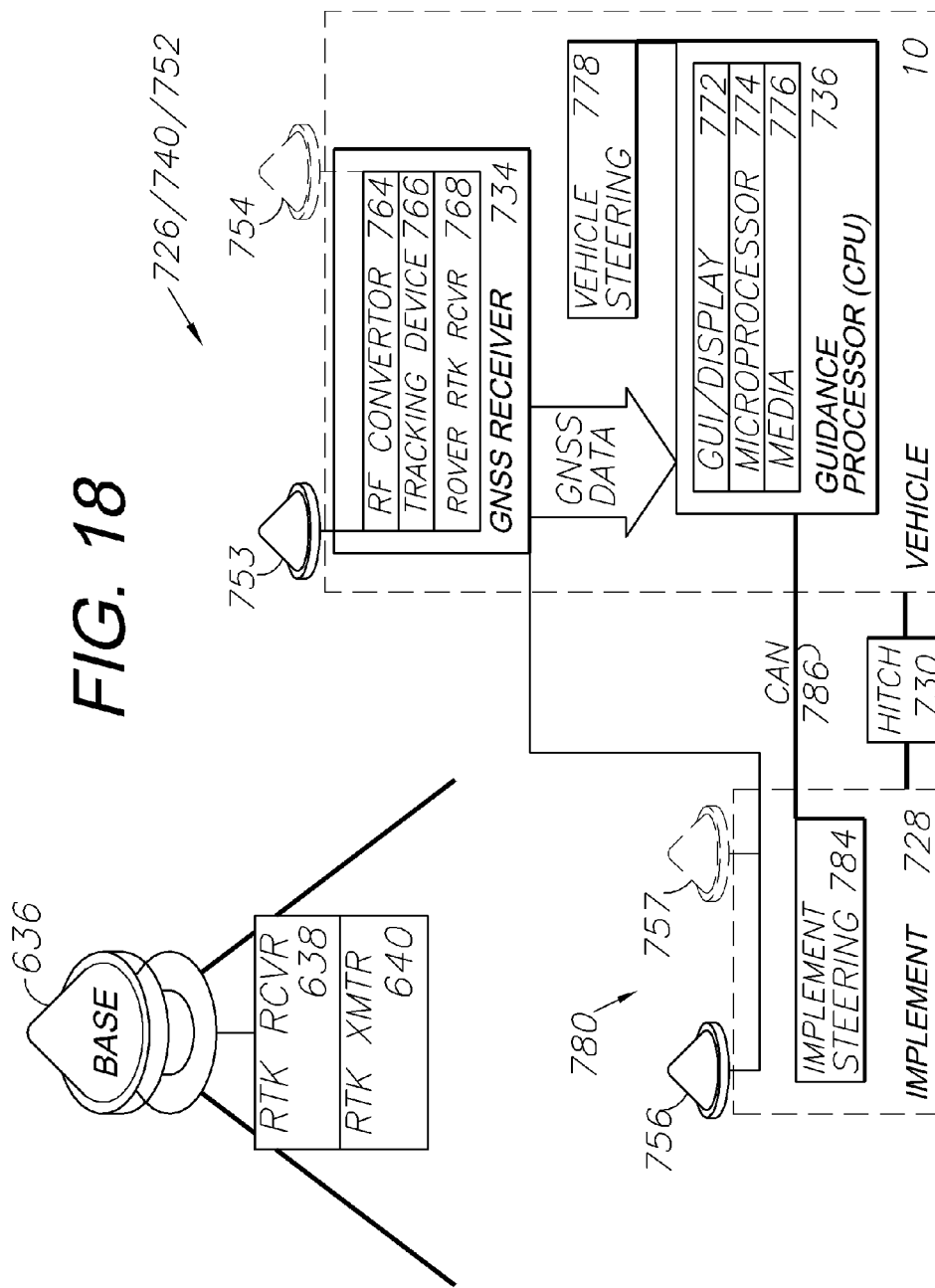
FIG. 18 a block diagram illustrating components of the moving baseline system(s).

FIG. 18 is a schematic block diagram showing the components of the GNSS guidance systems 726, 740 and 752. The vehicle 10 components include a GNSS receiver 734 including a first vehicle antenna 753, an optional second vehicle antenna 754, an RF down converter 764, a tracking device 766 and an optional rover RTK receiver 768. A guidance processor CPU 736 includes a GUI display 772, a microprocessor 774 and a media storage device 776. Vehicle steering 778 is connected to the guidance processor CPU 736 and receives steering commands therefrom. GNSS-derived data is transferred from the GNSS receiver 734 to the guidance processor CPU 736. The implement 728 mounts an implement positioning system 780 including a first implement antenna 756 and an optional second implement antenna 757, which are connected to the vehicle GNSS receiver 734 and provide GNSS data thereto. An implement steering subsystem 784 receives steering commands from the guidance processor CPU 736 via a CAN bus 786. The implement 728 is mechanically connected to the vehicle 10 by a hitch 788, which can be power-driven for active implement positioning in response to implement steering commands, or a conventional mechanical linkage. The hitch 788 can be provided with sensors for determining relative attitudes and orientations between the vehicle 10 and the implement 728.

VI. Multi-Vehicle GNSS Tracking Method

Figure 19:
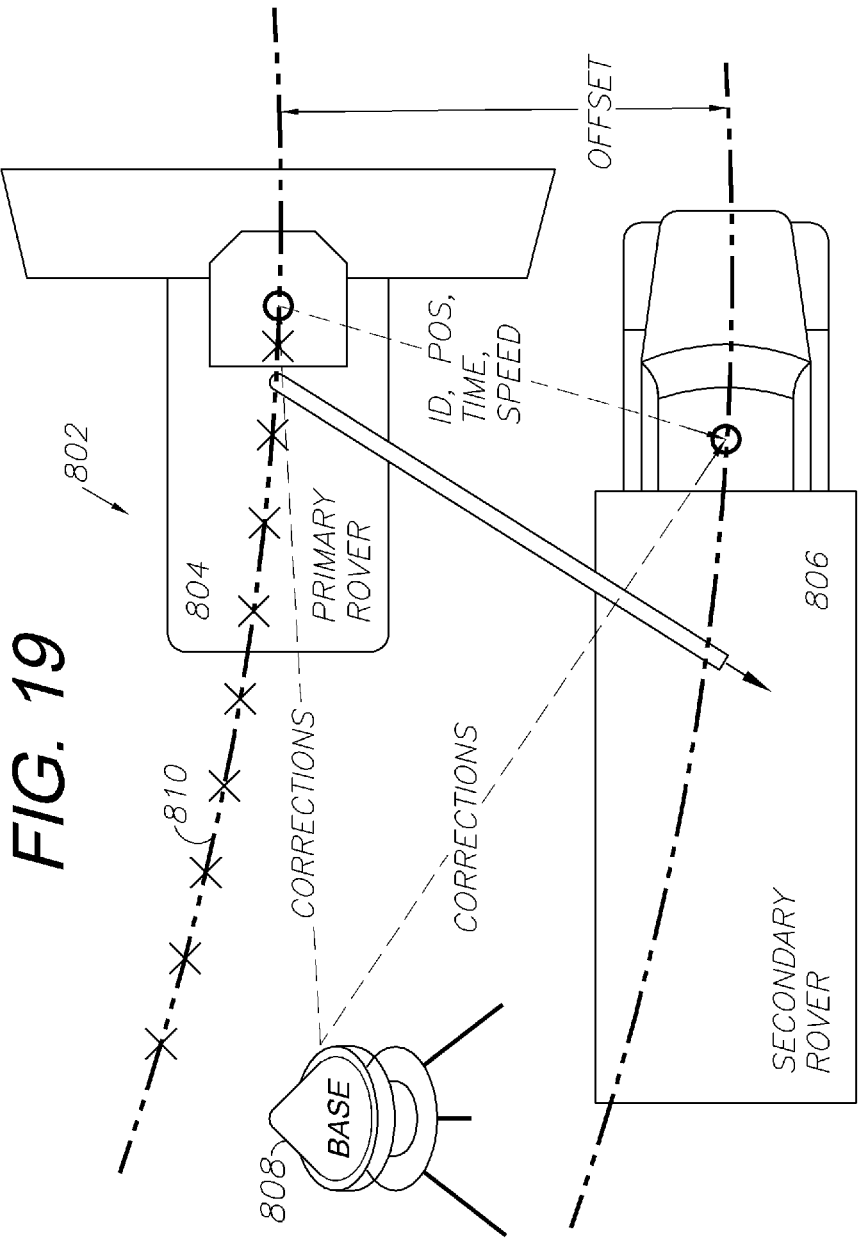
FIG. 19 is a diagrammatic plan view and depicts a multi-vehicle GNSS relative guidance system including primary and secondary rovers.

FIG. 19 shows a multi-vehicle GNSS tracking system 802 adapted for tracking primary and secondary rover vehicles 804, 806, which can comprise, for example, a combine and an offloading truck. Other exemplary multi-vehicle combinations include crop picking and harvesting equipment, snowplows, aircraft engaged in mid-air refueling, etc. Data transfer among the vehicles 804, 806 and a base transceiver 808 can be accomplished with short-range radio links, such as Bluetooth and Wi-Fi wireless technologies. For example, the base transceiver 808 can transmit corrections to the rovers 804, 806 at predetermined intervals of one second (i.e., 1 Hz).

Between the base transmissions the primary rover 804 can transmit its identifying information (ID) and GNSS-derived position and timing information to the secondary rover 806. The secondary rover 806 thus receives both differential corrections and the primary rover data over the same radio link, or through an additional radio link. Such data can comprise a multi-position tail 810 as described above and against which the secondary rover 806 can guide. For example, the secondary rover 806 can directly follow the primary rover 804 at a predetermined distance by aligning its travel path with the multi-position tail 810 at a predetermined following distance, or it can offset its own parallel travel path a predetermined offset distance, as shown in FIG. 19. The secondary rover 806 can position itself relative to the primary rover 804 based on either a predetermined time interval or a predetermined separation distance. As discussed above, the multi-position tail 810 can automatically update whereby only a predetermined number of detected positions are stored, which can correspond to a predetermined time duration or distance behind the primary rover 804.

Figure 20:
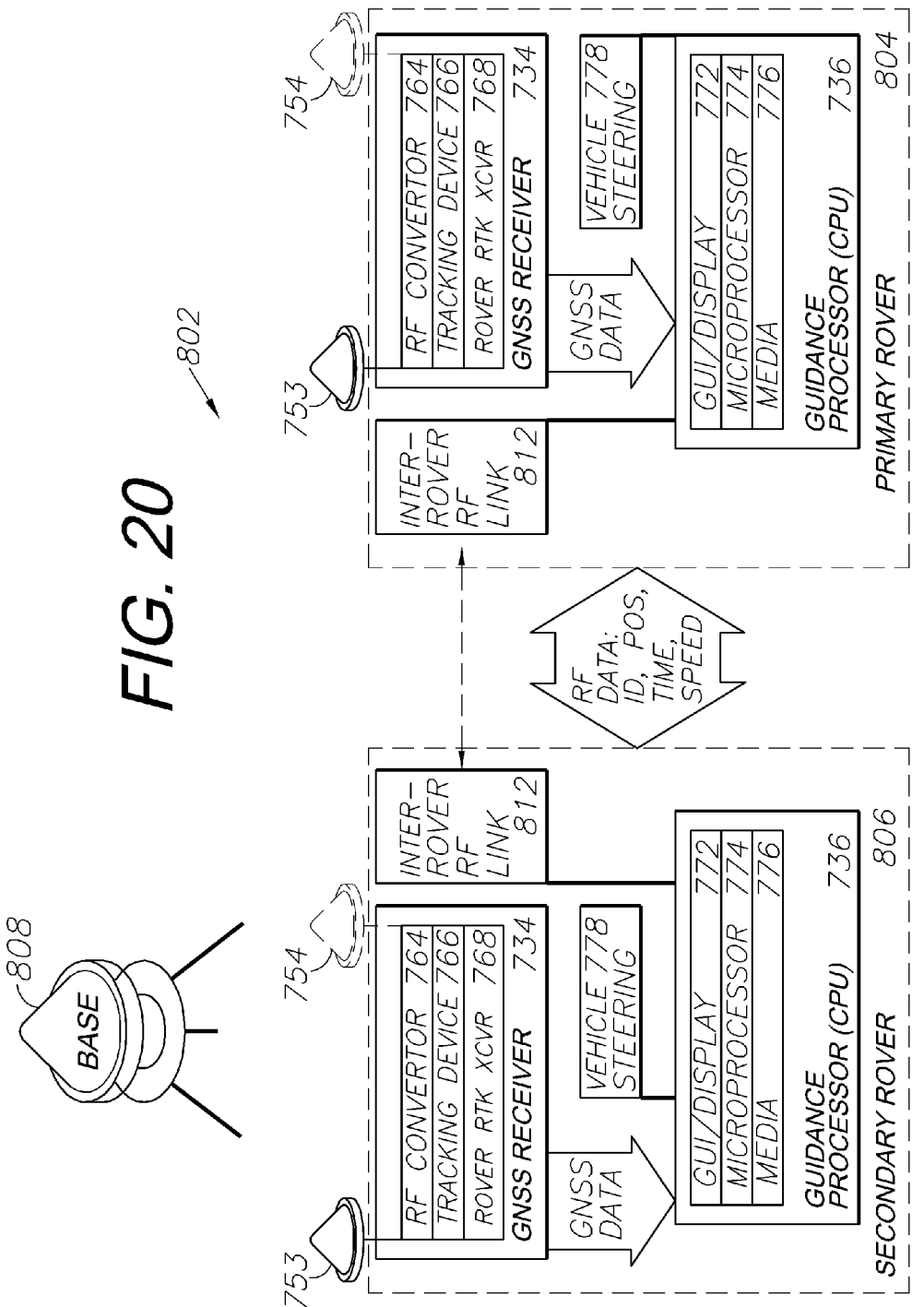
FIG. 20 is a block diagram and illustrates components of the system shown in FIG. 19.

FIG. 20 shows a schematic block diagram of components comprising the multi-vehicle tracking system 802. The onboard systems for the primary rover 804 and the secondary rover 806 can be similar to the vehicle-based GNSS guidance systems described above, with the addition of an inter-rover radio link 812.

VII. Alternative Embodiment Multi-Antenna System 902

Figure 21:
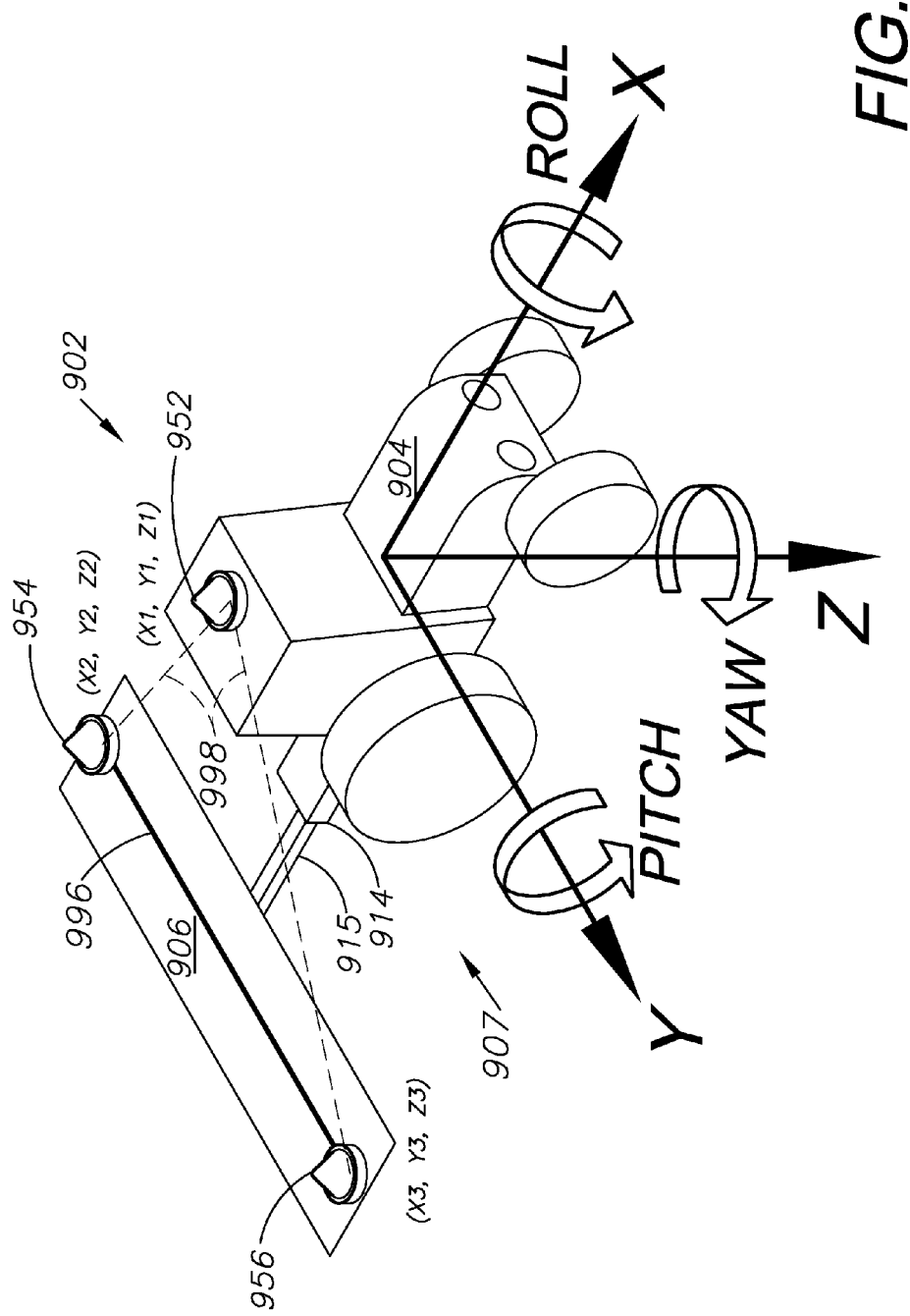
FIG. 21 is a diagrammatic perspective view of a tractor and implement equipped with a GNSS-based control system comprising another alternative embodiment of the present invention, and also depicts X, Y and Z axes corresponding to roll, pitch and yaw rotation respectively of the tractor.
Figure 22:
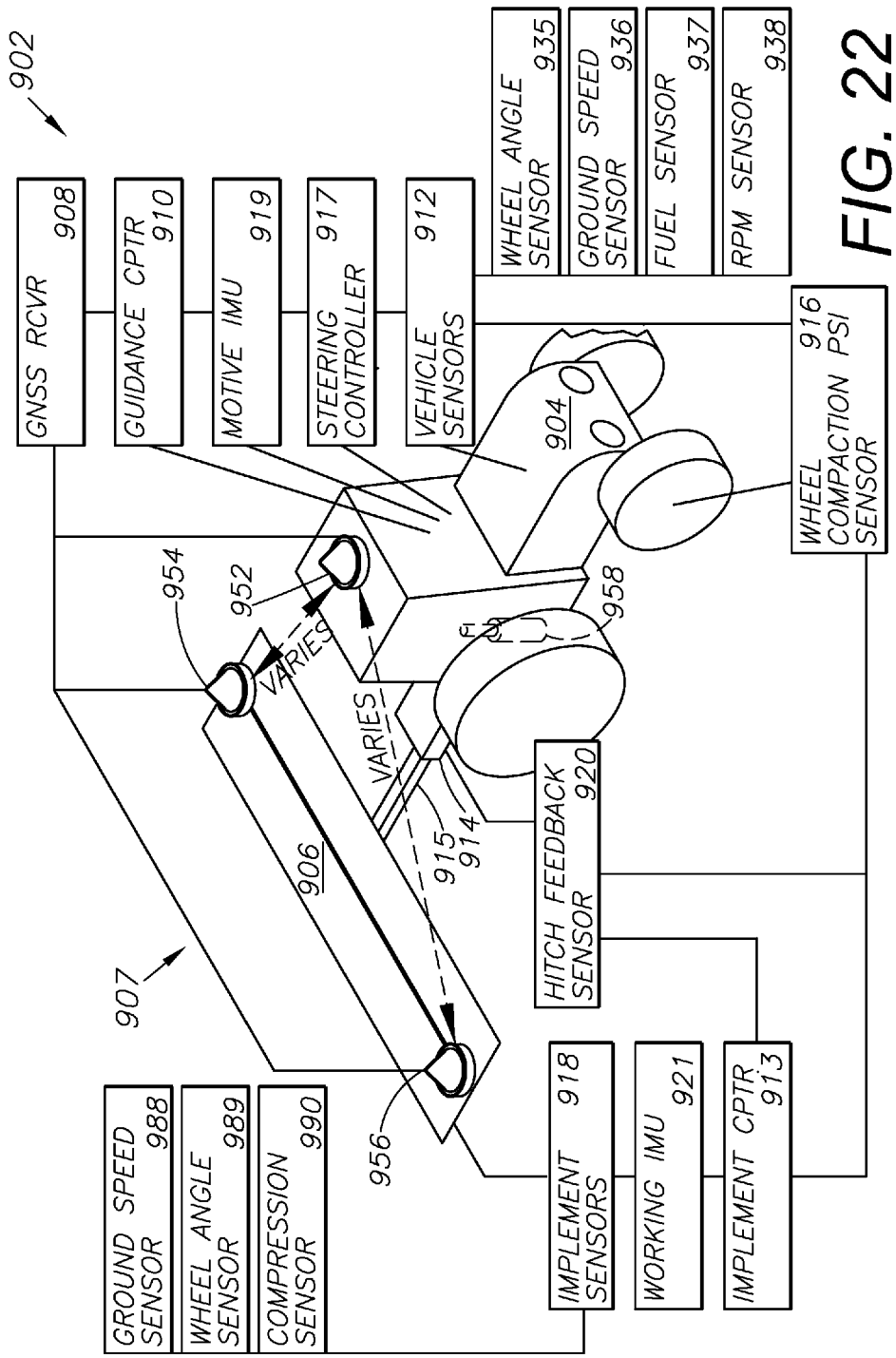
FIG. 22 is a diagrammatic perspective view of a tractor and implement in combination with a block diagram illustrating components of the control system of FIG. 21.

FIG. 21 shows a multi-antenna, GNSS-based guidance system 902 installed on a motive component 904, herein exemplified by a tractor, towing a working component 906, herein exemplified by a towed implement, and collectively comprising a vehicle 907. Without limitation, the vehicle 907 is configured for agricultural operations. However, the system 902 could also be used for guiding and controlling a wide range of vehicles, equipment and machines. For example, the system 902 could be applied to earth-moving equipment, examples of which are shown in U.S. patent application Ser. No. 12/857, 298, which is assigned to a common assignee herewith and is incorporated herein by reference. The motive and working components can be interconnected, articulated components of a piece of equipment, such as the base vehicle and boom assembly components of an excavator. Also shown are the three axes X, Y, and Z, and the positive directions of rotation about those axes, i.e., roll, pitch, and yaw respectively. Using three antennas 952, 954, 956, the GNSS guidance system 902 can track the motive component 904 and working component 906 in all six degrees of freedom and in relation to each other. The motive component 904 includes a motive component antenna 952, and the working component 906 includes first and second working component antennae 954, 956, i.e. a "1+2" configuration. Other tractor/implement antenna combinations could also be used, such as 2+2. This transfers not only positional information to a GNSS guidance computer 910, but also data on the slope of the earth below the vehicle 907 and whether the working component 906 is traveling laterally ("offset") compared with the motive component 904, indicating a sliding motion and crosstrack displacement. In FIGS. 21 and 22 the antennas 952, 954, 956 are shown in "normal" positions with the working component 906 aligned with and positioned directly behind the motive component 904. The distances between the working component antennas and the motive component antenna can vary depending on the relative orientations of either the motive component 904 or the working component 906, or both.

Figure 24:
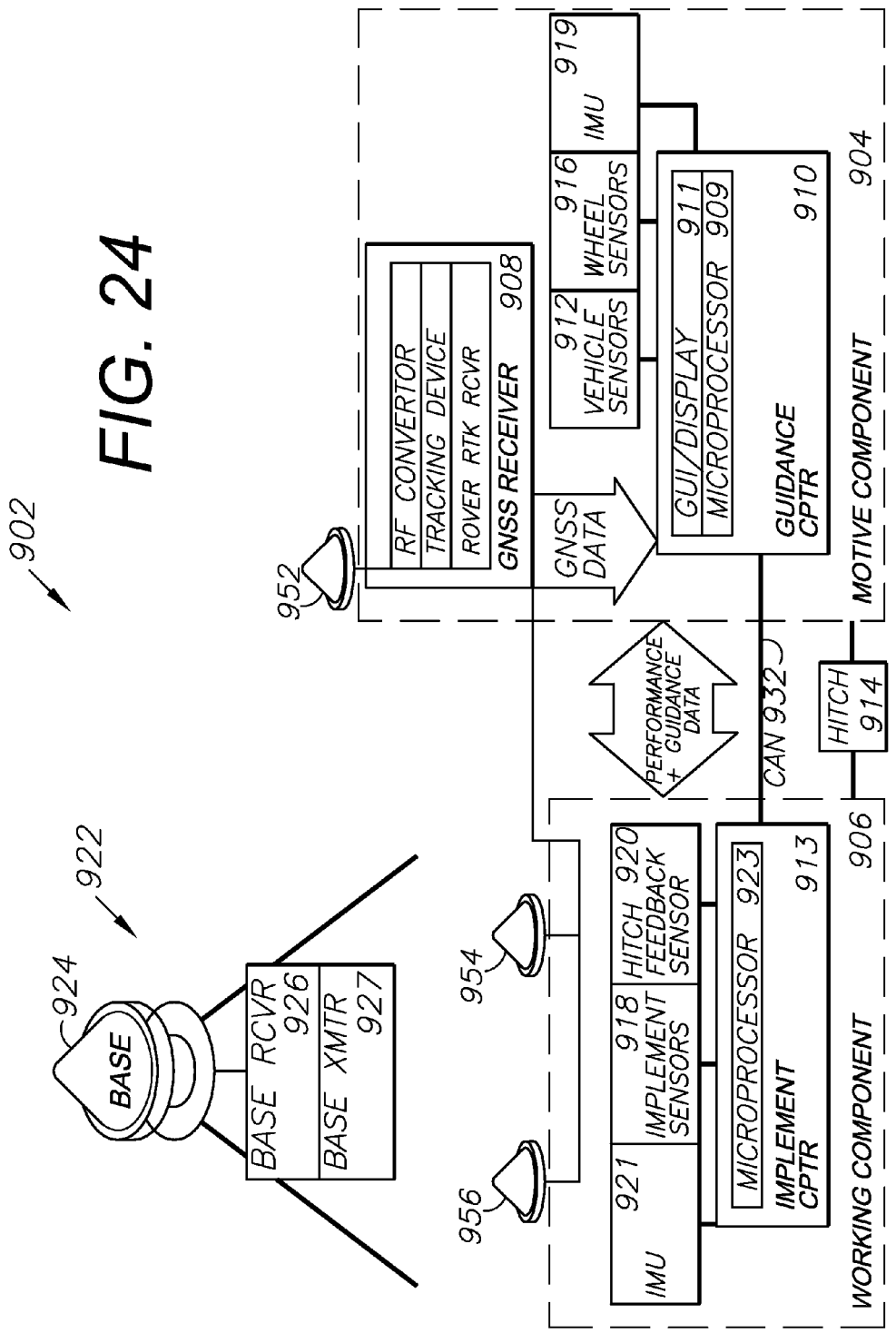
FIG. 24 is a block diagram of the guidance system of FIGS. 23A-23C.

FIG. 22 shows the motive component 904 towing the working component 906 with an articulated hitch 914 and a tongue 915, and the various attached sensors and systems which create an embodiment of the guidance path memory system 902. The GNSS system includes the antennas 952, 954, 956, a GNSS receiver 908, a guidance computer 910 including a microprocessor/CPU 909, a working component computer 913 including a microprocessor/CPU 923 and a graphical user interface (GUI) 911. This embodiment of the present invention uses differential GNSS (DGNSS) by using a base station 922 located generally in the vicinity of the work to be performed (FIG. 24). The base station 922 includes an antenna 924, a base receiver 926 and a base transmitter 927. The base and rover configuration is similar to other differential (DGNSS) guidance systems, such as the Outback S Series produced by Hemisphere GPS LLC of Calgary, Canada. The GNSS components are preferably configured to use carrier phase GNSS signals with a base-and-rover receiver combination, which is generally referred to as real-time kinematic (RTK). See U.S. Pat. No. 6,469,663, which is incorporated herein by reference. The guidance system 902 will track the three-dimensional position of the motive component 904 and the working component 906, along with the roll, pitch, and yaw (collectively attitude) of the motive component 904 and the working component 906, both independently and relative to each other. Additionally, the GNSS system 902 will determine the heading of the motive component 904, and will detect when the working component 906 is facing a different heading from the motive component 904 or if the working component 906 is moving laterally compared with the motive component 904, inferring that the working component 906 may have become misaligned due to a bump in the path or because the path is along a slope.

Figure 25:
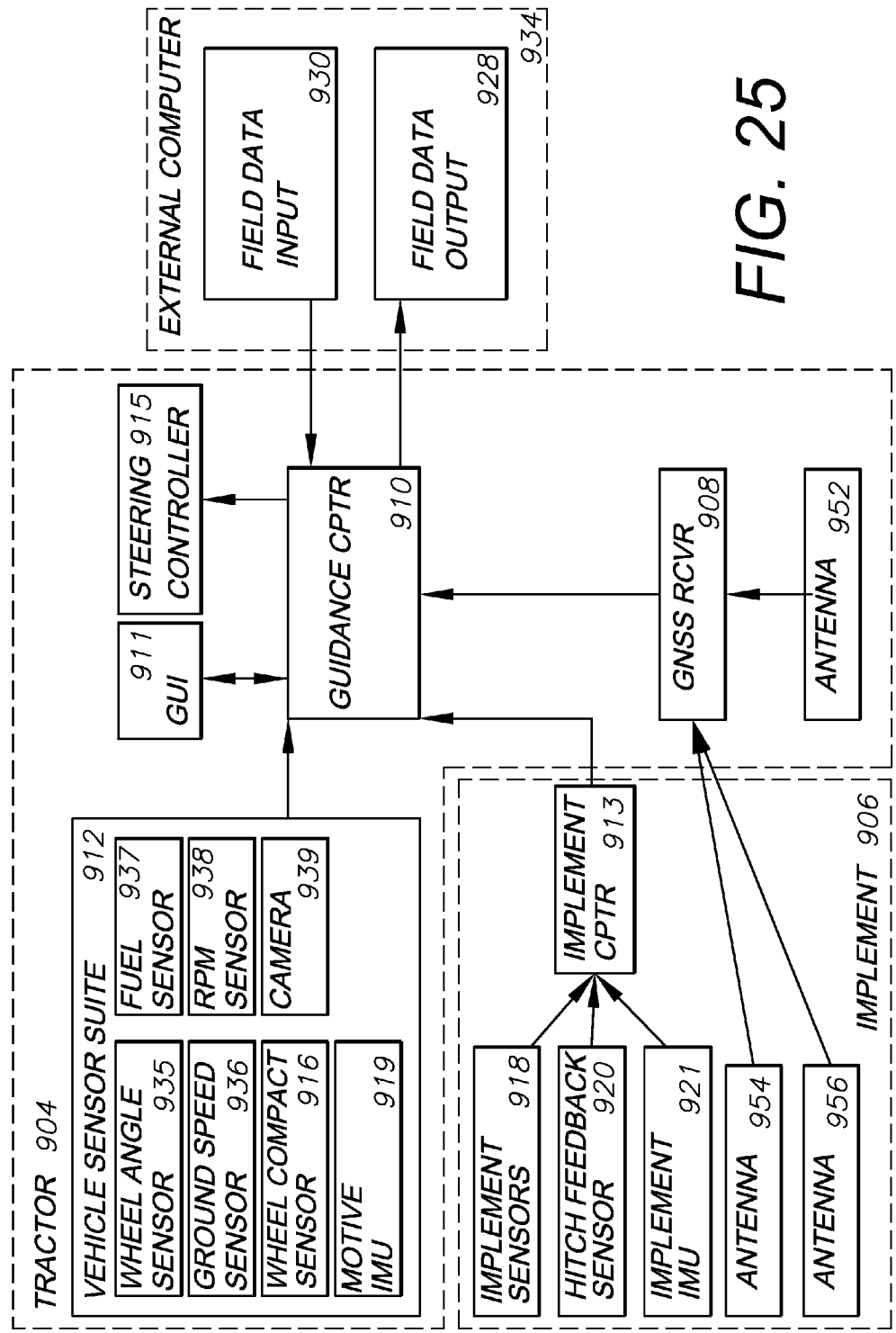
FIG. 25 flow diagram illustrating the flow of data among the various vehicle control system components of the system of FIG. 24.

Also shown in FIGS. 22, 24 and 25 are several sensor devices for detecting other vehicle parameter values. These sensors include various vehicle sensors 912, a wheel compaction PSI sensor 916, a hitch feedback sensor 920, and various working component sensors 918. The various vehicle sensors 912 include a motive component wheel angle sensor 935, ground speed sensor 936, fuel sensor 937, RPM sensor 938, and various other optional sensors that detect variables of vehicle performance and may enhance the information received about the terrain being driven over. The various working component sensors 918 include a ground speed sensor 988, a working component wheel angle sensor 989, and compression sensors 990 for determining the amount of soil being compressed similar to the wheel compaction PSI sensor 916. The information harvested from these various sensors is taken and combined with the positional data received by the GNSS system 902, and finally computed by the guidance computer 910. The information is output to an external computer 934, as shown in FIG. 25, where it can be analyzed and future pre-planned paths can be designed based on the data gathered during the field pass.

Alternatively, the guidance computer 910 could calculate and modify its own stored, pre-planned path based on the gathered data and programmed functions for dealing with different field conditions. The guidance computer 910 can be pre-programmed to adapt to field conditions in different ways depending on the circumstances. For example, the microprocessor 909 can be programmed to instruct an articulated hitch 914 that is included with an optional motorized component, such as the device covered by previously mentioned and incorporated U.S. Pat. No. 7,162,348, to adjust the position of the working component 906 relative to the motive component 904 depending on the severity of the slope as the vehicle 907 is traversing that slope. The computer 910 will update commands to the hitch 914 as data is reported by working component and motive component gyro sensors 921, 919 and other relevant sensors for detecting a change in pitch or roll. All of this can be performed in real time as data is reported to the guidance computer 910. The concept of real-time, pre-planned path modification for the present invention follows similar techniques as described in U.S. Patent Publication No. 2007/0021913, which is assigned to a common assignee herewith and incorporated herein by reference.

Also located on the motive component 904 is a steering controller 917 receiving steering commands from the guidance computer 910 and applying them to the motive component 904, steering it around the field. The guidance computer 910 also controls the power settings of the motive component 904, reducing or increasing speed, and optionally controls other vehicle 907 operations, e.g., adjusting the stiffness of shock absorbing components via adjustable hydraulic shock absorbers 958. A controller for controlling the amount of shock absorbed by the hydraulic shock absorbers 958 can be connected directly to and controlled by the guidance computer 910. This will allow the vehicle to increase the resistance of the shock absorbers 958 prior to the vehicle traversing a particularly rough terrain, or decrease their resistance for softer terrain, depending on performance desired from the vehicle 907. Similarly, other elements of the vehicle can be controlled in this way, which will lead to increased vehicle performance and control.

The use of a moving baseline 998 between at least three antennas 952, 954, 956, with two antennas located on the working component 906 and at least one on the motive component 904, allows the guidance system 902 to track the position of the working component relative to the motive component. The working component 906 may actually roll in one direction while the motive component 904 rolls in the opposite direction. Including additional data provided by a motive component inertial measurement unit (IMU) 919 and a working component IMU 921 allows the guidance computer 910 to distinguish yaw, pitch, and roll movement of the working component 906 relative to yaw, pitch, and roll movement of the motive component 904. Because the working component 906 is doing the actual work in a field, it is important to ensure that the working component 904 is being properly guided and aligned relative to the motive component 906. The use of an optional motorized hitch 914, as mentioned above, allows the guidance computer 910 to readjust and realign the working component 906 if the guidance system detects that it is no longer properly aligned. This optional aspect is further discussed in the previously mentioned and referenced U.S. Patent Publication No. 2009/0164067.

Figure 23A:
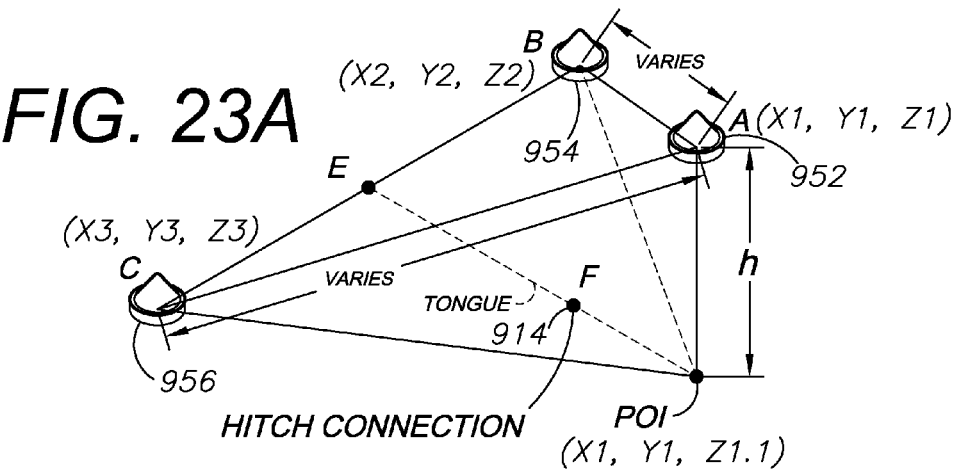
FIG. 23A is a diagrammatic perspective view showing relative locations of a tractor-mounted antenna and two implement-mounted antennas thereof, with the implement directly in line behind the tractor.

FIG. 23A demonstrates the relationship among the three antennas' 952, 954, 956 positions. Using basic trigonometric equations, unknown distances between antenna pairs can be solved and used by the guidance computer 910 to recalculate driving directions. The motive component antenna 952 location is denoted by A. The working component antennas B (954) and C (956) are located a fixed distance BC away from each other. The point where the hitch 914 pivots, allowing the working component 906 to rotate independent from the motive component 904, is at point F. The pivot arm is alternatively labeled the tongue 915. A point-of-interest (POI) directly below the motive component-mounted antenna. Point E is a point directly between the two working component-mounted antennas 954, 956.

The known distances include the distance between the working component-mounted antennas (BC) and the height (H) of the motive component-mounted antenna 952 above the working component-mounted antennas 954, 956. When the working component is directly behind the motive component, as depicted in FIG. 23A, and points B and C are at approximately the elevation of the point of interest (POI), several right-isosceles triangles are formed and the distances among the antennas can be computed.

Figure 23B:
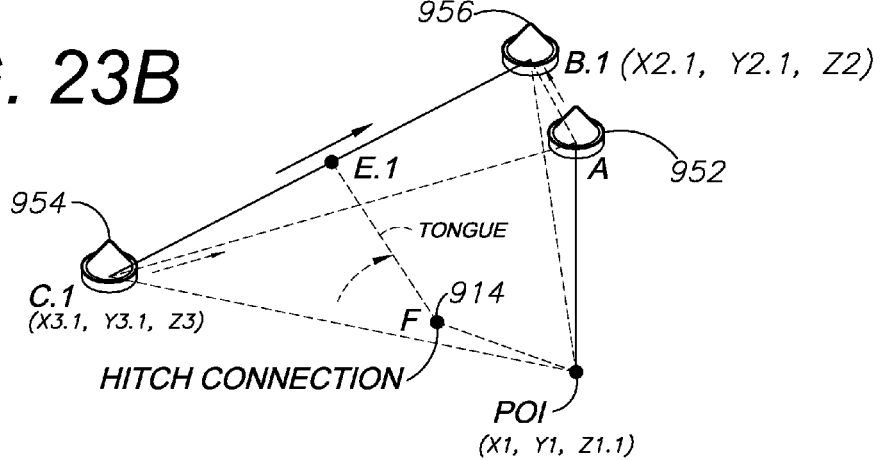
FIG. 23B is a view similar to FIG. 23A showing the relative locations of the antennas with the implement swung to the left behind the tractor.
Figure 23C:
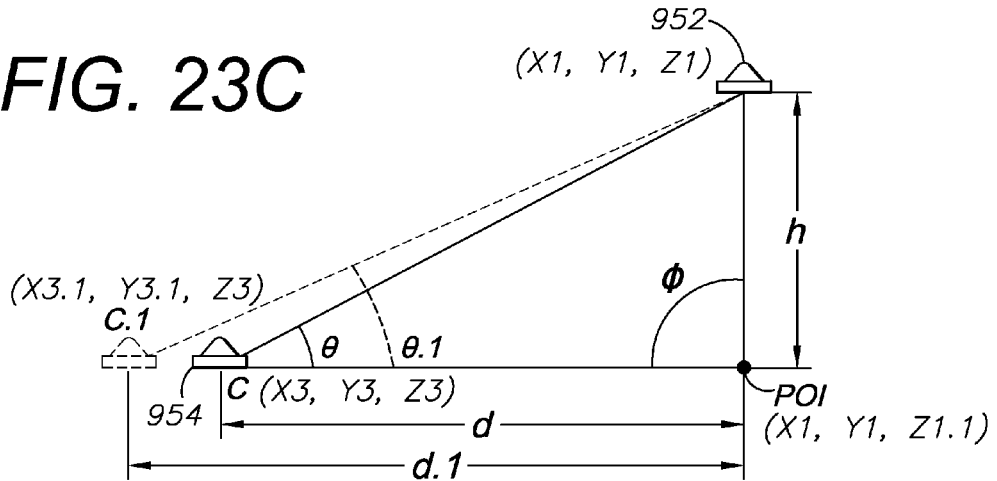
FIG. 23C is a right side elevational view of the antennas shown in FIGS. 23A and 23B and depicts the relative locations of the tractor antenna and an implement antenna.

FIGS. 23B and 23C show the trigonometric relationship changes when the working component 906 rotates about point F (hitch 914) via the tongue 915. The working component will shift in a direction along the X-Y plane, changing the moving baseline relationship AB and AC.

FIG. 23C demonstrates the positional relationship between the motive component-mounted antenna 952 at A and the working component-mounted antenna 956 at C as it moves from the starting position shown in FIG. 23A and moves to the ending position shown in FIG. 23B. The height 'h' is known, and the X, Y, and Z coordinates of both point A and point C are known. The coordinates of the Point of Interest (POI) are:

$$(X_1, Y_1, Z_{1.1}) = (X_1, Y_1, Z_1 - h)$$

Because point C and POI are at the same elevation, $Z_{1.1} = Z_3$. Thus, the distances d and d.1 can be calculated:

$$d = \sqrt{[(X_3 - X_1)^2 + (Y_3 - Y_1)^2]}$$

$$d.1 = \sqrt{[(X_{3.1} - X_1)^2 + (Y_{3.1} - Y_1)^2]}$$

And therefore:

$$\text{Tan } \theta = h/d$$

$$\text{Tan } \theta.1 = h/d.1$$

$$AC = h/\text{Sin } \theta$$

$$AC.1 = h/\text{Sin } \theta.1$$

Alternatively:

$$AC = \sqrt{[(X_3 - X_1)^2 + (Y_3 - Y_1)^2 + (Z_3 - Z_1)^2]}$$

$$AC.1 = \sqrt{[(X_{3.1} - X_1)^2 + (Y_{3.1} - Y_1)^2 + (Z_3 - Z_1)^2]}$$

$$\text{Sin } \theta = h/AC$$

$$\text{Sin } \theta.1 = h/AC.1$$

This alternative formula can be used because the three-dimensional points A and C can be determined by their actual GNSS positions as determined by GNSS satellite signals received by the various antennas 952, 954, 956.

This same method can be used as long as points B, C, and POI are at the same elevation; e.g. $Z_B = Z_C = Z_{POI}$, leaving $\Phi$ to equal 90°. The distances AB and AC will vary as the working component 906 is rotated about point F as shown in FIG. 22C. Using the formulas above, the distances AB and AC can always be determined as long as $Z_B = Z_C = Z_{POI}$.

The working component 906 and the motive component 904 can independently roll (X-axis), pitch (Y-axis) and yaw (Z-axis) relative to each other. For example, rolling and pitching will alter the elevation of points B, C, and POI relative to each other because the motive component 904 and the working component 906 will not be coplanar. The above-mentioned equations will not be able to solve the distances AB and AC. Also, the angle $\Phi$ has changed to $\Phi'$, which is no longer a right angle. In such an instance, the height h will not change, however, and the distances between points can still be calculated using $AB=\sqrt{[(X_B-X_A)^2+(Y_B-Y_A)^2+(Z_B-Z_A)^2]}$ or $AC=\sqrt{[(X_C-X_A)^2+(Y_C-Y_A)^2+(Z_C-Z_A)^2]}$. The various angles can then be calculated using the law of cosines:

$$\mathrm{Cos}\Phi' = \frac{h^2 - AC^2 - d^2}{-2(AC*d)}$$

Knowing the lengths of at least two sides and a known angle $\Phi$ allows calculation of the other side and angles. This will allow the guidance computer 910 to calculate the distance between the antennas 952, 954, 956 no matter what the three-dimensional orientation of the working component is with respect to the motive component. The roll, pitch, or yaw difference between the motive component 904 and the working component 906 can be determined by including IMUs 919, 921 and measuring the differences recorded by those IMUs. The IMU measurements will provide additional values for unknown distances necessary to solve the relative position of the working component 906 in relation to the motive component 904.

FIG. 25 is a block diagram showing the relationship between the various sensors and the GNSS guidance system. The working component 906 contains its own CPU 913, which collects data from both the working component sensors 918 and the hitch feedback sensor 920. These elements are separate to allow the working component 906 to move itself relative to the vehicle 4 by maneuvering the mechanical hitch 914, which will realign the working component being towed by the vehicle, as explained in further detail in U.S. Pat. No. 7,292,186, which is incorporated herein by reference. The guidance computer 910, on the other hand, is directly connected to the GNSS receiver 8, the vehicle sensors 912, and the wheel compaction sensor 916. A controller area network (CAN) cable 932 connects the working computer 913 with the guidance computer 910 located in the vehicle 904. Alternatively, the two computers may communicate over a local wireless network. The wireless network may be located somewhere on the vehicle 907 or may be located elsewhere in the vicinity. Such a network typically requires a wireless router and a wireless communication device connected to each computer.

Communication between the two computers 910, 913 compares data received from the various sensors and the GNSS guidance system and results in problem solving for future pre-planned paths. Problem solving can either be done in real-time, as mentioned above, or used in generating future, pre-planned paths off-site. This may be performed by uploading gathered data onto an external PC 934 or using the guidance computer 910 directly to calculate a new path. Field data that has been gathered by the various sensors can include, without limitation: the slope of the field at various point locations; the speed at which the vehicle previously navigated the field; and the GNSS positional data recorded as the vehicle traversed the field, including locations where the working component 906 and/or the motive component 904 were no longer in line with the previous pre-planned path. The user may interpret the data and create a new pre-planned program based on it, or an optional computer program can take the data and generate a pre-planned path based on programmed configurations for dealing with different field conditions.

It should be noted that the components of the system 902 can be combined in various ways and will function in a similar manner. For example, a commonly used component is a combination receiver and antenna unit, sometimes referred to as a "smart antenna." Other components may also optionally be combined, such as the various base station components. A common example of such a combination antenna is the A-220 "Smart Antenna" manufactured by Hemisphere GPS LLC of Calgary, Canada, which are typically combined with Hemisphere GPS receivers and other components, as described in U.S. Patent Application Ser. No. 61/377,355, which is assigned to a common assignee herewith and incorporated herein by reference.

As mentioned above, a motorized hitch 914 connects the working component 6 to the motive component 904. This motorized hitch contains a feedback sensor 920 which communicates with the working component computer 913, which in turn communicates with the guidance computer 910. This allows commands to be sent to the motorized hitch 914 from the guidance computer 910 regarding positioning of the working component 906, and feedback data to then be reported to the guidance computer 910 for recording and additional guidance commands. Stresses on the hitch 914 from holding the working component 906 along a slope and relative position to the motive component 904 are among the variables reported to the guidance computer 910 by the hitch feedback sensor 920.

FIG. 25 is a block diagram dividing the separate subsystems of the system 902. FIG. 25 shows the flow of information from the sensors and GNSS positional system to a finished form of field output data 928 as it is gathered by the various sensors located on the motive component 904 and the working component 906 and communicated between the working component computer 913 and the guidance computer 910. The various sensors including the vehicle sensors 912, wheel compaction psi sensor 916, working component sensors 918, and hitch feedback sensor 920 feed into the guidance computer 910. Additionally, the antennas 952, 954, 956 receive satellite positional information and transmit that information to the GNSS receiver 908 which is directly connected to the guidance computer 910. The guidance computer 910 is connected to the GUI 911 which both displays information to the user and allows for user input via an interface device, such as a touchscreen display or other interface device. Finally, the field output data 928 is created by combining the entirety of the recorded data and relating it to the layout of the field or piece of land that has been worked. This will allow for a more efficient and accurate pre-planned path the next time a vehicle 904 is to work the field in question by combining the data and configuring an automatic steering program focused on guiding the vehicle while addressing the landscape concerns. Knowing where field irregularities are located is the easiest way to ensure the vehicle 907 correctly navigates these irregularities.

The guidance computer 910 can interface with an external computer (e.g., PC) 934 which can receive recorded field data, edit that data, and turn that data into a pre-planned guidance path. Input field data 930 is data includes pre-planned path and controller data. This data is installed in the guidance computer 910 and actively and automatically guides and controls the vehicle through interaction with the steering controller 917. The steering controller 917 will take guidance commands, steering commands, and other commands to control various vehicle functions and will physically perform those functions. Thus a preplanned path based on earlier field data will know to slow down when the motive component is approaching a particularly sharp curve or may instruct the motorized hitch 914 to adjust the position of the working component 906 prior to entering a sloped area.

Output to an external computer 934, such as a personal computer (PC), can be performed in a number of ways. Field data output 928 can be delivered over a direct connection established between the onboard computer 910 and the external computer 934, or field data output 928 can be offloaded onto a portable storage device and then connected to the external computer 934. Similarly, input data 930 can be generated by an external (e.g., offsite) computer 934 and stored onto a portable storage device, and later uploaded to the CPU 910. Such input data 930 may include a pre-planned driving path for an initial field test, or an updated planned path based on previous data collection.

The vehicle sensor suite 912 can also include a camera 939, or other suitable optical device. For example, U.S. Patent Publication No. 2009/0204281, which is assigned to a common assignee herewith, shows a video input system for autosteering control of an agricultural vehicle and other machines. U.S. patent application Ser. No. 12/504,779, which is also assigned to a common assignee herewith, shows an optical tracking vehicle control system and method. Both of these applications are incorporated herein by reference. The camera 939 can be directed at the projected guide path of the tractor 904, towards crop rows on either side, along vehicle tracks or towards any area of interest relative to the tractor 904 or the implement 906. Optical input from the camera 939 can be used by the guidance computer 910 for guiding the vehicle 907 using video input. Alternatively, the camera 939 can be used for recording, observing and archiving the path of the vehicle 907 for purposes of record-keeping or future guidance. For example, in a "match tracks" mode, it may be desirable for the vehicle 907 to accurately retrace previous guide paths, which may be optically observable. Still further, such optical data can be useful for observing the crop plants (typically in rows) whereby the operator and/or the guidance computer 910 can avoid driving over crops and can monitor and record their growth. Still further, the camera 939 can be user-controlled and adjustable for visually observing the vehicle 907 guide path or the crops close-up, for example, on the GUI 911 in the cab.

Figure 26:
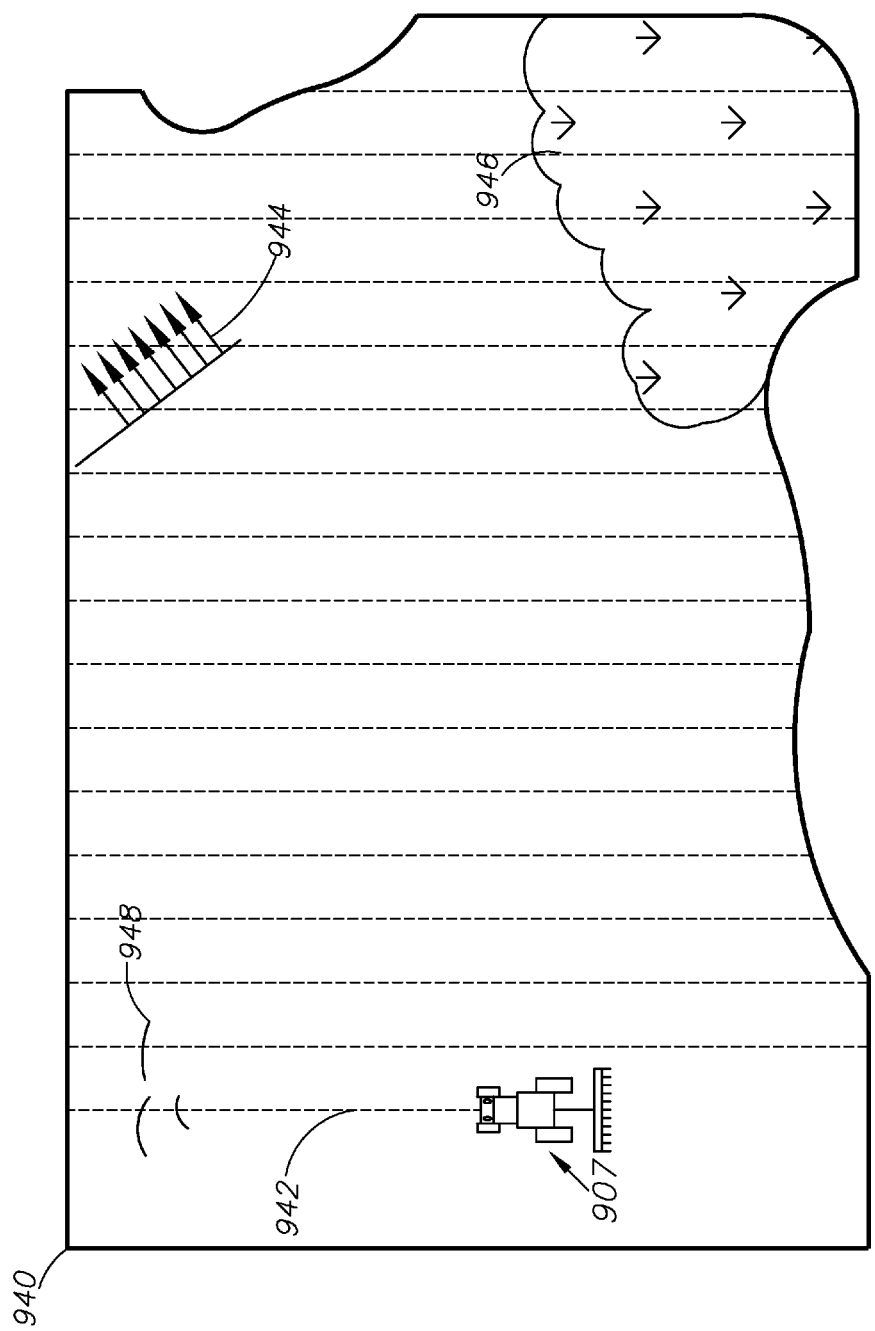
FIG. 26 is a diagrammatic plan view and depicts the system controlling a tractor towing an implement in a cultivated field.

FIG. 26 shows a plan view of a field with a border 940 and a vehicle 907 traversing a pre-planned path 942. The field contains several irregularities, including a severely sloped section 944, a section of soft earth 946 where water or soil type will cause the vehicle and working component wheels to slightly sink into the ground, an uneven area 948 which may be rocky or otherwise uneven. The various sensors attached to the motive component and working component will record data as the vehicle 907 traverses the areas of irregularity. For instance; as the motive component approaches the uneven area 948, the wheel sensors 916 may detect compression psi differences if the ground contains rocks. Likewise, there may be a sensor attached to the shock absorbers of the motive component to determine the stress levels on said shocks when traversing such an uneven area. The GNSS guidance system 902 will detect whether the vehicle 904 or working component 906 rolls or pitches to a side, or if the heading is altered due to a bump. If the effects of the uneven ground result in the vehicle 907 being deflected off course, the guidance CPU can record this information and instruct the vehicle to slow down in that location at a future date.

The measurement of the varying distance of the three GNSS antennas 952, 954, 956 from one another, a plurality of satellites, and the base station 922 along with heading, attitude, motive component speed, motive component gearing, power, fuel consumption, working component load, stress loads, and other factors which may affect vehicle progression through a field will result in providing knowledge to an extreme detail of the field or piece of land being driven. Once all measurements are taken, the end-user will be able zoom in on any particular spot in a field map and view near topographic details of any location. Knowing where rocks, slopes, and obstacles are and controlling the vehicle according to this knowledge will result in greater efficiency, less wear on the vehicle and working component, and lower costs on vehicle fuel as well as seeds, chemicals, and other products being distributed.

Recording field conditions in a variety of weather types and a variety of soil types can also increase efficiency and safety. For instance; if the field needs to be worked while it is raining, preplanned path data can be fed to the guidance computer 910 from a previous field pass from when it was raining This will present a completely customizable method of vehicle guidance and control which can be optimized depending on weather type, vehicle type, soil condition, and other factors.

A preferred embodiment of the present invention will result in better positioning of the motive component 904 for improved working component 906 position, attitude, and track. The hitch feedback sensor 920 will provide feedback regarding working component attitude and will aid in adjusting a skewed heading. Real time and post analysis of motive component and working component stress areas in the field will result in resolving those areas with additional field preparation or alternations to the motive component's tires, speed, or power. Generation of data based off of stressed field conditions will allow future passes to supply guidance changes to preempt working component track distortions in difficult field conditions. Applying the preferred embodiment to a system using adjustable variable rate controllers for applying chemical, seed, or other material to a field will result in a guidance system with unparalleled accuracy.

Figure 27:
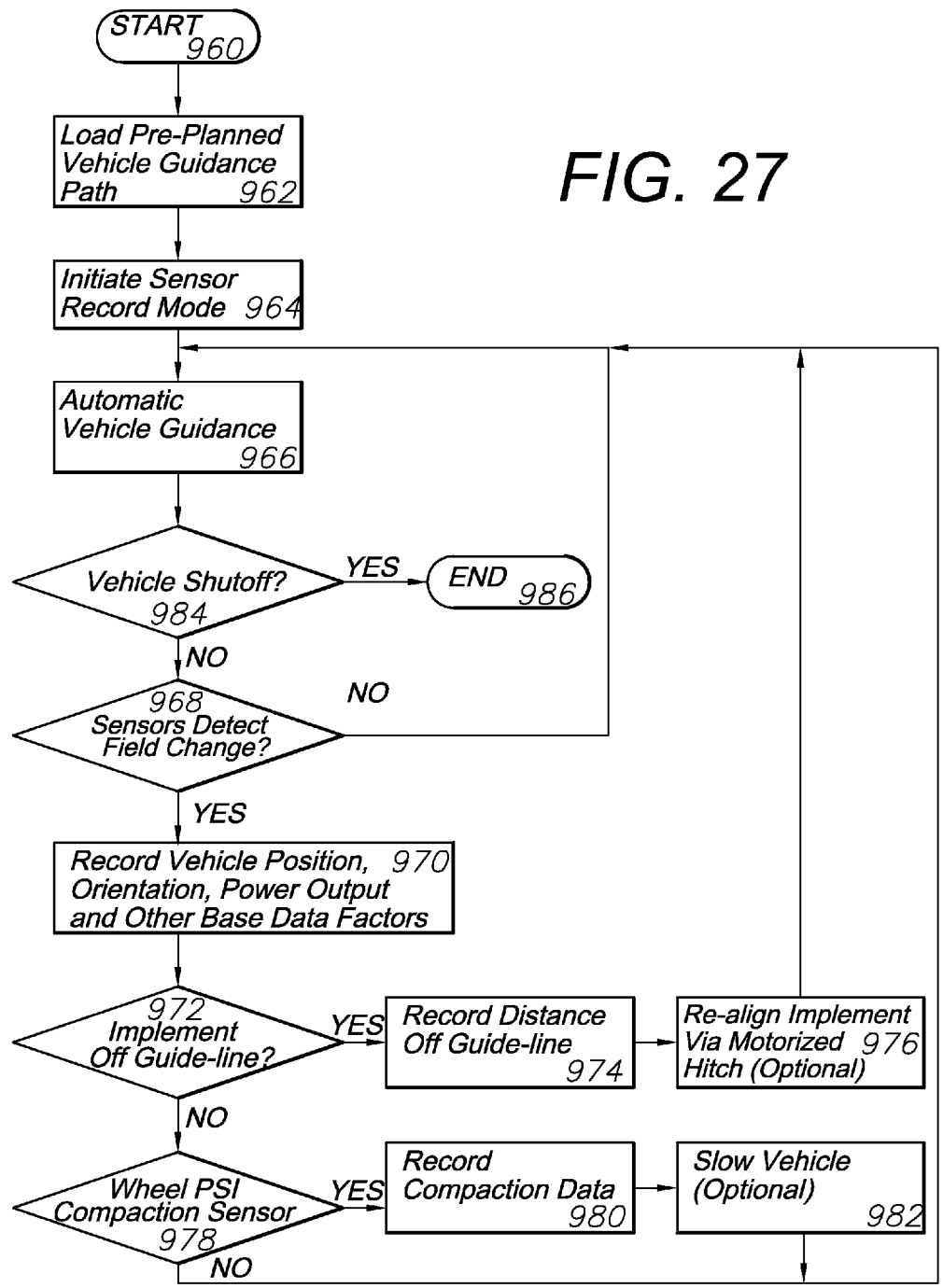
FIG. 27 is a flow diagram of a method of the present invention.

FIG. 27 is a flowchart demonstrating an embodiment of a method of practicing the present invention. This embodiment does not contain all possible sensor data, but instead represents an example of an embodiment of the present invention. The method of practicing the memory system 902 starts at 960. The guidance computer 910 is loaded with a pre-planned vehicle guidance path at 962. All vehicle sensors are initiated and record mode begins at 964. From there, the vehicle is automatically guided around the selected field at 966. This is either done using automatic steering or by directing a driver using a light track bar or other typical guidance method. Alternatively, the vehicle 907 may be driven manually around the field with the sensors recording data, without the need of a preplanned path or vehicle guidance process.

The various vehicle and working component sensors are constantly checking the various systems of the vehicle 907. Simultaneously, the GNSS guidance subsystem is recording position and orientation data of the vehicle as it travels upon the pre-planned path. When one of the various sensors detects a change in the field at 968, the system 902 stores data to a storage device such as a hard drive connected to the guidance CPU 910 in the form of a reference point at 970. This reference point data includes vehicle speed, vehicle position, vehicle orientation, power output, and any other base system sensor desired to be recorded by the end user. This reference data is important for calculating what has occurred at the particular point in the field where a sensor has picked up a change in the field layout according to the pre-planned path.

At 972 is a check to determine whether the sensors have determined if the working component has moved off of the guide-line 942 by an amount pre-set by the user. If the response to this check is "yes," the system 902 records the distance the working component has moved off of the guide-line at 974. From there, the system 902 can optionally re-align the working component via the connected motorized hitch 914 at 976. The user may wish not to re-align and determine the full effect of the field irregularity on the pre-planned guidance path, in which case the optional step at 976 can be ignored. The method will then loop back to the guidance step at 966, where sensor checks will continue.

If, at 972, the sensors do not determine the working component has drifted off of the guide-line 942, then the method proceeds to the next check-step. This step involves the wheel PSI compaction sensor at 978, wherein the wheel compaction sensors of the working component, the motive component, or both determine that the soil beneath the tire has changed in some fundamental way. If the answer to this check is a "yes," then the compaction data is recorded at 980 in reference to positional data and orientation data. From there, the system 902 can optionally slow the vehicle at 982 in order to compensate for the irregular soil type and ensure a smoother and more accurate ride by the vehicle 907. From here, the method loops back to the guidance step at 966, where sensor checks will continue.

A constant "vehicle shutoff" check is present in the loop at 984. If the vehicle or system is ever shutoff, it will result in the system ending at 986.

The guidance computer 910 of the present invention can use guidance algorithms in common with U.S. Patent Publication No. 2009/0164067 (incorporated herein by reference) for position determination in a multiple antenna moving-baseline guidance system. Position and guidance algorithms used by the processors of the present invention are well known and documented in the prior art.

VIII. Alternative Embodiment Multi-Antenna System 1002

Figure 28:
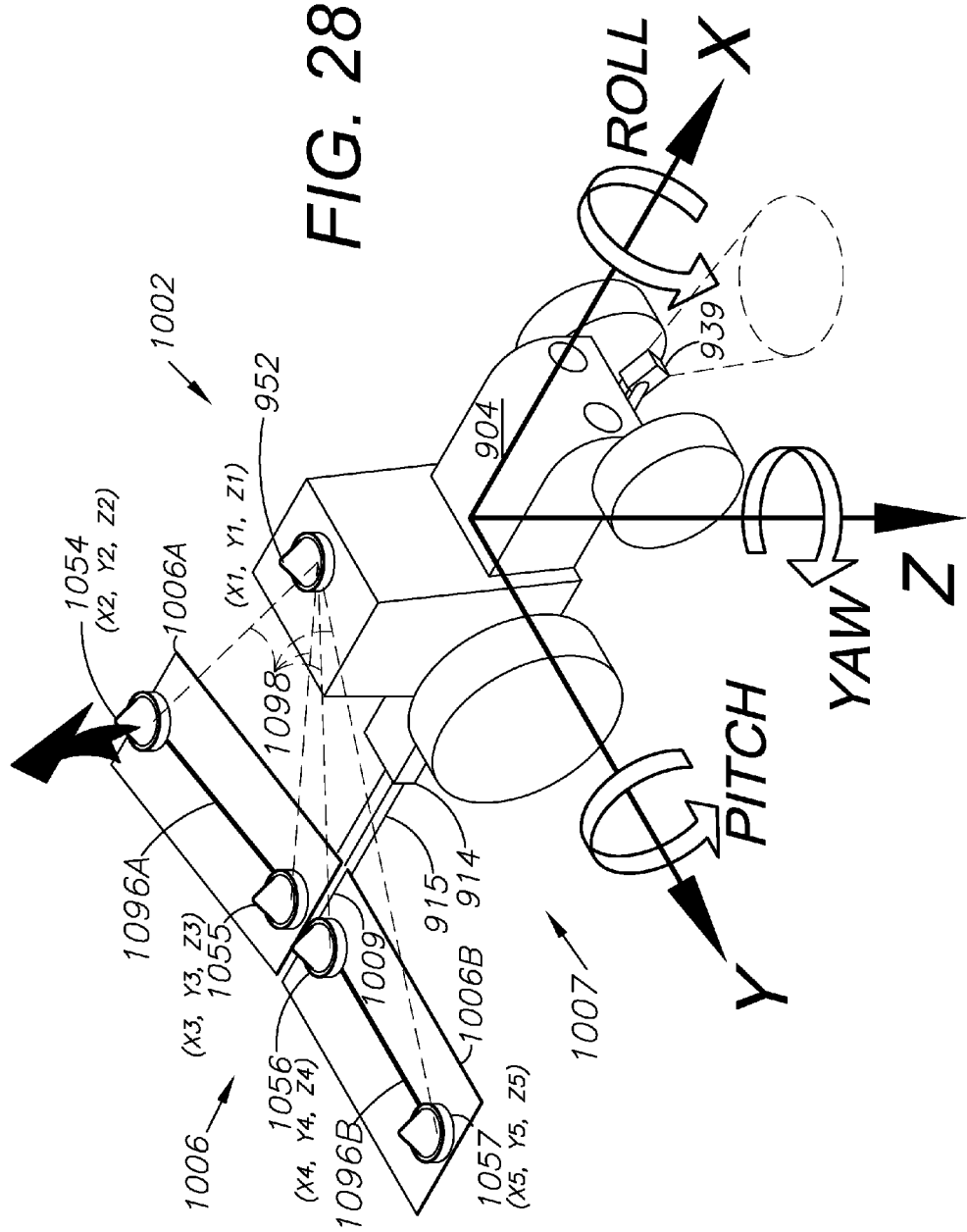
FIG. 28 is a diagrammatic perspective view of a guidance system on an agricultural vehicle comprising another alternative aspect of the present invention.
Figure 29:
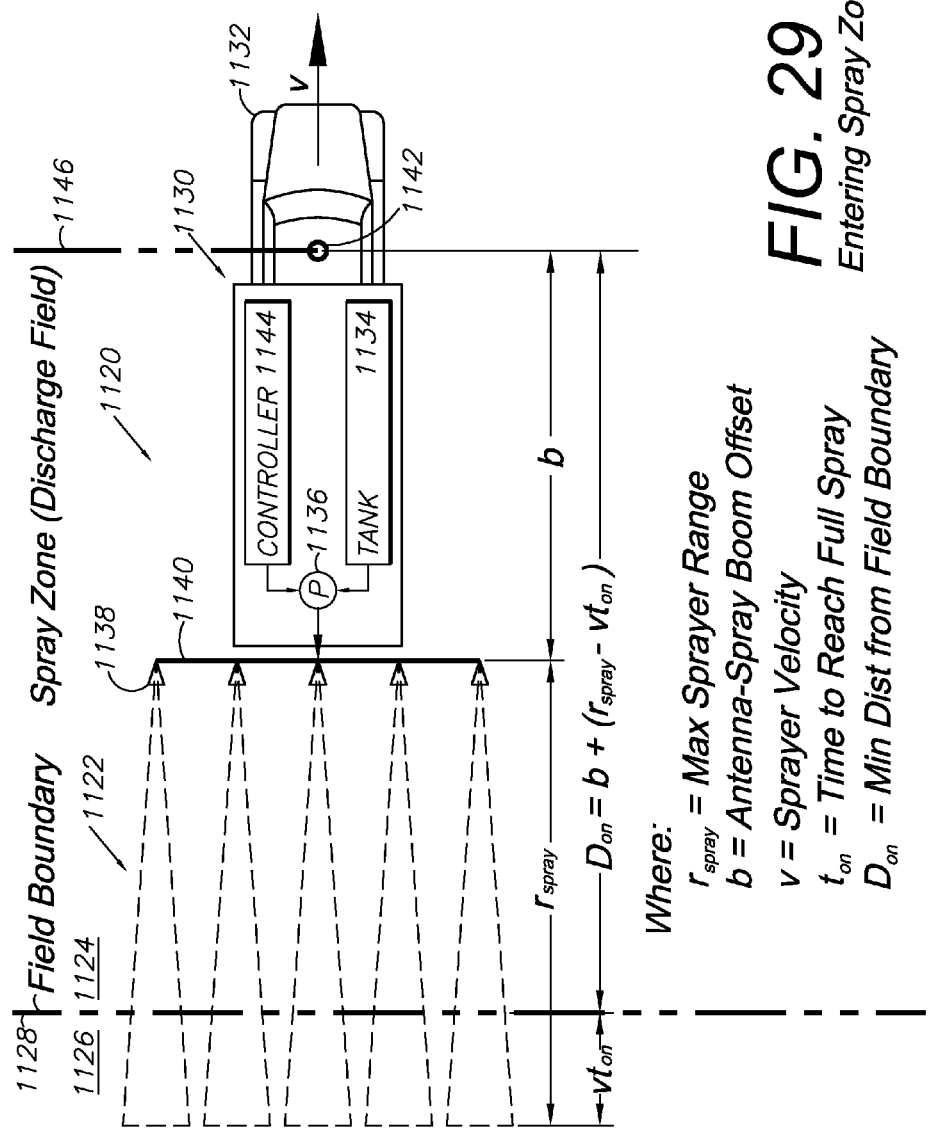
FIG. 29 is a plan view of another alternative embodiment or aspect of the present invention comprising a GNSS-based control for dispensing material from vehicles.
Figure 29A:
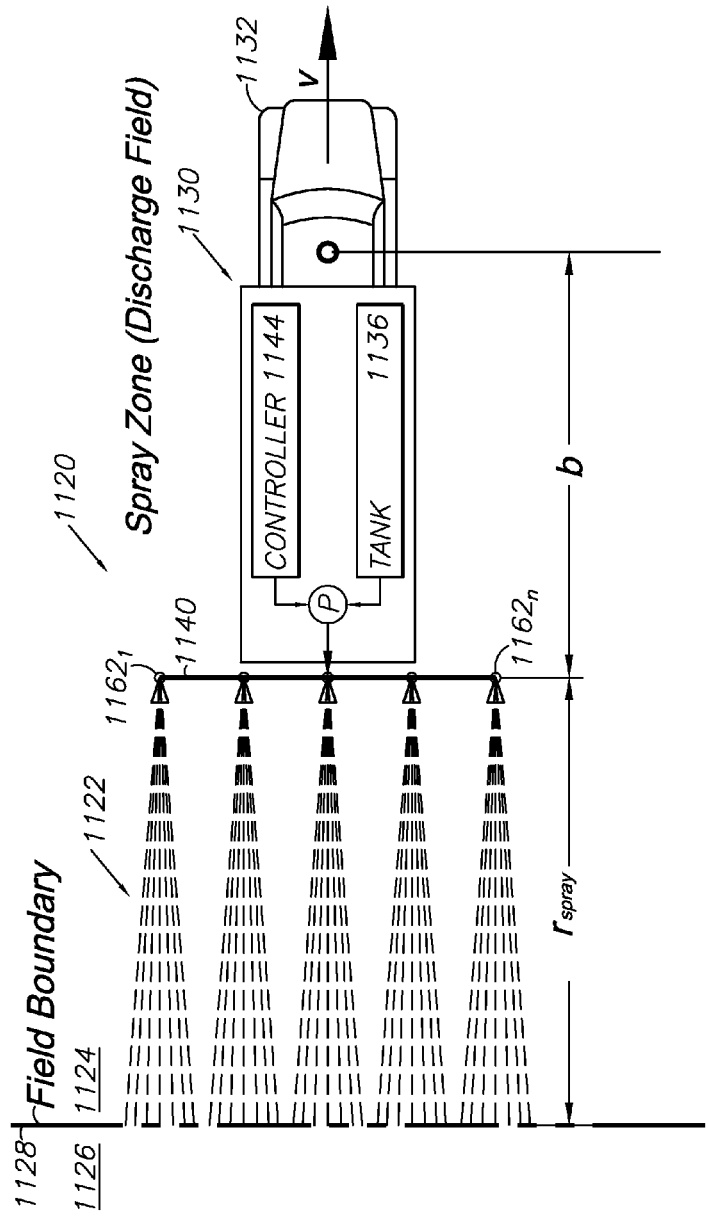

A guidance system 1002 comprising an alternative embodiment of the present invention is shown in FIG. 28 and includes a motive component (e.g., tractor) 904 substantially as described above. Without limitation on the generality of articulated working components adapted for use with the present invention, an articulated implement 1006 is shown with first and second implement sections 1006A and 1006B, which are adapted for rotating relative to each other around a hinge line 1009 extending generally parallel to the X axis. Alternatively, various other working components, such as machines, earthworking equipment, articulated excavator booms, motor graders and agricultural implements can be utilized with the system 1002. For example, a wide range of tillage, cultivating, harvesting, seeding, and spraying implements can be controlled with the system 1002. Such implements include side-by-side and front-and-back components, which can be pivotably connected by hinges and other articulated connections, such as hitches.

As shown in FIG. 28, the implement sections 1006A, 1006B can accommodate field conditions requiring independent rotation. For example, implement section 1006A can be positioned on a sloping ground surface, such as a terrace, while the other implement section 1006B can be relatively flat.

The guidance system 1002 can utilize multiple antennas for independently monitoring positional and attitude (orientation) data from the tractor 904 and the implement sections 1006A, 1006B. For example: the tractor 904 can be provided with an antenna 952; the first implement section 1006A can be provided with antennas 1054, 1055; and the second implement section 1006B can be provided with antennas 1056, 1057. Respective XYZ GNSS-based coordinates can be read from each antenna for computing their respective positions, either on an absolute or relative basis. The first implement section antennas 1054, 1055 define a first fixed baseline 1096A and the second implement section antennas 1056, 1057 define a second fixed baseline 1096B. Variable baselines 1098 are defined between the tractor antenna 952 and the implement antennas 1054-57. Although specific antenna configurations are shown, they are not limiting and the present invention generally contemplates the use of multiple antennas in various suitable multiples, distributions and configurations.

The position/attitude determining algorithms used by the guidance computer 910 can be programmed for the baseline constant and variable factors for use in computing position/attitude solutions. For example, the guidance computer 910 can include a switching function for switching among the antennas in order to optimize the available GNSS ranging information. See, U.S. Patent Publication No. 2004/0212533, which is incorporated herein by reference. The availability of ranging information from multiple antennas can be important in compensating for GNSS signal blockage, for example, when equipment or environment obstructions prevent individual antennas from "seeing" enough satellites. Interference, multipath and other error sources can lead to position dilution of precision ("PDOP"). These conditions can be compensated for by the multi-antenna configuration shown in FIG. 28. Of course, the tractor 904 can also be equipped with multiple antennas defining additional fixed and variable baselines. Multiple antennas are also useful for computing "Vector" guidance solutions comprising object attitude or orientation, direction of travel (heading) and velocity.

XI. Spray Control System and Method 1120

Referring to FIGS. 29, 29a-c and 30, elements of a spray control system and method 1120 are illustrated. The spray control system 1120 can be applied to any kind of field spraying but has particularly advantageous application in environmental spraying in which the application of certain materials 1122 is restricted by regulation to designated areas to avoid or minimize adverse environmental impacts. Areas in which spray of the material 1122 is allowed are referred to as spray zones 1124, while areas in which spray of the material 1122 is required to be avoided are referred to as exclusion zones 1126. The spray zones 1124 are separated from the exclusion zones 1126 by field boundaries 1128.

The method 1120 makes use of a spray vehicle 1130 which is illustrated in FIGS. 29 and 29a-c as a tanker truck 1132 having a tank 1134 holding a quantity of the material 1122 to be sprayed, such as waste water from oil, gas, and water drilling operations, or the like. A pump 1136 is connected to the tank 1134 and is activated to pump the material 1122 to nozzles 1138 transversely spaced along a transverse spray boom 1140. A GNSS antenna 1142 is mounted on the spray vehicle 1130 and is interfaced to a GNSS receiver (e.g., 24a, 524, 604, 734 or 908 described above, or any other suitable GNSS receiver), which is connected to a controller or control computer 1144, which is interfaced by way of suitable drivers and/or relays with the pump 1136 to thereby activate and deactivate the pump 1136. The controller 1144 may be a conventional type of computer, including one or more central processing units (CPUs), memory, mass storage, user interface devices, and input/output (I/O) ports (not detailed) which are widely available.

The field boundaries 1128 are surveyed and position coordinates of the boundaries, as determined by a GNSS receiver or other position coordinate detecting system, are recorded for entry into the controller 1144. The boundaries may be surveyed by a vehicle (not shown) other than the spray vehicle 1130. A longitudinal nozzle/receiver or boom offset distance "b" is measured between the GNSS receiver 1142 and the spray boom 1140. The illustrated nozzles 1138 are aimed to spray the material 1122 generally to the rear of the spray vehicle 1130. When the pump 1136 is at a steady state of operation spraying the material 1122 from the nozzles 1138, the material 1122 is sprayed to an average spray range "r" behind the spray boom 1140. However, there is a spray turn-on lag time "$t_{on}$" between activation of the pump 1136 and the material 1122 reaching the average spray range. Similarly, there is a spray turn-off lag time "$t_{off}$" that occurs between deactivation of the pump 1136 and the cessation of emission of the material 1122 from the nozzles 1138.

In the spray control method 1120, the GNSS receiver generally tracks the position of antenna 1142, which it communicates to the controller 1144. When the spray vehicle 1130 is traveling in an exclusion zone 1126 toward a spray zone 1124, the 1120 turns on when the antenna 1142 reaches a spray turn-on boundary 1146. Conversely, when the spray vehicle 1130 is traveling in a spray zone 1124 toward an exclusion zone 1126, the system 1120 turns off when the antenna 1142 reaches a spray turn-off boundary 1148. In general, when the spray vehicle 1130 is approaching a turn-on boundary 1146, the controller 1144 causes the pump 1136 to activate when the GNSS receiver detects that it is at a distance beyond the turn-on boundary 1146 at which spray of the material 1122 will be retained within the spray zone 1124. Similarly, when the spray vehicle 1130 is approaching a turn-off boundary 1146, the controller 1144 causes the pump 1136 to deactivate when the vehicle 1130 is at a distance beyond the turn-off boundary 1146 at which deposition of the material 1122 within the exclusion zone 1126 is prevented.

In an embodiment of the method 1120, when the spray vehicle 1130 is traveling within an exclusion zone 1126 approaching a spray zone 1124, the controller 1144 causes the pump 1136 to activate within the spray zone 1124 when the system 1120 detects that the vehicle 1130 is at a turn-on distance "$D_{on}$" beyond the turn-on boundary 1146 equal to the sum of the nozzle/receiver offset distance plus the spray range minus the product of the spray vehicle velocity "v" times spray turn-on lag time. The turn-on distance can be expressed as:

$$D_{on} = (b+r) - v^* t_{on}$$

When the spray vehicle 1130 is traveling in a spray zone 1124 approaching an exclusion zone 1126, the controller 1144 causes the pump 1136 to deactivate when the system 1120 detects that it is at a turn-off distance "$D_{off}$" beyond the turn-off boundary 1148 equal to the nozzle/receiver offset minus the product of the spray vehicle velocity times the spray turn-off lag time. The turn-off distance can be expressed as:

$$D_{off} = b - v^* t_{off}$$

It is foreseen that the turn-on and turn-off distances may need to be adjusted to insure that the material 1122 is not sprayed onto the exclusion zone 1126. Thus, the turn-on distance may need to be increased somewhat and the turn-off distance decreased somewhat to avoid any spraying onto the exclusion zone 1126.

Referring to FIG. 30, the illustrated spray vehicle 1150 includes a towing vehicle or tractor 1150 and a towed vehicle or spray implement 1152, which is hitched to the tractor 1150, which are similar in many respects to the tractor 10 and the spray implement 506 shown in FIG. 9. The illustrated spray implement 1152 includes a tank 1154 holding the material 1122 to be sprayed and a transverse spray boom 156 having a plurality of nozzles 158 transversely spaced therealong and communicating with a pump 1136, which is controlled by a controller 1144. While the illustrated spray patterns of the nozzles 1158 suggest a downward spray direction, it is foreseen that the nozzles 1158 could also be arranged to have spray patterns similar to the spray nozzles 1138. The illustrated tractor 1150 has the GNSS antenna 1142 mounted thereon at a nozzle/receiver offset distance from the spray boom 1156 and interfaced to the controller. The spray control method 1120 may be operated with the spray vehicle 1130 formed by the tractor 1150 and spray implement 1152 in a manner substantially similar to operation using the spray truck 1132.

In surveying the field boundaries 1128 for environmental spraying, it is desirable to simplify the shape of the boundaries, with any error adjustment being in the direction of avoiding applying the material 1122 to an exclusion zone. It is foreseen that the field boundaries 1128 may not always be straight-lined and that the direction of travel of the spray vehicle 1130 may not always be perpendicular to a field boundary 1128.

X. Optional Spray Control Valves

The spray control system and method 1120 can optionally include valves 1162₁ through 1162ₙ by the controller 1144 to control the flow of material 1122 from the pump 1136 to the nozzles 1158₁ through 1158ₙ. There is a valve open lag time which occurs between opening of a valve 1162 and the material 1122 reaching the average spray range behind the spray boom 1156. The valve open lag time may be different from the spray lag time described above and it may vary depending on whether or not the pump 1136 is being activated simultaneously. Additionally, the valve open lag time may vary depending on the number of valves 1162 which are currently open or are being opened. Similarly, there is a valve close lag time between closure of a valve 1162 and the cessation of material 1122 being emitted from the associated nozzle 1156, which may vary for reasons similar to variation in the valve open lag time. The variations in the valve open and close lag times can be measured and entered into the controller 1144 along with the sets of conditions which are to be processed in selecting a given valve lag time. In the alternative spray control embodiment 1160, each valve 1162 is controlled in relation to a segment or portion of the upcoming field boundary 1128 that is aligned with the valve 1160 and its spray pattern. Although the spray truck 1132 is not illustrated with individual valves for its nozzles 1138, it is foreseen that the spray truck 1132 could also be provided with individual spray valves for use in the alternative spray control method 1160.

When the spray vehicle 1130 is traveling within an exclusion zone 1126 and approaching a spray zone 1124, the controller 1144 causes each valve 1162 to be opened within the spray zone 1124 when the system 1120 detects that it is at a valve open distance beyond the portion of the turn-on boundary 1146 aligned with that particular valve 1162 which is equal to the sum of the nozzle/receiver offset distance plus the spray range minus the product of the spray vehicle velocity times the valve turn-on lag time, which is selected according to the conditions described above. When the spray vehicle 1130 is traveling in a spray zone 1124 approaching an exclusion zone 1126, the controller 1144 causes each valve 1162 to be closed when the GNSS receiver 1142 detects that it is at a valve close distance beyond a portion of the turn-off boundary 1148 aligned with that particular valve 1162 which is equal to the nozzle/receiver offset minus the product of the spray vehicle velocity times the valve close lag time, also selected according to the conditions described above. It is foreseen that, in an environmental spraying operation, the valve open and close distances may need to be adjusted somewhat to insure that the material 1122 is not applied to any exclusion zones 1126.

The spray control method 1120, as described, generally assumes that the truck 1132 and the tractor 1150 are driven by human operators, with the method 1120 causing automatic turn-on and turn-off of spraying equipments based on the locations detected by the GNSS receivers. It is also foreseen that the truck 1132 or tractor 1150 could be operated in fully automatic navigation modes using apparatus and techniques described above, in cooperation with the spray control method 1120.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

Having thus described the invention, what is claimed as new and desired to be secured by Letters Patent is:

1. A spray control method for controlling spraying of a material on a spray zone of a field also including an exclusion zone which is not to receive said material, said spray zone being separated from said exclusion zone by a spray turn-on boundary when passing from said exclusion zone to said spray zone and by a spray turn-off boundary when passing from said spray zone to said exclusion zone; said method employing a spray vehicle including a material tank, a pump communicating with said tank, and a nozzle communicating with said pump, said pump when activated causing said material to be sprayed from said nozzle to a spray range from said nozzle and requiring a turn-on lag time between activation of said pump and said material reaching said spray range and a turn-off lag time between deactivation of said pump and cessation of said material being sprayed from said nozzle, said vehicle having a GNSS receiver mounted thereon at an offset distance from said nozzle and outputting position data representing a position of said receiver, said receiver being interfaced to a controller which is interfaced to said pump, said controller selectively activating said pump and having data representing said turn-on boundary and said turn-off boundary stored therein, and said method comprising the steps of:

(a) moving said vehicle in said exclusion zone toward said turn-on boundary at a vehicle velocity;

(b) communicating position data from said receiver to said controller to track the position of said receiver;

(c) activating said pump by said controller when said receiver detects a position of said receiver within said spray zone at a spray turn-on distance beyond said turn-on boundary equal to the sum of said offset distance plus said spray range minus the product of said vehicle velocity times said turn-on lag time;

(d) moving said vehicle in said spray zone toward said turn-off boundary; and (e) deactivating said pump by said controller when said receiver detects a position of said receiver within said exclusion zone at a spray turn-off distance beyond said turn-off boundary equal to said offset distance minus the product of said vehicle velocity times said turn-off lag time.

2. A spray control method as set forth in claim 1 and including the steps of:

(a) mounting a transverse spray boom on said vehicle; and (b) supporting said nozzle and a plurality thereof on said spray boom in transversely spaced relation and in communication with said pump.

3. A method as set forth in claim 1 and including a plurality of spray valves connecting said nozzles respectively with said pump, said valves being interfaced to said controller, and valves having a valve turn-on lag time and a valve turn-off lag time which are stored in said controller, and including the steps of:

(a) individually controlling each valve to open when said receiver detects a position of said receiver within said spray zone at a valve open distance beyond a portion of said turn-on boundary aligned with the nozzle associated with said valve equal to the sum of said offset distance plus said spray range minus the product of said vehicle velocity times said valve open lag time; and (b) individually controlling each valve to close when said receiver detects a position of said receiver within said exclusion zone at a valve close distance beyond a portion of said turn-off boundary aligned with the nozzle associated with said valve equal to said offset distance minus the product of said vehicle velocity times said valve close lag time.

4. A spray control method as set forth in claim 1 wherein:

(a) said vehicle includes a tractor and a towed spray implement hitched to said tractor and having said tank and said pump mounted thereon.

5. A spray control method for controlling spraying of a material on a spray zone of a field also including an exclusion zone which is not to receive said material; said method employing a spray vehicle including a material tank storing said material, a pump communicating with said tank, a GNSS receiver outputting position data representing a position thereof, and a controller interfaced between said receiver and said pump, said controller selectively activating said pump and having data representing boundaries of said spray zone relative to said exclusion zone stored therein, and said method comprising the steps of:

(a) moving said vehicle in said exclusion zone toward said spray zone;

(b) communicating position data from said receiver to said controller to track the position of said receiver;

(c) activating said pump by said controller when said receiver detects a position of said receiver within said spray zone at which spray of said material is retained within said spray zone;

(d) moving said vehicle in said spray zone toward said exclusion zone;

(e) deactivating said pump by said controller when said receiver detects a position of said receiver within said exclusion zone at which spray of said material within said exclusion zone is prevented;

(f) separating said spray zone from said exclusion zone by a spray turn-on boundary when passing from said exclusion zone to said spray zone;

(g) activating said pump causing said material to spray to a spray range from a nozzle communicating with said pump and positioned at an offset distance from said receiver, a turn-on lag time being required between activation of said pump and said material reaching said spray range;

(h) moving said vehicle toward said turn-on boundary at a vehicle velocity; and (i) activating said pump by said controller when said receiver detects a position of said receiver within said spray zone beyond said turn-on boundary equal to the sum of said offset distance plus said spray range minus the product of said vehicle velocity times said turn-on lag time.

6. A method as set forth in claim 5 wherein said spray zone is separated from said exclusion zone by a spray turn-on boundary when passing from said exclusion zone to said spray zone, and said method includes the steps of:

(a) moving said vehicle toward said turn-on boundary; and (b) activating said pump by said controller when said receiver detects a position of said receiver within said spray zone beyond said turn-on boundary at which spray of said material is retained within said spray zone.

7. A method as set forth in claim 5 wherein said spray zone is separated from said exclusion zone by a spray turn-off boundary when passing from said spray zone to said exclusion zone, and said method includes the steps of:

(a) moving said vehicle in said spray zone toward said turn-off boundary; and (b) deactivating said pump by said controller when said receiver detects a position of said receiver within said exclusion zone beyond said turn-off boundary at which spray of said material within said exclusion zone is prevented.

8. A method as set forth in claim 5 and including the steps of:

(a) mounting a transverse spray boom on said vehicle; and (b) supporting said nozzle and a plurality thereof on said spray boom in transversely spaced relation and in communication with said pump.

9. A method as set forth in claim 8 and including a plurality of spray valves connecting said nozzles respectively with said pump, said valves being interfaced to said controller, and including the steps of:

(a) individually controlling each valve to open when said receiver detects a position of said vehicle within said spray zone at which spray of said material from the nozzle associated with said valve is retained within said spray zone; and (b) individually controlling each valve to close when said receiver detects a position of said receiver within said exclusion zone at which spray of said material within said exclusion zone from the nozzle associated with said valve is prevented.

10. A method as set forth in claim 5 wherein:

(a) said vehicle includes a tractor and a towed spray implement hitched to said tractor and having said tank and said pump mounted thereon.

11. A spray control method for controlling spraying of a material on a spray zone of a field also including an exclusion zone which is not to receive said material; said method employing a spray vehicle including a material tank storing said material, a pump communicating with said tank, a GNSS receiver outputting position data representing a position thereof, and a controller interfaced between said receiver and said pump, said controller selectively activating said pump and having data representing boundaries of said spray zone relative to said exclusion zone stored therein, and said method comprising the steps of:

(a) moving said vehicle in said exclusion zone toward said spray zone;

(b) communicating position data from said receiver to said controller to track the position of said receiver;

(c) activating said pump by said controller when said receiver detects a position of said receiver within said spray zone at which spray of said material is retained within said spray zone;

(d) moving said vehicle in said spray zone toward said exclusion zone;

(e) deactivating said pump by said controller when said receiver detects a position of said receiver within said exclusion zone at which spray of said material within said exclusion zone is prevented;

(f) separating said spray zone from said exclusion zone by a spray turn-off boundary when passing from said spray zone to said exclusion zone;

(g) said vehicle including a nozzle positioned an offset distance from said receiver and communicating with said pump;

(h) a turn-off lag time elapsing between deactivation of said pump and cessation of material being sprayed from said nozzle;

(i) moving said vehicle in said spray zone toward said turn-off boundary at a vehicle velocity; and (j) deactivating said pump by said controller when said receiver detects a position of said receiver within said exclusion zone beyond said turn-off boundary equal to said offset distance minus the product of said vehicle velocity times said turn-off lag time.

12. A spray control method for controlling spraying of a material on a spray zone of a field also including an exclusion zone which is not to receive said material, said spray zone being separated from said exclusion zone by a spray turn-on boundary when passing from said exclusion zone to said spray zone and by a spray turn-off boundary when passing from said spray zone to said exclusion zone; said method employing a spray vehicle including a material tank storing said material, a pump communicating with said tank, a GNSS receiver outputting position data representing a position thereof, and a controller interfaced between said receiver and said pump, said controller selectively activating said pump and having data representing said turn-on boundary and said turn-off boundary stored therein, and said method comprising the steps of:

(a) moving said vehicle in said exclusion zone toward said turn-on boundary;

(b) communicating position data from said receiver to said controller to track the position of said receiver;

(c) activating said pump by said controller when said receiver detects a position of said receiver within said spray zone beyond said turn-on boundary at which spray of said material is retained within said spray zone;

(d) moving said vehicle in said spray zone toward said turn-off boundary;

(e) deactivating said pump by said controller when said receiver detects a position of said receiver within said exclusion zone beyond said turn-off boundary at which spray of said material within said exclusion zone is prevented;

(f) said vehicle including a nozzle positioned an offset distance from said receiver and communicating with said pump;

(g) a turn-off lag time elapsing between deactivation of said pump and cessation of material being sprayed from said nozzle;

(h) moving said vehicle in said spray zone toward said turn-off boundary at a vehicle velocity; and (i) deactivating said pump by said controller when said receiver detects a position of said receiver within said exclusion zone beyond said turn-off boundary equal to said offset distance minus the product of said vehicle velocity times said turn-off lag time.

13. A method as set forth in claim 12 wherein said spray zone is separated from said exclusion zone by a spray turn-on boundary when passing from said exclusion zone to said spray zone, activation of said pump causes said material to spray to a spray range from a nozzle communicating with said pump and positioned at an offset distance from said receiver, and a turn-on lag time is required between activation of said pump and said material reaching said spray range, and said method includes the steps of:

(a) moving said vehicle toward said turn-on boundary at a vehicle velocity; and (b) activating said pump by said controller when said receiver detects a position of said receiver within said spray zone beyond said turn-on boundary equal to the sum of said offset distance plus said spray range minus the product of said vehicle velocity times said turn-on lag time.

14. A method as set forth in claim 12 and including the steps of:

(a) mounting a transverse spray boom on said vehicle; and (b) supporting a plurality of said nozzles on said spray boom in transversely spaced relation and in communication with said pump.

15. A method as set forth in claim 14 and including a plurality of spray valves connecting said nozzles respectively with said pump, said valves being interfaced to said controller, and including the steps of:

(a) individually controlling each valve to open when said receiver detects a position of said receiver within said spray zone beyond said turn-on boundary at which spray of said material from the nozzle associated with said valve is retained within said spray zone; and (b) individually controlling each valve to close when said receiver detects a position of said receiver within said exclusion zone beyond said turn-off boundary at which spray of said material within said exclusion zone from the nozzle associated with said valve is prevented.

16. A method as set forth in claim 12 wherein:

(a) said vehicle includes a tractor and a towed spray implement hitched to said tractor and having said tank and said pump mounted thereon.

\* \* \* \* \*